(12) United States Patent
Sakoda

(10) Patent No.: US 7,567,540 B2
(45) Date of Patent: *Jul. 28, 2009

(54) WIRELESS COMMUNICATION SYSTEM, WIRELESS COMMUNICATION APPARATUS, WIRELESS COMMUNICATION METHOD AND COMPUTER PROGRAM

(75) Inventor: Kazuyuki Sakoda, Tokyo (JP)

(73) Assignee: Sony Corporation, Tokyo (JP)

( * ) Notice: Subject to any disclaimer, the term of this patent is extended or adjusted under 35 U.S.C. 154(b) by 819 days.

This patent is subject to a terminal disclaimer.

(21) Appl. No.: 11/019,417

(22) Filed: Dec. 23, 2004

(65) Prior Publication Data

US 2005/0227615 A1 Oct. 13, 2005

(30) Foreign Application Priority Data

Dec. 24, 2003 (JP) ............................ P2003-426295
Dec. 20, 2004 (JP) ............................ P2004-367552

(51) Int. Cl.
*H04Q 7/24* (2006.01)

(52) U.S. Cl. .................. 370/338; 370/328; 370/341; 370/348; 370/445; 370/448; 455/500; 455/502; 455/41.2

(58) Field of Classification Search ................ 370/338, 370/445, 448, 328–329, 341, 348; 455/500, 455/502, 507, 512, 41.2

See application file for complete search history.

(56) References Cited

U.S. PATENT DOCUMENTS

| | | | | |
|---|---|---|---|---|
| 6,907,258 B2* | 6/2005 | Tsutsumi et al. | ............ | 455/512 |
| 6,975,614 B2* | 12/2005 | Kennedy | .................... | 370/338 |
| 7,193,975 B2* | 3/2007 | Tsutsumi et al. | ............ | 370/254 |
| 7,302,227 B2* | 11/2007 | Sakoda | .................... | 455/41.2 |
| 2002/0060995 A1* | 5/2002 | Cervello et al. | ............. | 370/332 |
| 2003/0152054 A1* | 8/2003 | Hirano et al. | ................ | 370/338 |
| 2003/0174690 A1* | 9/2003 | Benveniste | .................. | 370/350 |
| 2004/0152464 A1* | 8/2004 | Sugaya | .................... | 455/435.1 |
| 2004/0170135 A1* | 9/2004 | Sugaya | ........................ | 370/314 |
| 2004/0208140 A1* | 10/2004 | Noguchi et al. | ............. | 370/328 |
| 2004/0240426 A1* | 12/2004 | Wu et al. | .................... | 370/350 |
| 2004/0264425 A1* | 12/2004 | Nishikawa | .................. | 370/338 |
| 2005/0068934 A1* | 3/2005 | Sakoda | ........................ | 370/350 |
| 2005/0085190 A1* | 4/2005 | Nishikawa | ................. | 455/63.1 |

\* cited by examiner

*Primary Examiner*—Kamran Afshar
(74) *Attorney, Agent, or Firm*—Oblon, Spivak, McClelland, Maier & Neustadt, P.C.

(57) ABSTRACT

In order to realize low power consumption of a communicator and information transmission in short packets with a short latency in a network environment of a self-organized distribution type, each communication station performs a reception processing before and after a beacon transmission time of a next communication station which transmits a beacon next to a local station, and performs data transmission before and after a beacon transmission time of a communication station functioning as a data transmission destination. In a case where a certain communication station transmits information to all other communication stations, each communication station transmits information by utilizing a reception period provided after the beacon transmission time of the next communication station transmitting the beacon next to the local station to perform transmission according to a bucket-brigade system.

40 Claims, 27 Drawing Sheets

FIG. 9
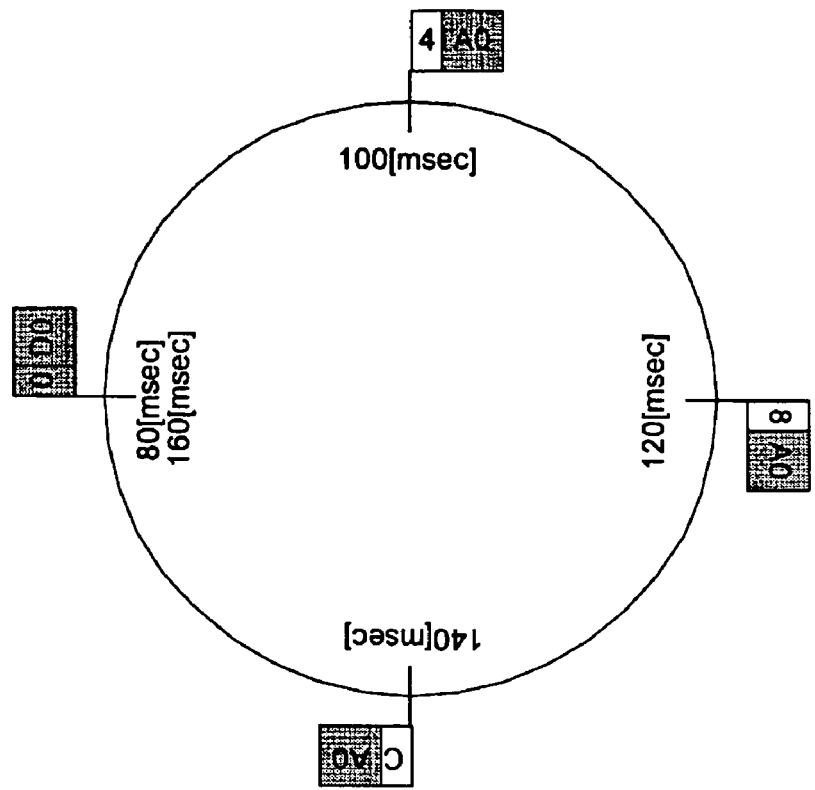
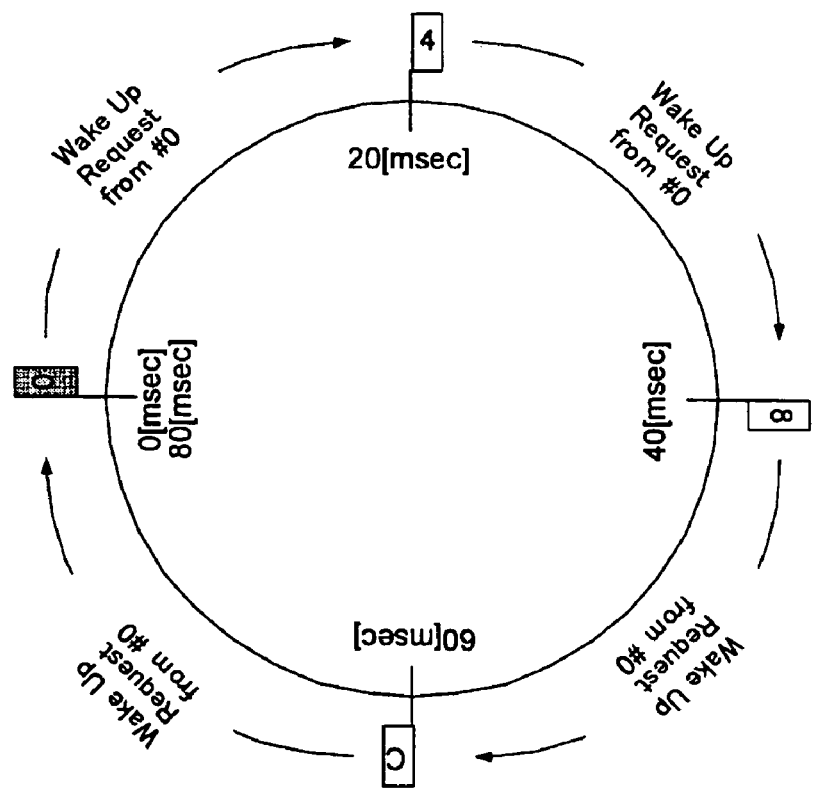

FIG. 10

| RA | TA | Type | SA | FCS |

FIG. 13
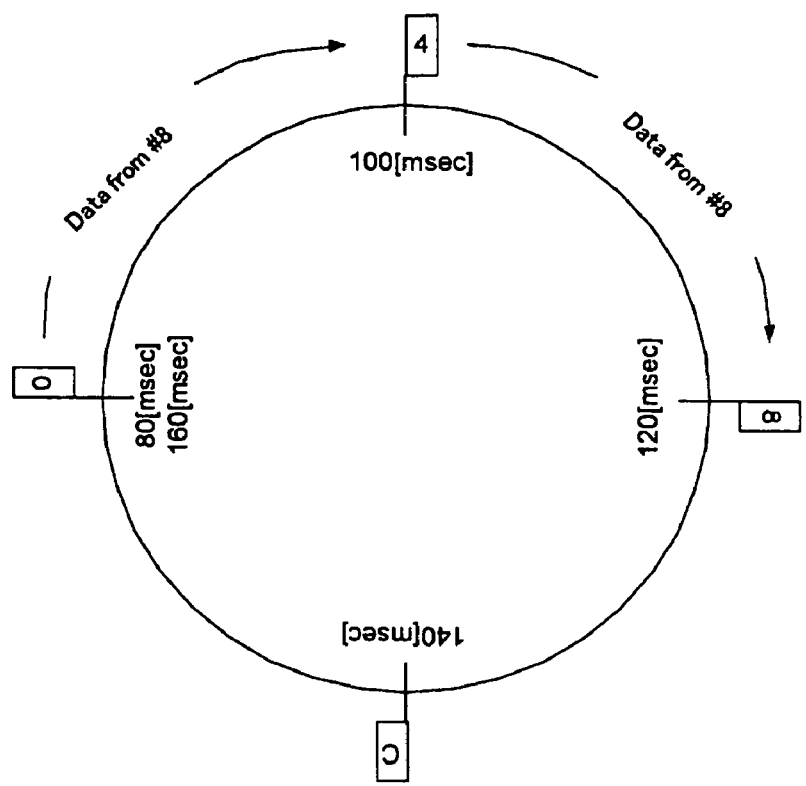
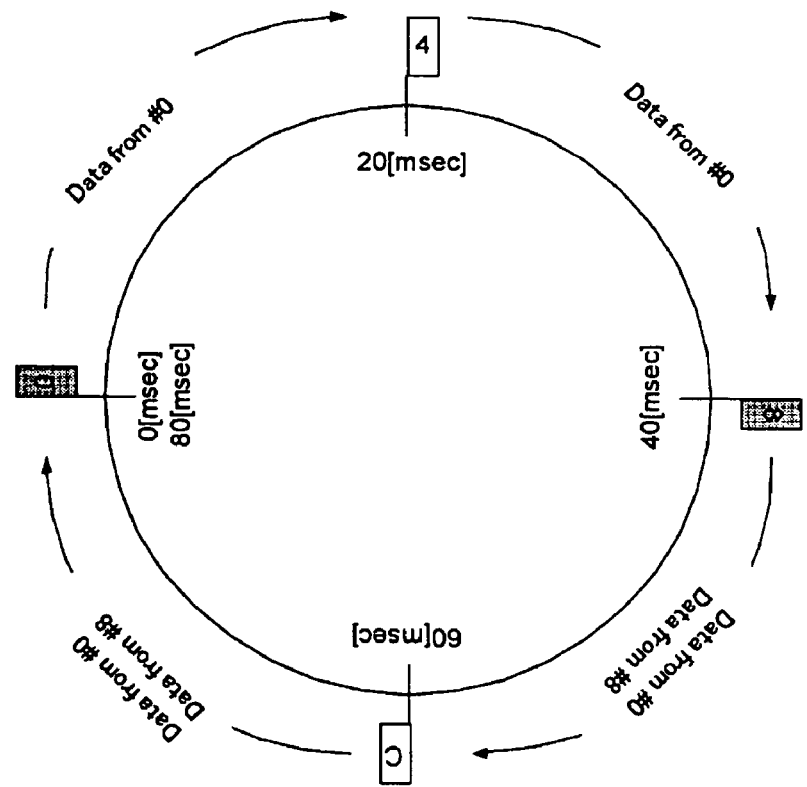

FIG.22
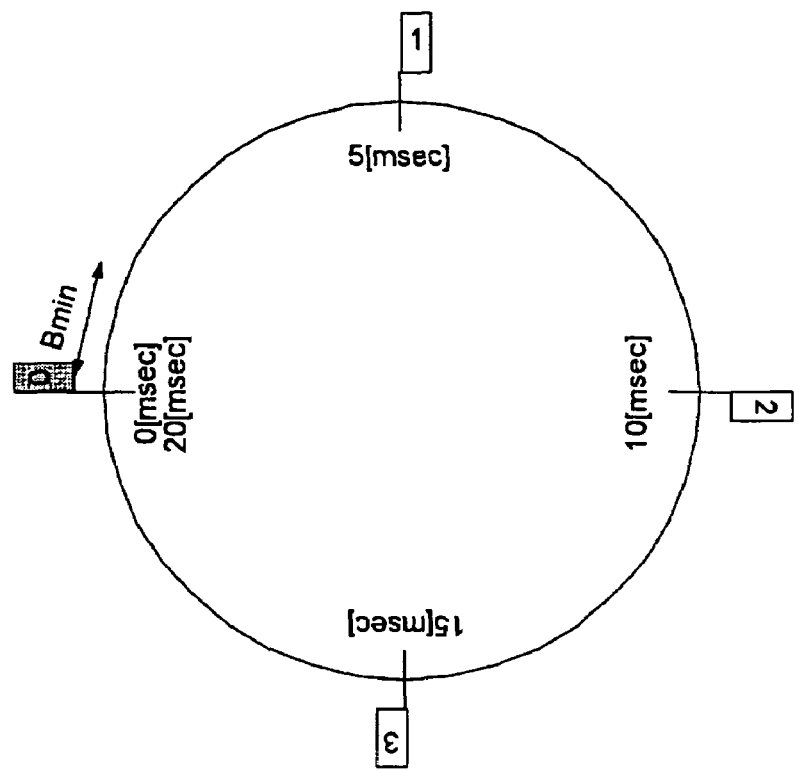
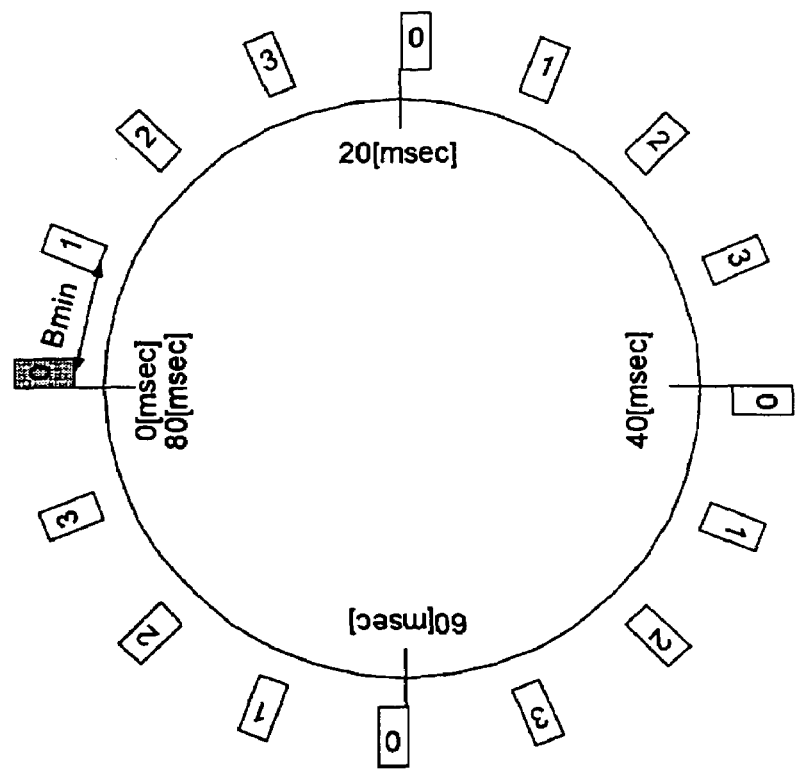

FIG. 26
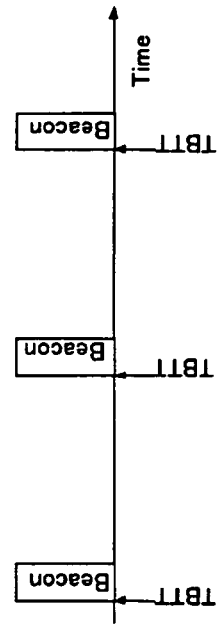
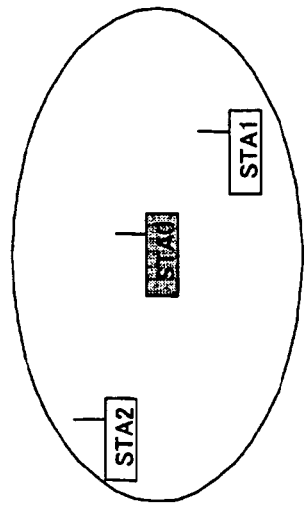
FIG. 27
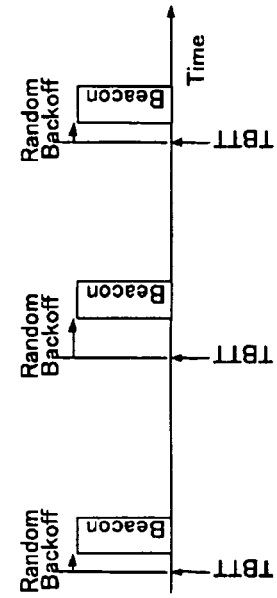
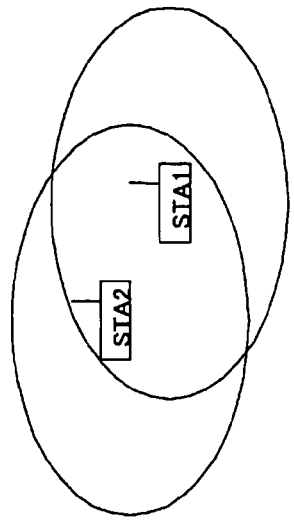

WIRELESS COMMUNICATION SYSTEM, WIRELESS COMMUNICATION APPARATUS, WIRELESS COMMUNICATION METHOD AND COMPUTER PROGRAM

CROSS REFERENCES TO RELATED APPLICATIONS

The present document is based on Japanese Priority Document JP 2003-426295, filed in the Japanese Patent Office on Dec. 24, 2003, the entire contents of which being incorporated herein by reference.

BACKGROUND OF THE INVENTION

1. Field of the Invention

The present invention relates to a wireless communication system for mutual communication among a plurality of wireless stations such as a wireless LAN (Local Area Network), a wireless communication apparatus, a wireless communication method and a computer program, and more particularly to a wireless communication system, a wireless communication apparatus, a wireless communication method and a computer program, in which a wireless network is configured by each station operating in a self-organized distributed manner.

More particularly, the present invention relates to a wireless communication system, a wireless communication apparatus, a wireless communication method and a computer program in which communication stations carry out data communication by access control based on CSMA (Carrier Sense Multiple Access) in an environment of self-organized distribution type network, and in particular to a wireless communication system, a wireless communication apparatus, a wireless communication method and a computer program which realizes short packet broadcast communication with a short latency.

2. Description of Related Art

As one of the standard specifications of wireless networks, IEEE (The Institute of Electrical and Electronics Engineers) 802.11 (e.g., refer to Non-patent Document 1), HiperLAN/2 (e.g., refer to Non-patent Document 2 or Non-patent Document 3), IEEE 802.15.3, Bluetooth communication and the like can be enumerated. The IEEE 802.11 standard has various wireless communication schemes such as the IEEE 802.11a standard and the IEEE 802.11b standard depending upon a difference of a wireless communication scheme and a frequency band in use.

In general, in order to configure a local area network by using wireless technologies, a method is used by which one apparatus to be used as a control station called an "access point" or a "coordinator" is installed in an area and a network is formed under the collective control by the control station.

In a wireless network having distributed access points, in a case where information is transmitted from a certain communication apparatus, an access control method based on bandwidth reservation has been adopted widely by which a band necessary for transmitting the information is first reserved at an access point to use a transmission path without collision of information transmission with other communication apparatuses. Namely, synchronous wireless communication is performed by mutually synchronizing with communication apparatuses in the wireless network by distributing access points.

In a case where asynchronous communication is to be performed between communication apparatuses on the transmission side and reception side in a wireless communication system having access points, this wireless communication requires by all means wireless communication via an access point so that there arises the problem that a transmission path use efficiency is decreased by half.

As another method of configuring a wireless network, "Ad-hoc communication" has been devised in which terminals perform wireless communication directly and asynchronously. It can be considered that the ad hoc communication in which arbitrary terminals perform wireless communication directly without using a particular access point is suitable particularly for a small scale wireless network configured with a relatively small number of clients positioned near each other.

For example, in a wireless LAN system of IEEE802.11 system, there is prepared an ad hoc mode which operates peer to peer in a self-organized manner without having a relation of a controlling station and a controlled station. In this operation mode, when a beacon transmission time comes, each terminal starts counting a random time period and in a case where it receives no beacon from another terminal by the end of the time period, it transmits a beacon.

Now, IEEE 802.11 is exemplified to describe the details of the conventional wireless networking.

The networking in the IEEE 802.11 is based on the concept of a basic service set (BSS). The BSS is composed of two kinds of modes, namely BSS defined by an infrastructure mode, in which a master such as an access point (AP) functioning as a controlling station exists, and an ad hoc mode composed of only a plurality of mobile terminals (MTs) functioning as mobile stations.

<Infrastructure Mode>

Referring to FIG. 26, the operation of the IEEE 802.11 at the time of the infrastructure mode is described. In the BSS at the time of the infrastructure mode, an AP performing coordination is indispensable in a wireless communication system.

The AP arranges a range in which radio waves can reach around a peripheral region of a local station as BSS, and configures a "cell" so referred to in a so-called cellular system. An MT existing in the neighbor of the AP is contained by the AP to enter the network as a member of the BSS. That is to say, the AP transmits a control signal called as a beacon at an appropriate time interval, and an MT capable of receiving the beacon recognizes the existence of the AP in its vicinity, and further the MT performs the establishment of a connection with the AP.

In the example shown in FIG. 26, a communication station STA0 operates as an AP, and the other communication stations STA1 and STA2 severally operate as an MT. Hereupon, the communication station STA0 as the AP transmits a beacon at a predetermined time interval as shown in a chart on the right side of the figure. The next transmission time of a beacon is informed in a beacon in a parameter format called as a target beacon transmission time (TBTT). Then, when time comes to the TBTT, the AP operates a beacon transmission procedure.

On the other hand, because the MT can recognize the next beacon transmission time by receiving a beacon and by decoding the TBTT field in the beacon, an MT existing around the AP sometimes enters its sleep state by turning off the power sources of its receiver until the next TBTT or a plurality of times later TBTT (in a case where no necessity exists for receiving).

In a case of the infrastructure mode, only the AP transmits a beacon at a predetermined frame period. On the other hand, the peripheral MT enters the network by receiving the beacons from the AP, and does not transmit any beacons. It is noted that the present invention principally aims to operate a network without intervening by any master controlling station such as the AP, and does not relate to the infrastructure mode directly. Accordingly, the infrastructure mode is not described any more.

<Ad Hoc Mode>

Referring to FIG. 27, the operation of the IEEE 802.11 at the time of the ad hoc mode on the other hand is described.

In an IBSS of the ad hoc mode, an MT defines an IBSS in a self-organized distributed manner after performing a negotiation among a plurality of MT's. When the IBSS has been defined, the MT group determines TBTTs at every fixed interval after negotiations. When each MT recognizes the arrival of a TBTT by referring to a clock in a local station, the MT transmits a beacon in a case where the MT recognizes that no MT has transmitted a beacon yet after a delay of a random time.

In the example shown in FIG. 27, a situation in which two MTs constitute an IBSS is shown. In this case, any one of the MTs belonging to the IBSS transmits a beacon every arrival of a TBTT. Moreover, there is also a case where beacons transmitted from each MT collide with each other.

Moreover, also in the IBSS, the MT's sometimes enter their sleep states in which the power sources of their transmitter-receivers are turned off as occasion demands (which will be described later).

<Transmission-Reception Procedures in IEEE 802.11>

Successively, the transmission and reception procedures in the IEEE 802.11 are described.

In a wireless LAN network in an ad hoc environment, it is generally known that a hidden terminal problem is generated. The hidden terminal means a communication station that, in a case of performing communication between certain specific communication stations, one of the communication stations of the communication party can listen but the other communication station of the communication stations cannot listen. Because the hidden terminals cannot perform any negotiation among them, there is the possibility that transmission operation collides with each other.

As a methodology for solving the hidden terminal problem, CSMA/CA (Carrier Sense Multiple Access Collision Avoidance) in accordance with a RTS/CTS (Request To Send/Clear To Send) procedure is known. The IEEE 802.11 also adopts the methodology.

Hereupon, the CSMA means a connection system for performing a multiple access on the basis of carrier detection. Because it is difficult to receive a signal the information of which has been transmitted by a local station in wireless communication, the confirmation of the nonexistence of the information transmission by other communication apparatuses is performed not in accordance with the CSMA/collision detection (CD) but in accordance with CSMA/collision avoidance (CA) system, and then its own information transmission is started. Thereby collisions can be avoided.

Moreover, in the RTS/CTS system, a communication station of a data transmission source transmits a transmission request packet RTS (request to send), and starts to transmit data in response to the reception of a confirmation information packet CTS (clear to send) from a communication station of a data transmission destination. Then, when the hidden terminal receives at least one of the RTS or the CTS, the hidden terminal can avoid a collision by setting a transmission suspension period of the local station for a period in which data transmission based on the RTS/CTS procedure is expected to be performed.

FIG. 28 shows an operation example of the RTS/CTS procedure. Incidentally, in the wireless communication environment, communication apparatus #1, #2, #3 and #4 are arranged to be in a state in which the communication apparatus #1 can communicate with its neighbor communication apparatus #2, and in which the communication apparatus #2 can communicate with its neighbor communication apparatus #1 and #3, and further in which the communication apparatus #3 can communicate with its neighbor communication apparatus #2 and #4, and still further in which the communication apparatus #4 can communicate with the neighbor communication apparatus #3, but in which the communication apparatus #1 is a hidden terminal for the communication apparatus #3, and further in which the communication apparatus #4 is a hidden terminal for the communication apparatus #2.

In the example shown in the figure, the communication apparatus #2, which transmits data, transmits a transmission request (RTS) to the communication apparatus #3, and the communication apparatus #3 sends back confirmation information (CTS) to the communication apparatus #2.

At this time, the communication apparatus #1 and #4, which are in the situation in which they can be hidden terminals from each of the communication apparatus #2 and #3, detect the use of transmission paths and perform the control of not performing transmission until the completion of the communication. In specific, the communication apparatus #1 detects the start of the data transmission of the communication apparatus #2 of a transmission source on the basis of an RTS packet, and thereby the communication apparatus #1 can recognize that the transmission path has been used already for a period from that to the completion of the successive transmission of the data packet. Moreover, the communication apparatus #4 detects the start of a data transmission the reception destination of which is the communication apparatus #3 on the basis of a CTS packet, and thereby the communication apparatus #4 can recognize that the transmission path has been already used for a period until the communication apparatus #4 detects the sending back of an ACK packet from the communication apparatus #3.

It is noted that, in a case where another communication apparatus happens to transmit some signal almost at the same time when the communication apparatus #2 of an information transmission source transmits the RTS, the signals collide with each other. Consequently, the communication apparatus #3 of the information reception destination cannot receive the RTS. In this case, the communication apparatus #3 does not send back the CTS. As a result, the communication apparatus #2 can recognize that the RTS has collided because the communication apparatus #2 does not receive the CTS for a while. Then, the communication apparatus #2 starts the procedure of the retransmission of the RTS while making random backoff effective. Basically, the communication apparatuses contend each other to acquire a transmission right while having a risk of a collision as above.

<Access Competing Method in IEEE 802.11>

Successively, an access competing method prescribed in the IEEE 802.11 is described.

In the IEEE 802.11, four kinds of packet intervals (IFS: inter frame space) are defined. Hereupon, three IFSs of them is described with reference to FIG. 29. As the IFSs, SIFS (short IFS), PIFS (PCF IFS) and DIFS (DCF IFS) are defined in the order of shortness.

In the IEEE 802.11, as a basic medium access procedure, the CSMA is adopted (as described above). Before a transmitter transmits something, the transmitter operates a timer of the backoff for a random time while monitoring a medium state, and the transmission right is not given to the transmitter until the state of the nonexistence of transmission signals during that period is confirmed.

When an ordinary packet is transmitted in accordance with the CSMA procedure (called as a distributed coordination function (DCF)), the medium state is first monitored only for DIFS after the transmission of some packet has been completed. In a case where no transmission signals exist during the period, the random backoff is performed. Moreover, in a case where no transmission signals exist also during the period of the random backoff, the transmission right is given to the transmitter.

On the other hand, when a packet having exceptionally high urgency such as an ACK is transmitted, the packet is allowed to be transmitted after the SIFS packet interval. Consequently, a packet having high urgency can be transmitted before a packet to be transmitted in accordance of the ordinary CSMA procedure.

In short, the reason why different kinds of packet interval IFS's are defined is that the priority setting of the transmission right competition of packets is performed according to which one of the SIFS, the PIFS and the DIFS the IFS is, namely according to the length of the packet interval.

<Signal Transmission/Reception Procedures in Sleep State>

In the networking in the IEEE 802.11, an MT sometimes enters a sleep state, in which the MT turns off the power source of the transmitter/receiver thereof even in a case of the IBSS at the time of the ad hoc mode as occasion demands. The processing procedure in this case is described with reference to FIG. 30.

In a case where the sleep mode is applied in the IBSS in the IEEE 802.11, a time zone for a while from a TBTT is defined as an announcement traffic indication message (ATIM) window. In the ATIM window time zone, all of the MTs belonging to the IBSS have their receivers operating, and consequently as long as in this time zone, even an MT operating in the sleep mode thereof can basically perform reception.

In the case where the local station includes the information addressed to someone, each MT notifies a reception side of that the local station is holding the transmission information, by transmitting an ATIM packet to a communication party in the ATIM window time zone. An MT which has received the ATIM packet has the receiver thereof operating until the completion of the reception from the station which has transmitted the ATIM packet.

In the example shown in FIG. 30, a case where three MTs STA1, STA2 and STA3 exist in the IBSS is exemplified. When a TBTT arrives, each of the MTs STA1, STA2 and STA3 monitors a medium state for a random time while having the timer of the backoff operating. In the example shown in the figure, the backoff timer of the MT STA1 terminates at the earliest time, and then the MT STA1 transmits a beacon. Because the MT STA1 has transmitted the beacon, the MTs STA2 and STA3, which have received the beacon, do not transmit any beacon.

Moreover, in the example shown in FIG. 30, the MT STA1 holds the information addressed to the MT STA2, and the MT STA2 holds the information addressed to the MT STA3. In this case, after the MTs STA1 and STA2 have transmitted/received beacons, the MTs STA1 and STA2 again severally monitor the medium state for a random time while having their timers of backoff operating. In the example shown in the figure, because the timer of the MT STA2 has terminated earlier, an ATIM message is first transmitted from the MT STA2 to the MT STA3. When the MT STA3 receives the ATIM message, the MT STA3 feeds back the fact of the reception to the MT STA2 by transmitting an acknowledgment (ACK) packet to the MT STA2.

After the completion of the transmission of the ACK packet from the MT STA3, the MT STA1 further monitors each medium state for a random time while having the timer of the backoff operating. When the backoff timer terminates, the MT STA1 transmits an ATIM packet to the MT STA2. The MT STA2 performs feedback to the MT STA1 by sending back an ACK packet indicating the reception of the ATIM packet.

After such exchanges of the ATIM packet and the ACK packet have been performed in the ATIM window, even in the following sections, the STA3 has the receiver thereof operating for receiving the information from the MT STA2, and similarly the MT STA2 has the receiver thereof operating for receiving the information from the MT STA1.

The MTs STA1 and STA2, both holding transmission information, severally monitor the medium state for a random time when the ATIM window has ended while having the timer of the backoff operating. In an example shown in FIG. 30, because the timer of the MT STA2 has terminated earlier, the information addressed to the MT STA3 has been transmitted from the MT STA2 to the MT STA3 earlier. After the completion of the transmission, the MT STA1 again monitors the medium state for a random time while having the timer of the backoff operating. When the timer terminates, the MT STA1 transmits a packet to the MT STA2.

In the procedure described above, a communication station which does not receive any ATIM packets in the ATIM window or a communication station which holds no information addressed to anyone can turn off the power source of the transmitter/receiver thereof until the next TBTT, and thereby can reduce the power consumption thereof.

[Non-Patent Document 1]
International Standard ISO/IEC 8802-11:1999(E) ANSI/IEEE Std 802.11, 1999 Edition, Part II: Wireless LAN Medium Access Control (MAC) and Physical Layer (PHY) Specification

[Non-Patent Document 2]
ETSI Standard ETSI TS 101 761-1 V1.3.1 Broadband Radio Access Networks (BRAN); HIPERLAN Type 2; Data Link Control (DLC) Layer; Part 1: Basic Data Transport Functions

[Non-Patent Document 3]
ETSI Standard ETSI TS 101-761-2 V1.3.1 Broadband Radio Access Network (BRAN); HIPERLAN Type 2; Data Link Control (DLC) Layer; Part 2: Radio Link Control (RLC) sublayer (1) Congeniality with Broadcast Communication In the IEEE 802.11, communication addressed to Broadcast/Multicast is defined. In this case, however, a reply of an ACK packet being a reception confirmation response signal is not performed. Because the basic access method is the CSMA, there is a possibility that transmission signals collide with each other, but there is no means for judging the signal collision in the broadcast communication of the ad hoc mode. Moreover, it is also considerable to transmit directional data to a plurality of stations by a plurality of times. In this case, because the data is transmitted to specific stations, reception confirmation responses can be obtained. However, the method of transmitting the same data many times always with risks of the collision with the transmission signals of the other stations is not efficient. As described above, the broadcast communication in the ad hoc mode generally has not good congeniality.

(2) Congeniality with Short Packet

In the IEEE 802.11, a fixed overhead is generated at a head of a packet irrespective of the data quantity to be transmitted. In a case where the data quantity to be transmitted by one packet is large, the ratio of the overhead against the packet quantity is small. However, when the data quantity to be transmitted is small, a phenomenon in which the overhead is larger than a data area is produced according to circumstances, and then resource use efficiency is remarkably lowered.

(3) Congeniality with Traffic Requiring Short Latency

As described above, the IEEE 802.11 is a system defined on the premise of allowing the generation of data collisions by the CSMA, and the data collision is covered by retransmission. At the time of performing the retransmission, the random backoff is again set, and the backoff value is set to become larger by the rate of power of two every retransmission. Consequently, in the environment in which a plurality of communication stations tries to perform transmission at the same time, there is the possibility that some delays are produced until the data transmission of the communication stations is completed. Consequently, a problem arises at the time of traffic accommodation requiring a short latency.

(4) Lowering Power Consumption

In the IEEE 802.11, a power saving mode as a low power consumption use is defined. A station which has transmitted a beacon needs to have the receiver thereof operating until the ATIM window which is started continuously to the next beacon transmission ends. For example, in a case where an IBSS is configured between two stations, it is necessary to have their receivers operating at an hour rate of 50% or more statistically irrespective of the existence of data transmission. Consequently, the effect of lowering the power consumption is low. For example, in an application applying wireless communication to game controllers in a case where a plurality of users play a match, it is necessary to perform the broadcast delivery of a command input into one machine to the controllers of all of the users. Hereupon, individual input command is formed as a short packet, but a short latency is required for proceeding the processing of a game. Moreover, it is expected that the game controllers are severally driven by a battery, and then the lowering of the power consumption of the game controllers is desired. Accordingly, the game controllers are in their sleep states except for the time of packet transmission and reception.

SUMMARY OF THE INVENTION

It is an object of the present invention is to provide an excellent wireless communication system, a wireless communication apparatus, a wireless communication method and a computer program, in all of which each communication station operates in a self-organized distribution manner so that a wireless network is suitably built.

It is another object of the present invention is to provide an excellent wireless communication system, a wireless communication apparatus, a wireless communication method and a computer program, in all of which communication stations can perform efficient data communication in accordance with access control based on CSMA in a self-organized distribution type network environment.

It is a further object of the present invention to provide an excellent wireless communication system, a wireless communication apparatus, a wireless communication method and a computer program, all capable of realizing information transmission of a short packet with a short latency while achieving the lowering of the power consumption of a communicator in a self-organized distribution type network environment.

The present invention was made in consideration of the above problems. A first aspect of the invention is a self-organized distribution type wireless communication system in which each communication station mutually transmits a beacon describing information pertaining to a network in a predetermined frame period to build a network. In the wireless communication system, each communication station provides predetermined reception periods before and after a beacon transmission time of a local station, and each communication station performs reception processing before and after a beacon transmission time of a next communication station transmitting a beacon next to the local station, and further each communication station performs data transmission before and after a beacon transmission time of a communication station of a data transmission destination at a time of a data transmission.

It should be noted that the "system" used in this specification means a logical collection of a plurality of apparatus (or functional modules realizing specific functions) and does not specifically refer to whether or not each apparatus or function module is accommodated in a single housing.

In the self-organized distribution type communication environment, each communication station notifies beacon information in a predetermined time interval to inform its existence and to inform a network configuration to other communication stations in the neighbor (i.e., in a communication range). Moreover, each communication station executes a scan operation on each channel for receiving beacon signals to detect entering into the communication range of a neighbor station, and can participate the communication range in the state of recognizing the network configuration by decoding the information described in the beacon.

Then, a newly entered communication station performs the confirmation of the existence of a beacon transmitted from neighboring stations by the scan operation trying for signal reception for a predetermined period continuously. In a case where no beacons are received from the neighboring stations in this process, the communication station sets suitable beacon transmission timing. On the other hand, in a case where the communication station has received a beacon transmitted from a neighboring station, the communication station refers to neighbor apparatus information described in each received beacon to set the timing at which no existing stations transmit any beacons as the beacon transmission timing of the local station. Thereby, collisions are avoided.

Hereupon, because the basic access method is the CSMA in such a self-organized distribution type wireless communication network, the collisions of signals cannot be judged though there is the possibility that the signals collide with each other. Consequently, there is a problem that the congeniality with broadcast communication is not good. Moreover, because a fixed overhead arises at the head of a packet irrespective of the data quantity to be transmitted, the congeniality with a short packet is not good. Moreover, because the CSMA premises that the collisions of signals are permitted, a problem arises at the time of traffic accommodation requiring a short latency. Moreover, each communication station needs to make its receiver operate at an hour rate of 50% or more statistically, and consequently the effect of lowering power consumption is low.

On the contrary, according to the present invention, the broadcast communication of a short packet can be realized with a short latency in a self-organized distribution type wireless communication network.

In a self-organized distribution network according to the present invention, the communication station performs reception processing before and after the beacon transmission time of the next communication station transmitting a beacon next to the local station, and performs data transmission before and after the beacon transmission time of a communication station of a data transmission destination at the time of the data transmission. Consequently, in a case where a certain communication station transmits information toward all of the other communication stations, each communication station can execute information transmission in a bucket-relay system, that is, a bucket-brigade system, in which information is sequentially transmitted to the next communication station transmitting a beacon next to the local station in the frame period by using reception periods provided before and after the beacon transmission time of the next communication station.

That is to say, by the so-called bucket-brigade transmission system, in which one-to-one information interchange between communication stations is iterated by using the reception period of each communication station provided on the basis of adjacent beacon receiving times, information interchange of the information transmitted from a certain information transmission source can be performed with all of the communication stations in one frame period.

Consequently, because the information transmission to all of the communication stations is completed in one frame period, the information transmission needs only a short latency, and then the delivery of data in a definite period of time is basically enabled. Moreover, it becomes unnecessary to transmit a short packet many times with the possibility of collisions. Moreover, because it is unnecessary to perform the management by a specific controlling station, the congeniality with a self-organized distribution type network is good. Moreover, because each communication station mutually performs data transmission by providing reception periods before and after beacon transmission timing, the receiver can be operated only in the minimum necessary time zone. Consequently, the effect of the lowering of power consumption is improved.

For example, the following configuration may be adoptable. That is to say, after data indicating the intension of performing information transmission, i.e. a page packet as an advance announcement signal, has been sequentially transmitted from a communication station of an information transmission source to all of the other communication stations in one frame by the bucket-brigade information transmission system, the communication station of the information transmission source transmits net transmission information continuously to the beacon transmission of the local station in the next frame period, and the other communication stations receives the beacon and the transmission information in the receiving timing of the beacon from the information transmission source.

In such a case, because the other communication stations recognize that the communication station of the information transmission source performs the transmission of information on the basis of the data received one frame before, the other communication stations return to their active states from their sleep states in synchronization with the beacon receiving timing from the information transmission source, and consequently can receive the beacon and the transmission information. Because such an information broadcast communication system does not need the management by a specific controlling station, the information broadcast communication system has good congeniality with the self-organized distribution type network.

Moreover, each of the other communication stations may be configured in order that, when the communication station receives the transmission information from the information transmission source without error, the communication station may transmit a reception confirmation response indicating that the communication station could receive the information continuously to the transmission of a beacon of the local station in the next frame period. On the other hand, because the communication station of the information transmission source can recognize that a reception confirmation response is transmitted as a reply from each of the other communication stations after the communication station has transmitted information, the communication station performs reception processing in its active state continuously to the beacon transmission of each of the communication stations, and receives the reception confirmation responses.

Thereby, the communication station of the information transmission source can confirm with a short latency that the transmitted information has distributed widely to each communication station without error. Hereupon, in a case where the reception confirmation response cannot be recognized, for example, the same information is again re-transmitted to the communication station in neighbor of the beacon transmission time of the communication station. The procedure may be performed by following the transmission procedure steps using ordinary random backoff together by the CSMA.

Moreover, in stead of performing the above-described processing as follows: a page packet as an advance announcement signal is transmitted by the bucket-brigade transmission in one frame from the communication station of the information transmission source to all of the other communication stations and the net transmission information is transmitted in the next frame period, the bucket-brigade transmission of the net transmission information may be started from the first without any advance notice.

Moreover, when net information is transmitted by the bucket-brigade system, two or more communication stations can transmit information at the same time in the same frame period.

For example, in a case where a communication station has the information which the local station wants to transmit, the communication station may add (i.e. multiplex) the information which the local station wants to transmit to the information received from a previous communication station transmitting a beacon before the local station in the frame period, before the communication station transmits the information to the next communication station transmitting a beacon next to the local station.

In such a case, the information added by the local station is transferred among each communication station in the system by the bucket-brigade system, and some time the information returns to the local station. Consequently, the communication station can recognize that the transmission processing of the information has been completed by a fact that the local station received the information which the local station had transmitted by the information transmission system.

Moreover, in a case where the communication station failed in the information transmission to the next communication station transmitting a beacon next to the local station, the communication station can try the information transmission again by using a reception period after the beacon transmission of the next communication station in the same frame period.

Then, in a case where the communication station failed in the information transmission and the retransmission thereof to another communication station in this reception period, the communication station gives up the information transmission to the station within the frame period. Then, the communication station adds the information indicating the communication station to which the transmission failed to transmission information, and then the communication station tries to perform information transmission to the communication station transmitting a beacon next to the other communication station in the frame period.

In such a case, the information to which the communication station the transmission addressed to which has failed is added some time arrives at the communication station of the information transmission source by the bucket-brigade transmission system. Then, in a case where the information of the communication station the transmission addressed to which has failed is added when the communication station of the information transmission source receives the information which the local station has transmitted by the information transmission system, the communication station starts the retransmission procedure to the communication station. Alternatively, the communication station may perform the information transmission again in accordance with the information transmission system instead of performing the retransmission procedure to the specific station.

Moreover, in a case where a plurality of communication stations transmits information in the same frame period, an information group is formed by the successive addition (multiplexing) of information. In such a case, there is a possibility that the data quantity exceeds the quantity up to which the data can be transmitted and the data overflows.

For avoiding the overflow state of the data quantity like this, when the data quantity of a received information group exceeds a certain threshold value, each communication station may perform the processing of not transmitting the information to be transmitted from the local station until a next super frame. For example, a communication station refers to at least one of the quantity of received information, the quantity of the information which the local station wants to transmit, and the quantity of the information which the local station has lately transmitted, and determines the existence or nonexistence of the information transmission from the local station within the frame period.

According to the present invention, in a system including a beacon transmission time of each communication station and reception periods before and after the beacon transmission time in a predetermined frame period, information can be sequentially transmitted in accordance with the arrangement order in the frame period by the bucket-brigade system as in the present invention. In this case, however, there is a problem that a short latency less than the frame period cannot be realized.

As a measure of this problem, in a case where the adoption of the short latency less than the frame period is compelled by an upper layer of the communication protocol or the like, each communication station may periodically interpolate the prescribed beacon transmission interval in the frame period. For example, in a case where each communication station severally periodically interpolates by N beacons within the frame period, the number of the reception periods becomes N times according to the number of the beacons. Consequently, the system can perform communication as if the system is configured to have a 1/N frame period, and thereby a further short latency can be realized.

Moreover, a second aspect of the present invention is a computer program described in a computer readable format for executing processing on a computer system, the processing being for performing wireless communication operation in a self-organized distribution type communication environment built by the transmission of beacons describing the information pertaining to a network at a predetermined time interval by each communication station. The computer program includes:

a beacon transmission step for transmitting a beacon of a local station at a predetermined beacon transmission timing;

a beacon transmission time management step for grasping a beacon transmission time of a neighboring station;

a reception processing step for performing reception processing before and after a beacon transmission time of a next communication station transmitting a beacon next to the local station; and a transmission processing step for performing information transmission before and after a beacon transmission time of a communication station of a data transmission destination.

The computer program according to the second aspect of the present invention defines a computer program described in the computer readable form for realizing predetermined processing on a computer system. In other words, by installing the computer program according to the second aspect of the present invention in a computer system, cooperative operation is exhibited on the computer system, and the computer system operates as a wireless communication apparatus. By starting a plurality of wireless communication apparatuses like this to build a wireless network, the operation and effects similar to those of the wireless communication system according to the first aspect of the present invention can be obtained.

According to the present invention, it is possible to provide an excellent wireless communication system, a wireless communication apparatus, a wireless communication method and a computer program, in all of which communication stations can perform efficient data communication by access control by the CSMA in a self-organized distribution type network environment.

Furthermore, according to the present invention, it is possible to provide an excellent wireless communication system, a wireless communication apparatus, a wireless communication method and a computer program, all of which achieve the lowering of the power consumption of communicators while broadcast communication of a short packet can be realized with a short latency in a self-organized distribution type network environment.

According to the present invention, it is possible to provide information commonly owned in a system by broadcast communication efficiently. Moreover, it becomes unnecessary to transmit a short packet several times with the possibility of collisions, and the delivery of data in a basically definite period of time becomes possible. Furthermore, because it becomes possible to operate a receiver only in a minimum necessary time zone, the effect of the lowering power consumption is improved.

Other objects, features and advantages of the present invention will become apparent from the preferred embodiments of the present invention to be described later and the more detailed description given in conjunction with the accompanying drawings.

BRIEF DESCRIPTION OF THE DRAWINGS

FIG. 9 is a view for explaining a system of a first embodiment with regard to an information transmission procedure in a wireless communication network of a self-organized distribution type according to the present invention.

FIG. 10 is a view schematically showing a data structure of a data packet (page packet) informing that a communication station 0 desires to transmit information to each communication station.

FIG. 13 is a view for explaining a system of a second embodiment with regard to an information transmission procedure in a wireless communication network of a self-organized distribution type according to the present invention.

FIG. 22 is a view showing a shortened operational example of a super frame.

FIG. 26 is a view for explaining an operation in an infrastructure mode in a wireless network based on IEEE 802.11.

FIG. 27 is a view for explaining an operation in an ad-hoc mode in a wireless network based on IEEE 802.11.

DESCRIPTION OF PREFERRED EMBODIMENTS

Figure 1:
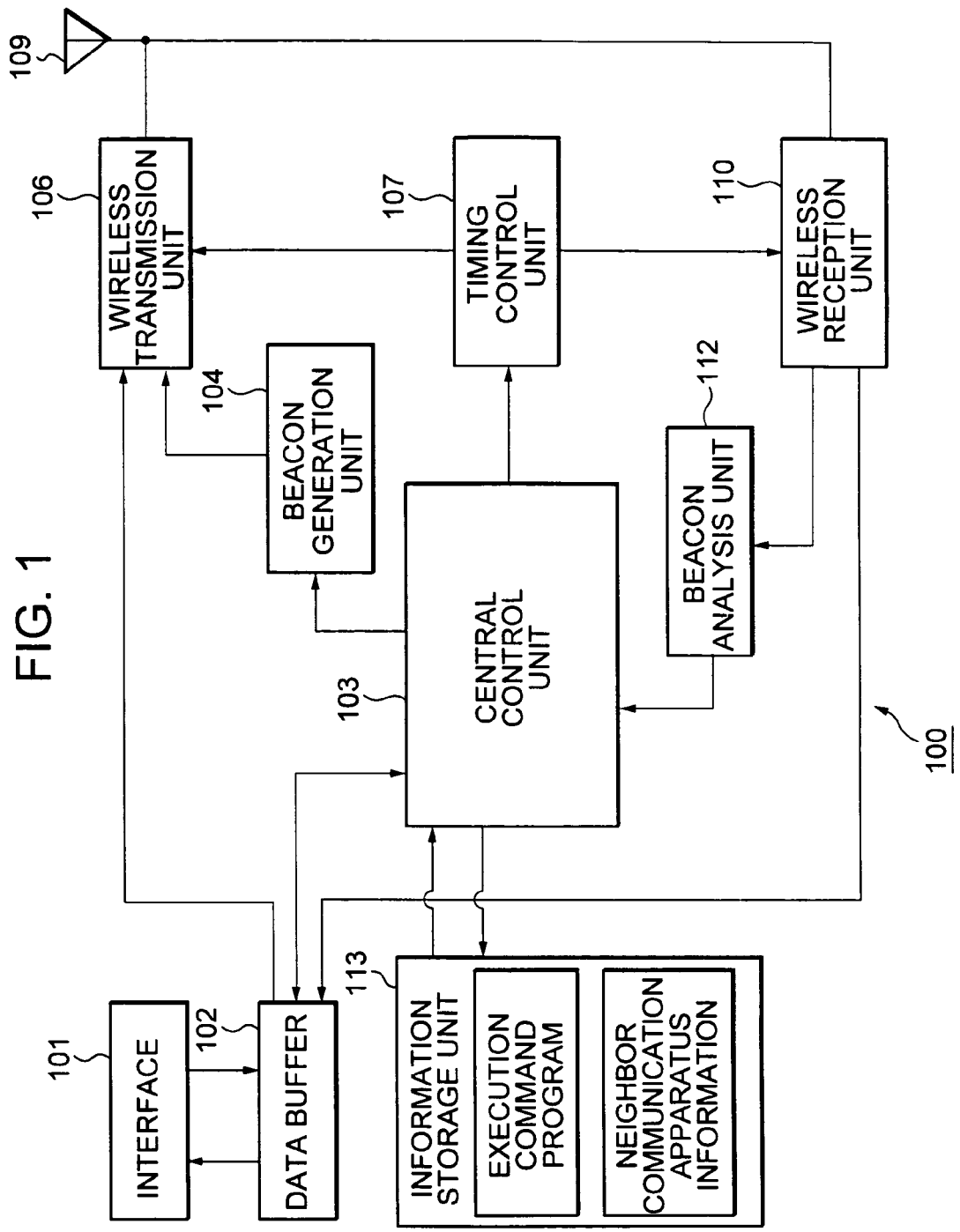
FIG. 1 is a view schematically showing a functional construction of a wireless communication apparatus operating as a communication station in a wireless network according to a preferred embodiment of the present invention.

The preferred embodiments of the present invention are described in detail with reference to the drawings.

A. System Configuration

Communication transmission paths assumed in the present invention are wireless, and a network is built among a plurality of communication stations. Communication assumed in the present invention is traffics of a storage switch type, and information is transferred in the unit of a packet. Moreover, in the following description, a single channel is supposed to each communication station, but it is also possible to extend the channel to one using a transmission medium composed of a plurality of frequency channels, i.e. a multi-channel.

A wireless network system according to the present invention has a self-organized distribution type system structure without disposing a coordinator, and executes a transmission control effectively utilizing channel resources by using a transmission (MAC) frame having a loose time division multiple access structure. Moreover, each communication station can also execute ad hoc communication for direct and asynchronous information transmission in accordance with an access procedure based on a carrier sense multiple access (CSMA: carrier detection multiple connection).

In the self-organized distribution type wireless communication system without particularly disposing a controlling station as described above, each communication station notifies beacon information on a channel to let another communication station in the neighbor (i.e., within a communication range) know the existence of the local communication station and informs of a network configuration. Because a communication station transmits a beacon at the head of a transmission frame period, the transmission frame period is defined with a beacon interval. Moreover, each communication station finds a beacon signal transmitted from a neighboring station by performing scan operation on a channel for a period corresponding to a transmission frame period, and can know the network configuration (or enter the network) by decoding the information described in the beacon.

Incidentally, the self-organized distribution type wireless communication network according to the present embodiment supposes an application in which wireless communication is applied to a case of game controllers in a case where a plurality of users performs a competition, and the self-organized distribution type wireless communication network performs the broadcast delivery of a command input on a machine to the controllers of all of the users. It is supposed that all of the communication stations, each functioning as a game controller, are within mutual communication ranges and there is not the so-called hidden terminal problem. As it will be described later, the self-organized distribution type wireless communication network according to the present embodiment aims at the lowering of the power consumption of a communicator while realizing the broadcast communication of a short packet with a short latency.

FIG. 1 schematically shows a functional construction of a wireless communication apparatus operating as a communication station in a wireless network according to a preferred embodiment of the present invention. The shown wireless communication apparatus can form a network while avoiding collisions by effectively performing a channel access in the same wireless system in a self-organized distribution type communication environment, in which no controlling stations are arranged.

As shown in the figure, a wireless communication apparatus 100 is composed of an interface 101, a data buffer 102, a central control unit 103, a beacon generation unit 104, a wireless transmission unit 106, a timing control unit 107, an antenna 109, a wireless reception unit 110, a beacon analysis unit 112 and an information storage unit 113.

The interface 101 exchanges various kinds of information with an external apparatus (e.g., a personal computer (not shown) or the like) connected to the wireless communication apparatus 100.

The data buffer 102 is used for temporarily storing data sent from an apparatus connected via the interface 101 or data received via a wireless transmission path, before the data is sent out via the interface 101.

The central control unit 103 performs the management of a series of information transmission and reception processing at the wireless communication apparatus 100 and the access control of a transmission path in an integrated manner. Basically, on the basis of the CSMA, the central control unit 103 monitors the state of the transmission path while having the backoff timer operating for a random time, and performs access contention for acquiring a transmission right in a case where no transmission signals exist during this period.

The access control according to the present embodiment premises that the arising of collisions of data is permitted by the CSMA, but as it will be described later, the access control efficiently provides the information commonly owned in a system by broadcast communication. Moreover, it becomes unnecessary to transmit a short packet many times with the possibility of collisions, and the delivery of data in a basically definite period of time (i.e. with a short latency) becomes possible.

Moreover, the central control unit 103 controls the low power consumption operation of an apparatus in an integrated manner. The wireless communication apparatus 100 basically operates in a sleep mode, but a time zone for a while from beacon transmission timing TBTT is set as an "ATIM window". In the time zone of the ATIM window, all of the communication apparatus in the system operate their receivers. Moreover, reception periods are provided before and after the beacon transmission timing TBTT. In the present embodiment, at the time of the broadcast communication of the information commonly owned in the system, a receiver is operated only in the minimum necessary time zone (which will be described later), and thereby the effect of the low power consumption is improved.

The beacon generation unit 104 generates a beacon signal to be periodically exchanged with a wireless communication apparatus in the neighbor. In order that the wireless communication apparatus 100 may run the wireless network, its own beacon transmission position, its own beacon reception position from a peripheral station, and the like are stipulated. These pieces of information are stored in the information storage unit 113 and written in a beacon signal to be notified to a wireless communication apparatus existing therearound.

The wireless transmission unit 106 performs predetermined modulation processing in order to wirelessly transmit data and a beacon signal, which are temporarily stored in the data buffer 102. Moreover, the wireless reception unit 110 performs the reception processing of a signal such as the information and a beacon transmitted from another wireless communication apparatus at a predetermined time.

Various communication systems suitable for relatively short distance communication, which can be applied to, for example, a wireless LAN, can be applied to the wireless transmission/reception system in the wireless transmission unit 106 and the wireless reception unit 110. In specific, the ultra wide band (UWB) system, the orthogonal frequency division multiplexing (OFDM) system, the code division multiple access (CDMA) system and the like can be adopted.

The antenna 109 wirelessly transmits signals to another wireless communication apparatus on a predetermined frequency channel, or collects signals transmitted from another wireless communication apparatus. The present embodiment is configured to have a single antenna and not to perform transmission and reception in parallel.

The timing control unit 107 controls timing for transmitting and receiving wireless signals. For example, the timing control unit 107 controls its own beacon transmission timing at the head of a transmission frame period, the receiving timing of a beacon from another communication apparatus, a scan operation period, the setting of the ATIM window and a reception period, the transmission timing (the setting of the packet interval IFS and backoff) of each packet (such as RTS, CTS, data and ACK), and the like.

The beacon analysis unit 112 analyzes a beacon signal which can be received from a neighbor station to analyze the existence and the like of another wireless communication apparatus in the neighbor. For example, the information such as the reception timing of a beacon of the adjoining station and the reception timing of a neighbor beacon is stored in the information storage unit 113 as neighbor apparatus information.

The information storage unit 113 stores execution procedure commands of a series of access control operations and the like to be executed by the central control unit 103 (programs describing access control procedure and the like), neighbor apparatus information obtained by an analysis result of a received beacon, and the like.

In the self-organized distribution type network according to the present embodiment, each communication station notifies beacon information at a predetermined time interval on a predetermined channel to let another communication station in the neighbor (i.e., in a communication range) know the existence of the local communication station, and informs of a network configuration. The present specification defines a transmission frame period for transmitting a beacon as a "super frame", and supposes that it is, for example, 80 milliseconds.

A newly entering communication station can detect that it entered a communication range, while listening to a beacon signal from a peripheral region station by scan operation, and can know the network configuration thereof by decoding the information written in the beacon. Then, while loosely synchronizing with the reception timing of the beacon, the newly entering communication station sets the beacon transmission timing of the local station at the timing at which no beacons from the neighboring stations are transmitted.

B. Building of Super Frame

Each communication station notifies beacon information to let another communication station in the neighbor (i.e., in a communication range) know the existence of the local communication station, and informs of a network configuration. A beacon transmission period is defined as a "super frame (T_SF)", and it is supposed to be, for example, 80 milliseconds.

A beacon transmission procedure at each communication station according to the present embodiment will be described with reference to FIG. 2.

Assuming that information transmitted by a beacon is 100 bytes, the time taken to transmit it is 18 μs. Since one transmission is executed every 80 ms, a media occupying factor by a beacon at each communication station is as sufficiently small as one 4444-th.

Each communication station synchronizes loosely while listening to a beacon transmitted in a neighboring area. When a new communication station appears, the new communication station sets its own beacon transmission timing so as not to collide with the beacon transmission timing of already existing communication stations.

In a case where there are no communication stations in a neighboring area, a communication station 01 can start transmitting a beacon at a proper timing. A beacon transmission interval is 80 ms. In an example of the uppermost stage shown in FIG. 2, B01 indicates the beacon transmitted from the communication station 01.

Every communication station newly entering the communication range thereafter sets its own beacon transmission timing so as not to collide with the arrangement of already existing beacons.

Figure 2:
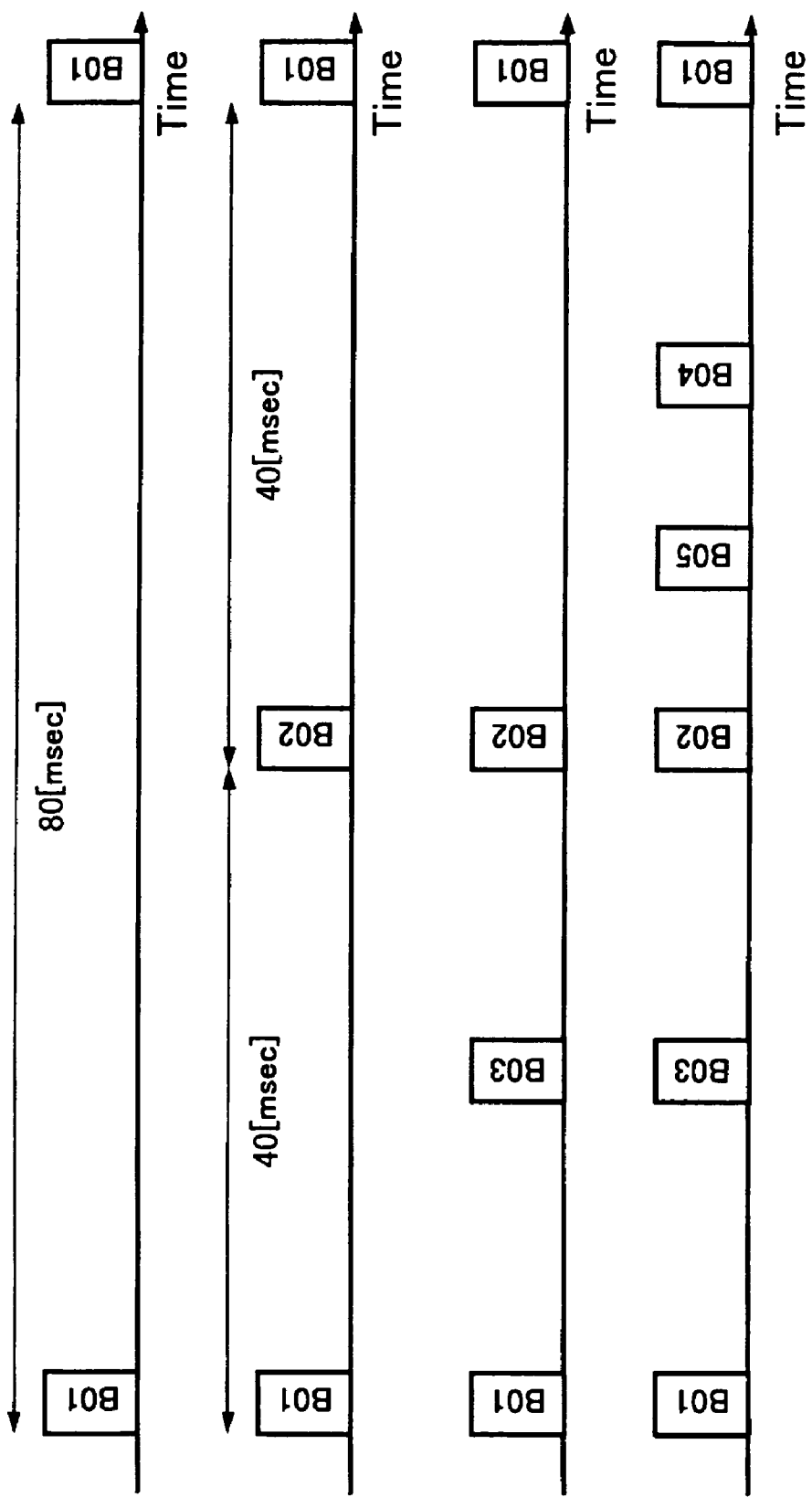
FIG. 2 is a view for explaining a procedure for each communication station to transmit a beacon in a self-organized distribution type network according to the present invention.

It is assumed for example that a new communication station 02 appears on a channel in which only the communication station 01 exists as shown in the uppermost stage of FIG. 2. In this case, the communication station 02 receives the beacons from the communication station 01 to recognize its existence and beacon positions, and as shown at the second stage of FIG. 2, sets its own beacon transmission timing generally at the middle of the beacon interval of the communication station 01 to start beacon transmission.

It is also assumed that another new communication station 03 appears. In this case, the communication station 03 receives at least one of the beacons transmitted from the communication station 01 and the communication station 02 to recognize the existence of these already existing communication stations. As shown at the third stage of FIG. 2, the communication station 03 starts transmission generally at the timing of the middle of the interval of beacons transmitted from the communication station 01 and the communication station 02.

Subsequently, each time a new communication station enters an area in the neighbor in accordance with the similar algorithm, the beacon intervals are narrowed. For example, as shown at the lowermost stage of FIG. 2, a communication station 04 appearing next sets its beacon transmission timing at generally the middle of the beacon interval set by the communication station 02 and the communication station 01, and a communication station 05 appearing second next sets its beacon transmission timing at generally the middle of the beacon interval set by the communication station 02 and the communication station 04.

A minimum beacon interval Bmin is defined so that the band (super frame period) is not get flooded with beacons. Two or more beacon transmission timings are not permitted to be set in Bmin. For example, in a case where the minimum beacon interval Bmin is defined to be 5 ms in the super frame period of 80 ms, sixteen communication stations can be accommodated to the maximum in the range where radio waves can reach.

At the time of arranging a new beacon in the super frame, because each communication station acquires a transmission prioritized period (TPP) just after a beacon transmission (which will be described later), it is preferable for transmission efficiency that on one channel the beacon transmission timing of each communication station is uniformly dispersed in the super frame period rather than being crowded. Consequently, in the present embodiment, as shown in FIG. 2, transmission of a beacon is basically set to be started at an approximately the middle in the time zone in which the beacon interval is longest within a range in which a communication station can listen by its own. Incidentally, there is another use method in which each piece of beacon transmission timing of each communication station is arranged to be concentrated and reception operation is stopped in the residual super frame period to decrease the power consumption of apparatus.

Figure 3:
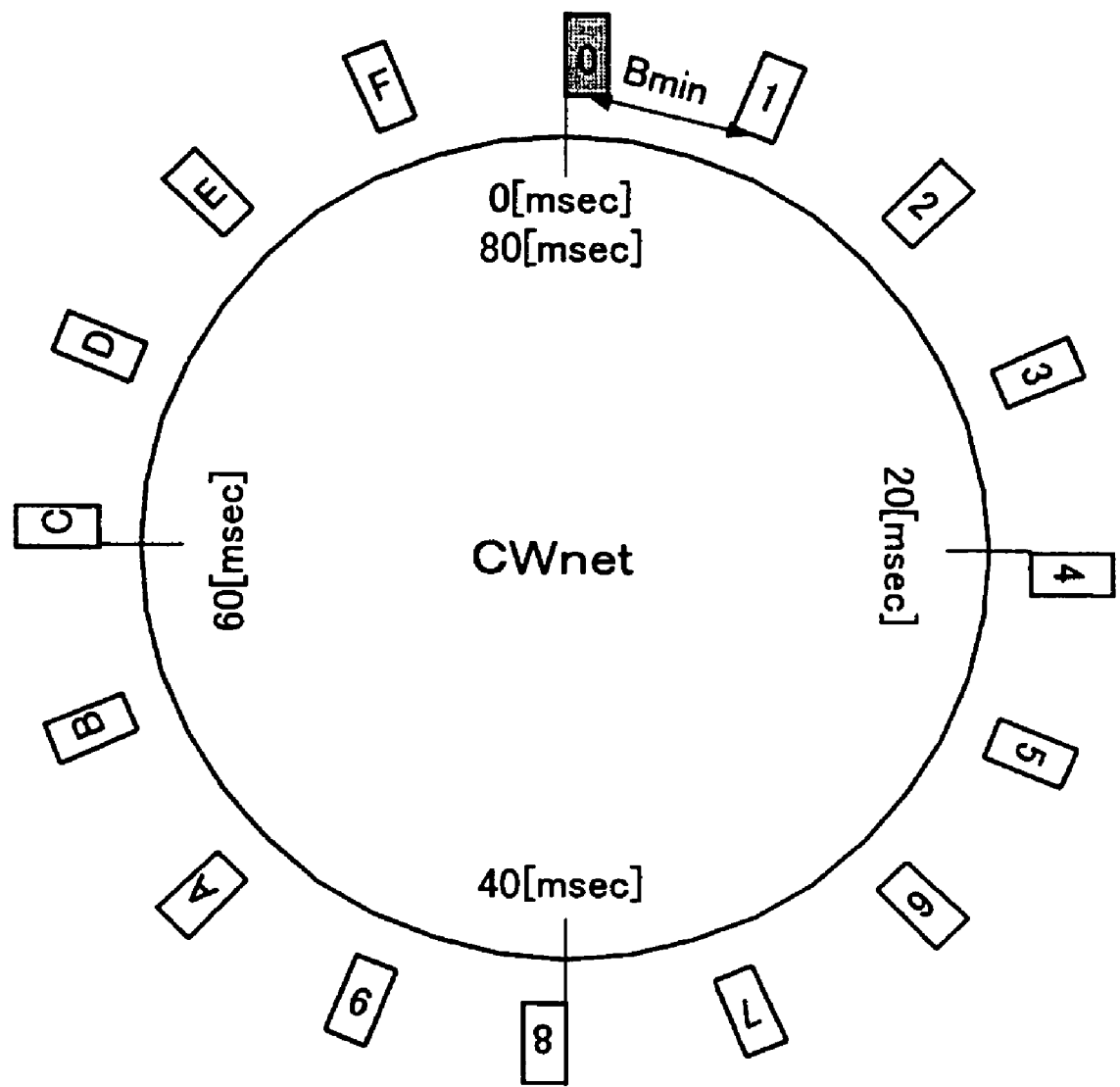
FIG. 3 is a view showing a structural example of beacon transmission timings arrangeable within a super frame period.

FIG. 3 shows an example of the configuration of beacon transmission timing arrangeable in a super frame period. Incidentally in this example shown in FIG. 3, a lapse of time in the super frame period of 80 ms is drawn as a clock whose hour hand moves on a ring in a clockwise direction. Hereinafter, such a communication system is also called as a "CW net (Consumer Wireless Network)".

In the example shown in FIG. 3, sixteen positions 0 to F constitute times at which beacon transmission can be performed, namely as "slots" where beacon transmission timing can be arranged. As described with reference to FIG. 2, it is assumed that beacons are disposed in accordance with the algorithm that beacon transmission timing of new entry stations is sequentially set generally at the middle of a beacon interval set by already existing communication stations. If Bmin is set to 5 ms, beacons can be arranged in one super frame up to 16 to the most. That is to say, 16 or more communication stations cannot enter the network.

A communication station manages the information pertaining to the beacon transmission timing of the local station and beacon receiving timing from a peripheral region station in the super frame by means of data described in a bit map format called as the neighboring beacon offset information (NBOI). The communication station includes the NBOI to beacon information to notify the neighboring station of the beacon information.

In the present embodiment, because the slots arrangeable 16 beacons to the most in one super frame are prepared as shown in FIG. 3, the information pertaining to the arrangement of the beacons which could be received is described in a bit map format of a 16-bit length. That is to say, transmission times TBTT of the normal beacons of the local station are mapped in a leading bit (MSB: most significant bit) of an NBOI field, and each of the other slots is mapped at bit positions corresponding to relative positions (offsets) using the TBTT of the local station as a reference. Then, 1 is written at the bit position corresponding to each slot of the transmission beacons and the receivable beacons of the local station, and the other bit positions are left in the state of being 0.

Figure 20:
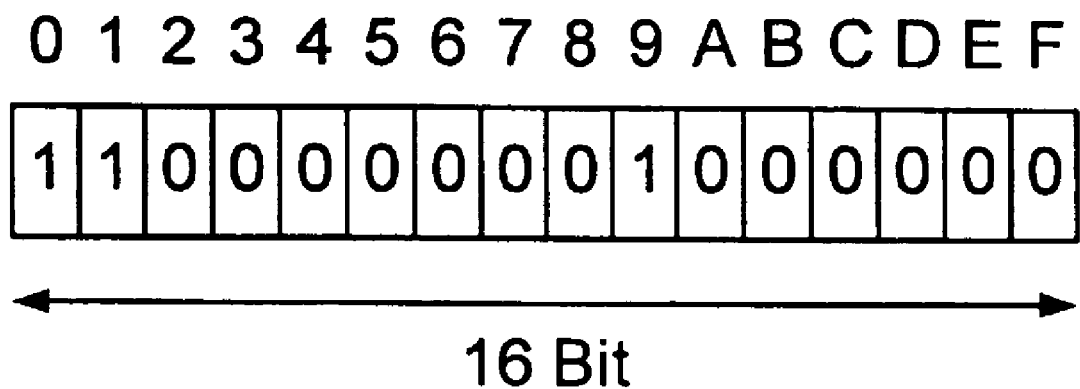
FIG. 20 is a view showing a description example of an NBOI.

FIG. 20 shows a description example of the NBOI. In the example shown in the figure, the communication station 0 produces an NBOI field of "1100,0000,0100,0000". This indicates that the communication station 0 shown in FIG. 3 notifies that "the beacons from the communication stations 1 and 9 can be received" in the communication environment in which the communication stations 0 to F severally set TBTT in each slot containable 16 stations to the most as shown in FIG. 3. That is to say, in a case where a beacon can be received related to each bit of the NBOI corresponding to the relative position of a received beacon, a mark is allotted, and in a case where the beacon is not received, a space is allotted. Moreover, the reason why the MSB is 1 is that the local station transmits a beacon, and the place corresponding to the time when the local station transmits the beacon is also marked.

When each communication station receives mutual beacon signals on a certain channel, the communication channel can avoid the collisions of beacons on a channel while arranging its own beacon transmission timing, or while detecting the receiving timing of a beacon from a peripheral region station on the basis of the description of NBOI included in the beacon signals.

Figure 21:
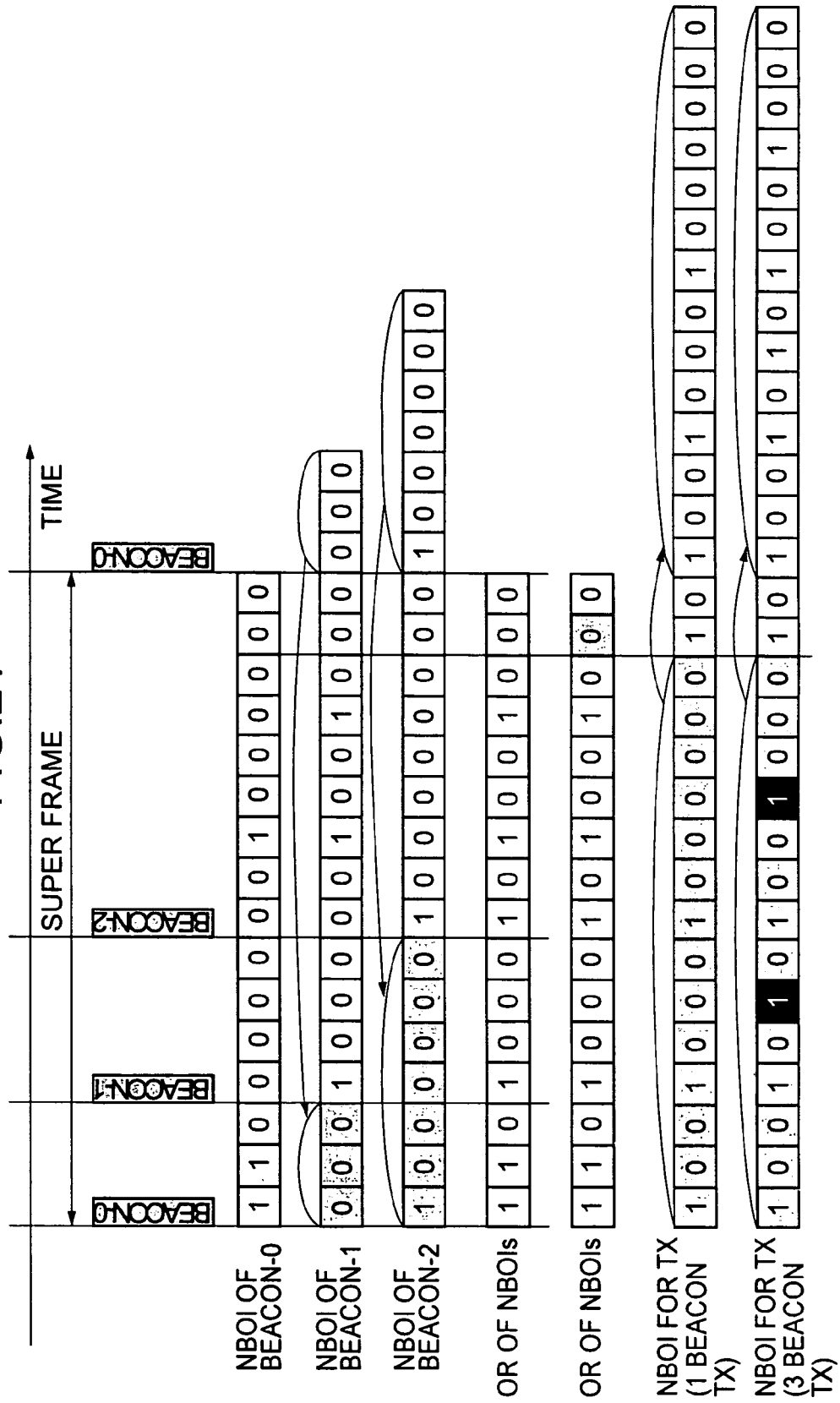
FIG. 21 is a view showing a state of a newly entering communication station sets a TBTT of its local station on the basis of an NBOI of each beacon obtained from a beacon received from a neighboring station.

FIG. 21 shows the situation of setting the TBTT of the local station on the basis of the NBOI of each beacon obtained from the beacon which a newly entered communication station has received from a peripheral region station.

After the throwing in of the power source, the communication station first tries to perform a scan operation, namely tries to perform to receive a signal continuously for a super frame length or longer, and performs the existence confirmation of a beacon transmitted from a neighboring station. When no beacons have been received from neighboring stations in this process, the communication station sets suitable timing as the TBTT. On the other hand, when the communication station has received a beacon transmitted from a neighboring station, the communication station shifts the NBOI field of each beacon received from the neighboring station according to the reception time of the beacon while obtaining a logical sum (OR) of them, and refers. Thereby, the communication station extracts beacon transmission timing in the timing corresponding to bit positions which have not been marked, finally.

In the example shown in FIG. 21, a newly appeared communication station A is noticed, and a communication environment in which there are communication stations 0, 1 and 2 in a peripheral region of the communication station A is supposed. Then, it is supposed that the communication station A could receive beacons from the three stations 0 to 2 in a super frame by scan operation.

The NBOI field describes the receiving times of beacons from the peripheral region stations as relative positions to the normal beacon of the local station in a bit map format (as described above). Accordingly, the communication station A shifts the NBOI fields of the three beacons which could be received from the peripheral region stations according to the reception time of each beacon to align the corresponding positions of bits on a time axis, and the communication station A obtains OR of the NBOI bits at each timing to refer.

A series obtained as a result of consolidating the NBOI fields of the peripheral region stations to refer is "1101,0001, 0100,1000" shown by being indicated as "OR of NBOIs" in FIG. 21. In the series, 1 denotes a relative position at the timing at which the TBTT has been already set in the super frame, and 0 denotes a relative position at the timing at which the TBTT is not set. In this series, the longest run length of a space (zero) is three, and there are two positions of candidates. In the example shown in FIG. 21, the communication station A sets the fifteenth bit in the series as the TBTT of the normal beacon of the local station.

The communication station A sets the time of the fifteenth bit as the TBTT of the normal beacon of the local station (namely the head of the super frame of the local station), and starts to transmit a beacon. The NBOI field transmitted by the communication station A at this time is one describing each reception time of the beacons of the communication stations 0 to 2 capable of receiving a beacon in the bit map format in which the bit position corresponding to the relative position from the transmission time of the normal beacon of the local station is marked. This NBOI field is the one shown in FIG. 21 as "NBOI for TX (1 Beacon TX)".

It is noted that, when the communication station A transmits an auxiliary beacon with the object of obtaining a priority transmission right or the like, the communication station A, further after this, searches the longest run length of the space (zero) of the series shown as "OR of NBOIs" consolidating the NBOI fields of the neighboring stations, and sets the transmission time of the auxiliary beacon at the place of the searched out space. In the example shown in FIG. 21, a case where two auxiliary beacons are transmitted is supposed, and the transmission timing of the auxiliary beacons is set at the times of the spaces at the sixth bit and the eleventh bit of "OR of NBOIs". In this case, the NBOI field transmitted by the communication station A has marks also at the place where the local station performs beacon transmission (a relative position to the normal beacon) in addition to the relative positions from the normal beacon of the local station and the received beacons from the neighboring stations, and is in the state shown in "NBOI for TX (3 Beacon TX)".

In a case where each communication station sets the beacon transmission timing TBTT of the local station by the above-mentioned processing procedure and transmits a beacon, the collisions of the beacons can be avoided in the condition in which each of the communication stations stand still and the arrival ranges of radio waves do not change. Moreover, by transmitting auxiliary beacons (or a signal similar to a plurality of beacons) in a super frame according to the priority of transmission data, it is possible to assign resources preferentially to provide QoS (quality of service) communication. Moreover, by referring to the number of beacons (NBOI fields) received from peripheral regions, each communication station can autonomously grasp the degree of saturation of the system. Consequently, it becomes possible to perform the containing of a priority traffic while including the degree of saturation of the system in every communication station, though the system is a disperse control system. Moreover, because beacon transmission times are arranged in order not to collide with each other by the reference of the NBOI fields of the beacons received by each communication station, the situation in which collisions frequently occur can be avoided even if a plurality of communication stations contains priority traffics.

Incidentally, though it is not clearly shown in FIGS. 2 and 3, each beacon is transmitted at a time including an intentional offset by a short time from a target beacon transmission time (TBTT), which is the transmission time of each beacon. The offset is called "TBTT offset". In the present embodiment, the value of the TBTT offset is determined by using pseudorandom numbers. The pseudorandom numbers are determined by a uniquely determined pseudo-random sequence TOIS (TBTT offset indication sequence), and the TOIS is updated every super frame period.

By providing the TBTT offset, actual beacon transmission times can be shifted from each other even if two communication stations arrange their beacon transmission timing in the same slot on a super frame. Even if beacons collide with each other in a certain super frame period, each communication station can listen to mutual beacons (or communication stations in the neighbor can listen to the beacons of both of them) in another super frame period. The communication stations notify the peripheral region stations of the beacon information including TOIS set every super frame period.

C. Realizing Short Latency by Shortening Super Frame (Periodical Interpolation of Beacon)

The present invention requires short latency while having the object of solving the problem at the time of performing broadcast communication addressed to many communication stations. There is also a case where a short latency shorter than 80 milliseconds is compelled as a requirement of traffic. In such a case, a single communication station transmits a plurality of beacons (auxiliary beacons) in a super frame, and thereby it becomes possible to perform data transfer in a shorter latency.

The state shown in the left side in FIG. 22 is an initial state of a super frame. The length of the super frame is 80 milliseconds, and the minimum beacon interval is set to be 5 milliseconds, communication stations are contained in the super frame up to 16 to the maximum. Hereupon, a case where there are only four stations of a communication station 0, a communication station 1, a communication station 2 and a communication station 3 in the neighborhood and information transmission and reception with a short latency is hoped is supposed.

In this case, each of the communication stations 0-3 begins to transmit beacons at a 20-millisecond interval four times (namely, a normal beacon and three auxiliary beacons) in the super frame. Consequently, each communication station transmits one beacon for 20 milliseconds. As shown on the right side in FIG. 22, it is possible to perform communication as if one super frame is made of the period of 20 milliseconds.

By periodically interpolating in a super frame using the auxiliary beacons in this way, the transmission and the reception of information in a shorter latency in comparison with a case where the length of a super frame is 80 milliseconds are enabled. In the example shown in FIG. 22, a case where four communication stations exist is supposed, but in a case where only two exist, it is naturally possible to constitute a 20 millisecond virtual super frame. Moreover, it is also possible to constitute a 10 millisecond virtual super frame (not shown). In those cases, the number of times of beacon transmission per super frame is determined according to the requirement of an application (the upper layer of a communication protocol).

D. Guarantee of Communication Band Using Transmission Prioritized Period TPP

The wireless communication apparatus 100 operating as a communication station performs transmission control using a transmission channel effectively by means of a transmission (MAC: media access control) frame having a loose time division multiple access structure, or communication operation such as random access based on CSMA/CA in a communication environment in which no specific controlling stations are disposed.

Figure 4:
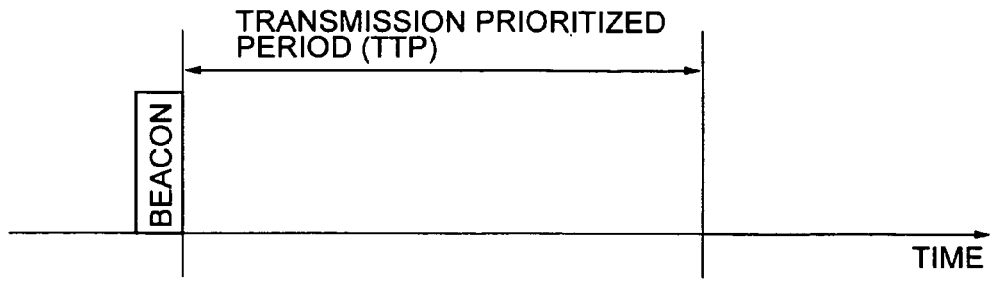
FIG. 4 is a view showing a state in which priority is given to a beacon transmitting station.

Although each communication station transmits beacons at a constant interval in the present embodiment, the station having transmitted the beacon is assigned a transmission priority during some period after the beacon was transmitted. Thereby, comings and goings of signals are managed to be distributed in a self-organized manner for securing a communication band (QoS). FIG. 4 shows how the priority is assigned to the station having transmitted a beacon. This priority section is defined as a transmission prioritized period (TPP) in the present specification.

Figure 5:
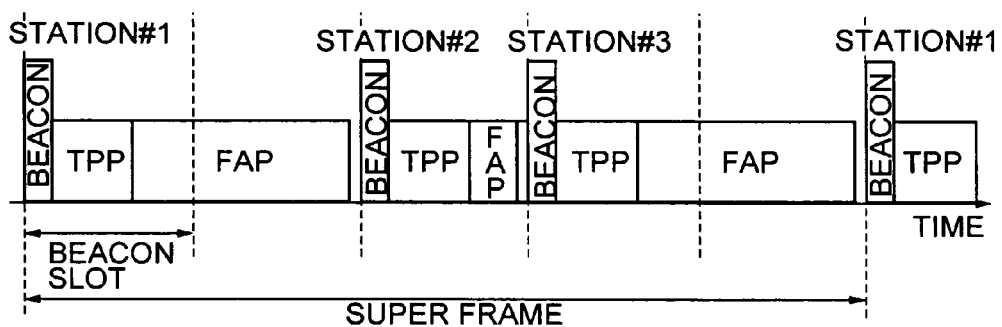
FIG. 5 is a view showing a structural example of the super frame period.

FIG. 5 shows an example of the structure of a super frame period (T_SF) in a case where the transmission prioritized period (TPP) is given to the station transmitting a beacon. As shown in FIG. 5, after each communication station has transmitted a beacon, a TPP is assigned to the communication station having transmitted the beacon. A section succeeding to the TPP is defined as a fairly access period (FAP), and communication is performed between communication stations by the ordinary CSMA/CA system. Then, the FAP ends at the timing of transmitting of a beacon from the next communication station, and after that, TPPs and FAPs of beacon transmission stations similarly continue.

Each communication station basically transmits a beacon once in every super frame period. But, according to circumstances, each communication station is permitted to transmit a plurality of beacons or signals similar to beacons, and can acquire a TPP every transmission of a beacon. In other words, each communication station can secure resources for preferential transmission according to the number of beacons transmitted every super frame period. Hereupon, a beacon which a communication station transmits without fail at the head of a super frame period is called "normal beacon", and the second and following beacons transmitted at the other timing for TPP acquirement or with another object are called "auxiliary beacons".

Figure 6:
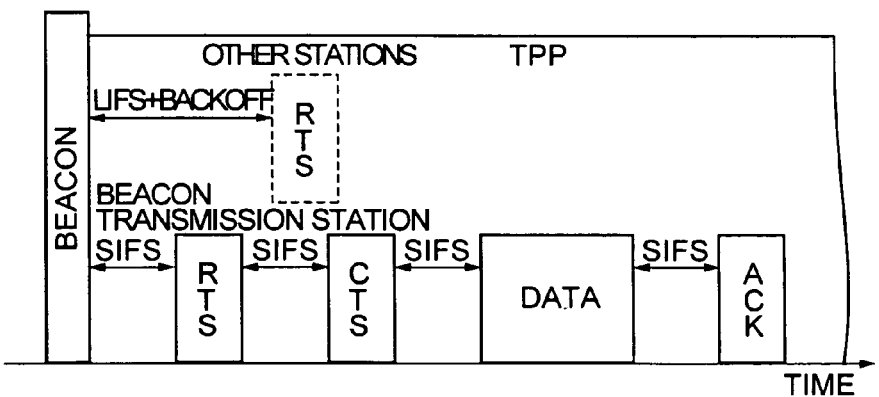
FIG. 6 is a view for explaining an operation in which the beacon transmitting station and the other station acquire a transmission right within a TPP period.

FIG. 6 illustrates the operation for the obtainment of a transmission right of a beacon transmission station and the other stations in a TPP.

After the beacon transmission station has transmitted a beacon of the local station, the beacon transmission station operates in a priority transmission mode, and can start transmission after a shorter packet interval SIFS. In the shown example, the beacon transmission station transmits an RTS packet after the SIFS. Then, also after that, each of the transmitted packets CTS, data and ACK is transmitted with the packet interval of the SIFS similarly, and thereby a series of communication procedures can be executed without being hindered by neighbor stations.

On the other hand, the other stations operating in their ordinary operation modes first monitor the medium state for a packet interval LIFS longer than the SIFS after the beacon has been transmitted. In a case where the medium is in a clear condition, that is, there are no transmission signals, during this period, the other stations perform random backoff. Furthermore, in a case where no transmission signals exist also in this period, a transmission right is given to the other stations. Consequently, when the beacon transmission station previously transmits an RTS signal after the elapse of the SIFS, the other stations cannot start their transmission.

Figure 7:
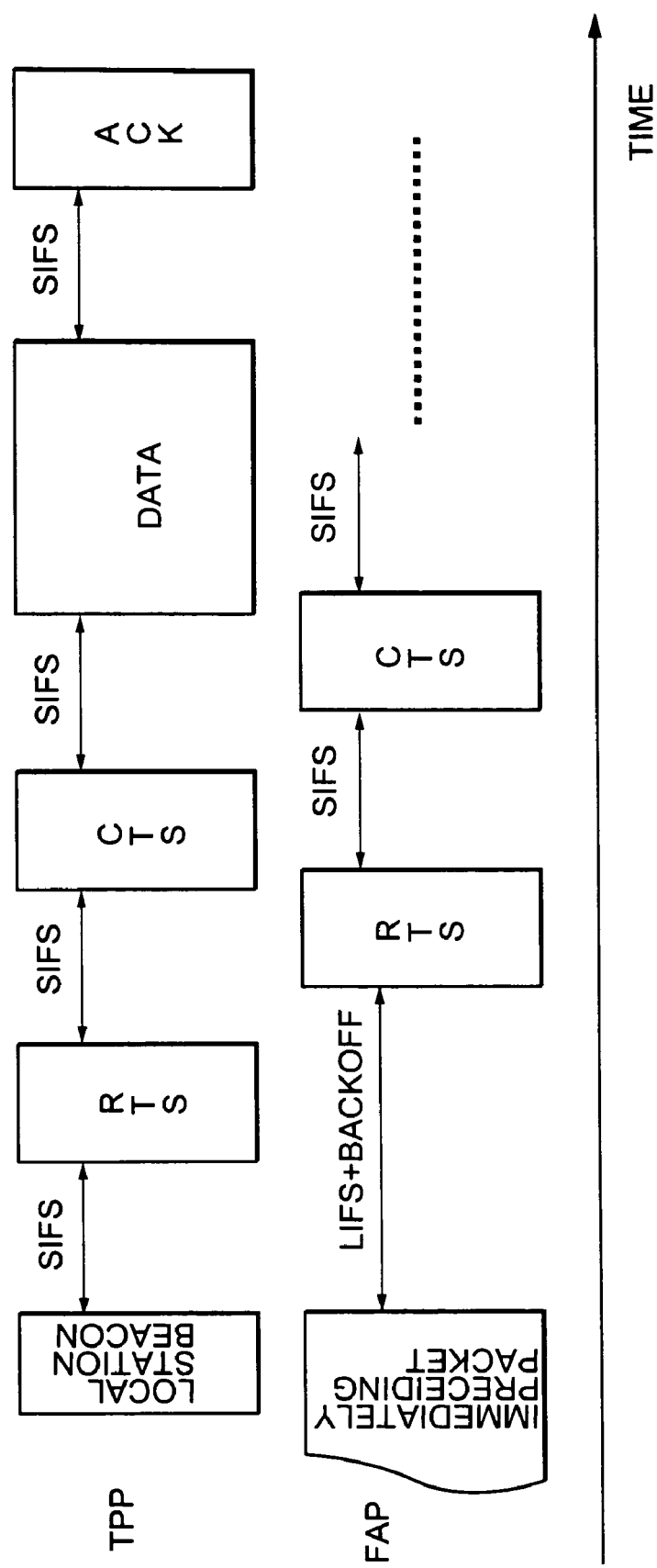
FIG. 7 is a view for explaining an operation in which a communication station starts transmission in the TPP period and an FAP period, respectively.

FIG. 7 illustrates operation of a communication station for starting transmission in a TPP and a FAP respectively.

In the TPP, after the communication station has transmitted a beacon of the local station, the communication station can start its transmission after a shorter packet interval SIFS. In the shown example, the beacon transmission station transmits an RTS packet after the SIFS. Then, also after that, each of the transmitted packets CTS, data and ACK is transmitted with the packet interval SIFS similarly. Thereby, a series of communication procedures can be executed without being hindered by any neighbor stations.

On the other hand, in the FAP, the beacon transmission station starts its transmission after waiting for LIFS+random backoff similarly to the other neighboring stations. In other words, transmission right is uniformly given to all of the communication stations due to the random backoff. In the shown example, after a beacon of another station has been transmitted, first the medium state is monitored only for the LIFS. In a case where the medium is in a clear condition, that is, no transmission signals exist, during this period, random backoff is performed. Furthermore, in a case where no transmission signals exist also in this period, the RTS packet is transmitted. Incidentally, the series of the packets CTS, data, ACK and the like, which are transmitted by being caused by the RTS signal, are transmitted with the packet interval SIFS. Thereby, the series of communication procedures can be executed without being hindered by the neighbor stations.

E. Transmission and Reception Procedures in Steady State

Each communication station does not always receive a beacon from another station every time. There is also a case where each communication station lowers the reception frequency thereof by an instruction from an upper layer or the like. Transmission and reception procedures in this case are described with reference to FIG. 8.

Figure 8:
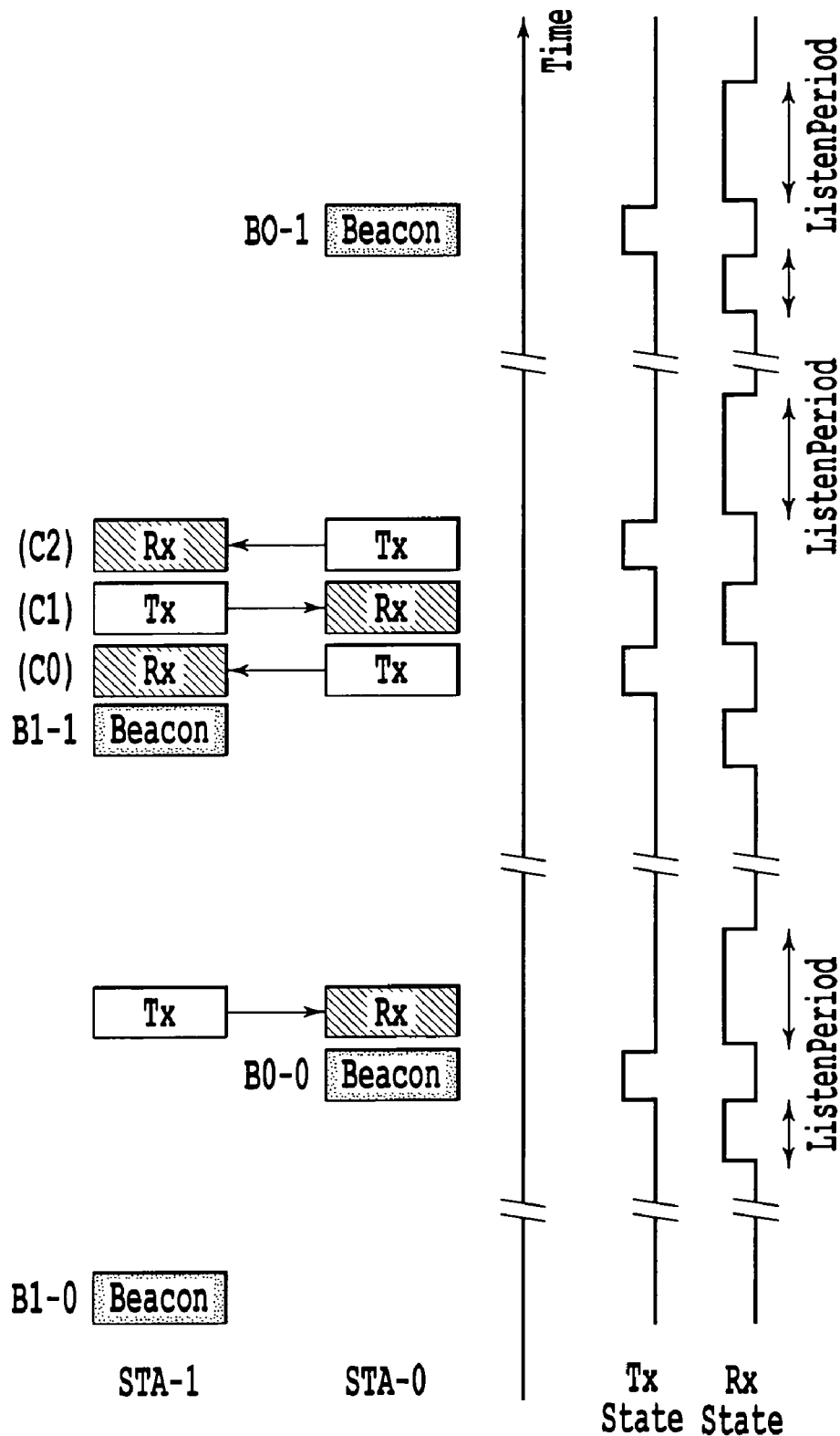
FIG. 8 is a view for explaining an operational example of a typical transmission/reception procedure by the communication station.

In the example shown in FIG. 8, a case where transmission is performed from a communication station STA0 to a communication station STA1 is shown. A sequence diagram of packets which are transmitted and received between the STA0 and the STA1 is shown in the upper stage of the figure, and states of a transmitter-receiver of the STA0 (the communicator is in its active state in the high state, and the communicator is in its sleep state in the low state) in the low stage of the figure.

The STA1 transmits a beacon after confirming that the medium is clear. At this time, the STA0 is in its sleep state, and does not receive any beacons. After that, the STA0 transmits a beacon at the beacon transmission time of the local station. The STA1 transmits paging information to the STA0 in accordance with a fixed random backoff procedure by being triggered by the reception of the beacon of the STA0.

Because the STA0 is operating the receiver thereof over a predetermined reception period (Listen Period) after the beacon transmission, the STA0 can receive the paging information. That is to say, when the STA0 receives the paging information, the STA0 can know that the STA1 holds the information addressed to the local station.

After that, when a beacon transmission time of the STA1 arrives, the STA0 tries to receive the information from the STA1 on the basis of the previous paging information, and receives the beacon of the STA1. It is supposed that the STA0 is called by the information in the beacon. The STA0 receiving the beacon performs a response to the page (C0). The response is to be transmitted in the TPP of the STA1, and has obtained a priority right, and consequently the response is transmitted in the SIFS interval. After this, because transmission and reception between the STA1 and the STA0 in the TPP has obtained the priority right, the transmission and the reception are transmitted at the SIFS interval.

When the STA1 having received the response confirms that the STA0 is in a receivable state, the STA1 transmits a packet addressed to the STA0 (C1). The STA0 having received the packet confirms that the packet has been normally received, and then transmits an ACK packet (C2). After that, the STA0 has the receiver thereof operating for a predetermined reception period (Listen Period), and confirms that no packets addressed to the local station have been received. Then the STA0 changes its state to the sleep sate.

The signal transmission and reception procedures pertaining to the above-mentioned steady state of the communication stations are summarized. As for the transmission of signals, the paging information is transmitted immediately after the beacon transmission on the reception side, and thereby the reception side changes its state to the active state thereof to start the transmission and reception processing.

Alternatively, the transmission and reception processing is started with the calling of the beacons on the transmission side after that as the beginning. Then, after the reception side has performed the transmission and reception of the last packet, tries to receive a packet for a while. When no packets addressed to the local station arrive, the reception side moves to the sleep state thereof. After that, the communication station returns to the active state thereof by the reception of a beacon from another station or the transmission of a beacon of the local station as a trigger. And as it is mentioned here in this example, the paging information is transmitted immediately after the beacon transmission on the communication party. But, there also exists such situation that the paging information is transmitted immediately before the beacon transmission on the communication party.

F. First Embodiment of Information Transmission Procedures

In the present invention, in the self-organized distribution type wireless communication network as described above, the broadcast communication of a short packet can be realized with a short latency. As it will be described later, information transmission procedures by the broadcast communication have good congeniality with the self-organized distribution type network.

FIG. 9 illustrates the construction of a first embodiment pertaining to the information transmission procedures in the self-organized distribution type wireless communication network according to the present invention.

The example shown in the figure therein contains the beacon transmission timing TBTT of four communication stations 0, 4, 8 and C at every 20 microseconds at regular intervals in a super frame of a CW net configured at the period of 80 microseconds, and beacons are almost periodically transmitted in the order of the communication stations 0, 4, 8 and C, as shown in the figure. It is supposed here that all of the communication stations exist in a communication range and there are no hidden terminal problems. Each communication station grasps the existence of communication stations in peripheral regions and the beacon transmission time of each communication station on the basis of the reception timing of beacons and the NBOI information described in beacons. Moreover, it is supposed that, in a steady state in which no transmission and reception data arises, each communication station performs the reception operation thereof only in time zones (Listen Periods) before and after the beacon transmitted by the local station.

A case where the communication station 0 performs the transmission of information to all of the communication stations in such a premise is described.

Before the transmission of information, the communication station 0 notifies each communication station of the data for transmitting (notifying beforehand) the transmission of the information, i.e. a page packet (paging frame). The communication station 0 transmits a page packet to the communication station 4 transmitting a beacon next to the local station.

Figure 10:
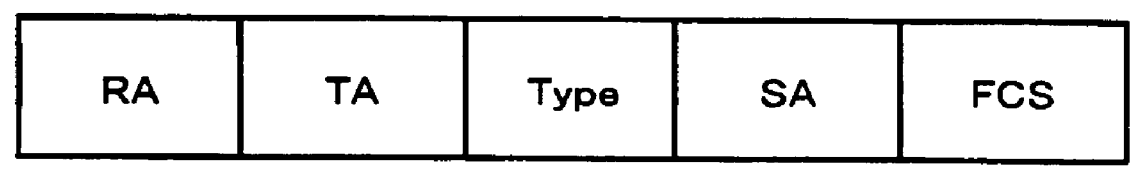

FIG. 10 schematically shows the data structure of a data packet (page packet) to be used for transmitting the intention of performing the transmission of information from the communication station 0 to each communication station in a bucket-brigade system. As shown in the figure, the inside of the packet is composed of an address (RA) field of a communication station of a reception destination, an address (TA) field of a communication station of a transmission source, a Type field indicating that the packet is a page packet, an address (SA) field of the communication station of an information transmission source, and an information (FCS) field for performing the error correction of the packet frame.

The communication station 4 having received the page packet recognizes that the information transmission from the communication station 0 is performed from now on, and transmits a page packet having received from the communication station 0 to the communication station 8 transmitting a beacon next to the local station.

Similarly, the communication station 8 having received the page packet recognizes that the information transmission from the communication station 0 is performed, and transmits the page packet having received from the communication station 4 to the communication station C transmitting a beacon next to the local station.

The communication station C having received the page packet recognizes that the information transmission from the communication station 0 is performed, and transmits the page packet having received from the communication station 8 to the communication station 0 transmitting a beacon next to the local station.

It should be noted that there is also a case where the communication station C does not transmit any page packets to the communication station 0 because the communication station transmitting a beacon next to the local station is a sending source of the information. Moreover, in a case where the existence of a new communication station which the local station does not recognize cannot be denied, there is also a case where each communication station continuously operates the receiver thereof after the transmission of the beacon of the local station and thereby tries to recognize the time when a beacon is transmitted next to the local station.

According to the above-mentioned information transmission and reception procedures of the bucket-brigade system, the communication station 0 can notify each of all of the other communication stations in one super frame of the data, i.e. a page packet, telling the intention of the information transmission to each communication station. Then, the communication station 0 transmits net transmission information successively to the beacon transmission of the local station in a super frame next to the super frame in which the communication station 0 transmitted the data.

On the other hand, because the communication stations 4, 8 and C have severally recognized that the information transmission from the communication station 0 is performed on the basis of the previously received data, the communication stations 4, 8 and C receive the transmission beacon and the transmission information of the communication station 0 at their beacon receiving timing from the communication station 0. Moreover, when the communication stations 4, 8 and C have received the information without error, they severally transmit a reception confirmation response indicating the reception of the information continuously to the transmission of their own beacons.

After the communication station 0 has transmitted the information, the communication station 0 receives the reception confirmation responses transmitted continuously to the beacon transmission of the communication stations 4, 8 and C, and confirms that the transmitted information has without error distributed widely to each communication station. In a case where the communication station 0 cannot recognize any reception confirmation response here, the communication station 0 again retransmits the same information to the communication station at the beacon transmission time near to that of the communication station. The procedure may be performed by following the steps of the ordinary transmission procedure according to the CSMA using the random backoff together.

It is noted that, in the above description, because the information transmitted continuously to the beacons and the reception confirmation responses ACK can be preferentially transmitted with the short packet intervals SIFS as described with reference to FIGS. 4-7, the possibility of signal collisions can be avoided. Moreover, the information and reception confirmation responses transmitted continuously to the beacons are sometimes transmitted as the packets different from the beacons, but they are sometimes multiplexed in the same packets together with the beacons.

Figure 11:
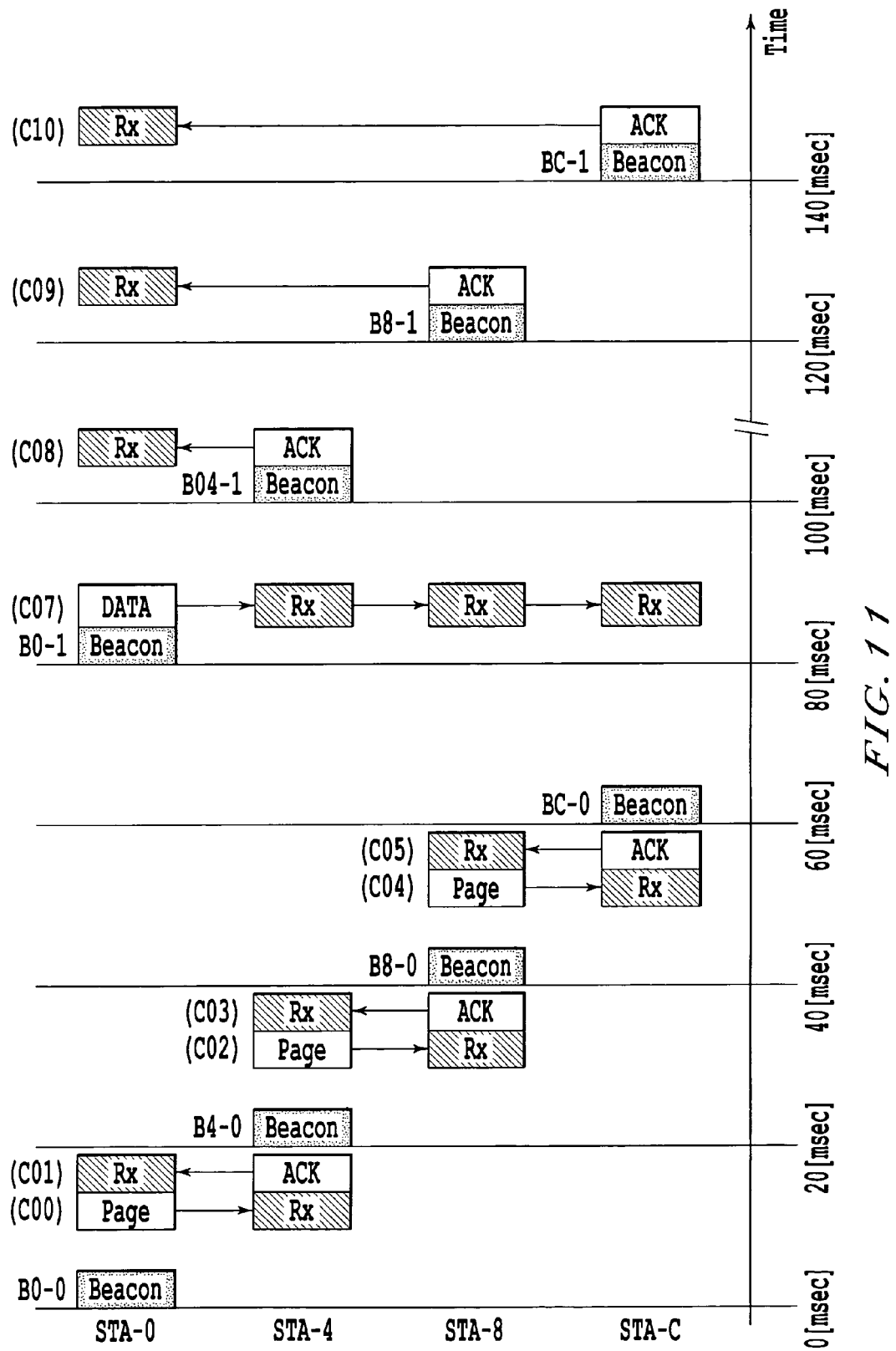
FIG. 11 is a view precisely showing an operational example of an information transmission/reception procedure of a bucket-brigade system as shown in FIG. 9.

FIG. 11 shows an operation example of the information transmission and reception procedures of the above-mentioned bucket-brigade system in detail. It should be noted that, similarly to the case shown in FIG. 9, the communication situation is supposed as follows: in a super frame of a CW net formed of an 80-microsecond period, the beacon transmission timing TBTT of four communication stations 0, 4, 8 and C is contained at every 20 microseconds at regular intervals, and beacons are almost periodically transmitted in the order of the communication stations 0, 4, 8 and C. Then, the communication station 0 transmits information to all of the other communication stations.

For notifying the communication station 4 transmitting a beacon on the CW net next to the local station of the data telling the intention of transmitting information to each communication station before the transmission of the information, the communication station 0 transmits the data, i.e. a page packet, immediately before the beacon transmission time of the communication station 4 (C00).

Because the communication station 4 has the receiver thereof operating before and after its own beacon transmission time, the communication station 4 can receive the page packet from the communication station 0, and then can recognize the existence of the transmission information transmitted from the communication station 0 as the information transmission source. And, the communication station 4 sends back a reception confirmation response ACK to the transmitted information (C01). In the shown example, the communication station 4 transmits the ACK before the beacon transmission of the local station, but there is a case where the communication station 4 tries to transmit the ACK immediately after the beacon transmission time. Then, for performing transmission to the communication station 8 transmitting a beacon next to the local station on the CW net, the communication station 4 transmits a page packet immediately before the beacon transmission time of the communication station 8 (C02).

Because the communication station 8 has the receiver thereof operating before and after its own beacon transmission time, the communication station 8 can receive the page packet from the communication station 4, and can recognize the existence of the transmission information transmitted from the communication station 0 as the information transmission source. Then, the communication station 8 sends back a reception confirmation response ACK to this (C03). Then, for performing the transmission to the communication station C transmitting a beacon next to the local station on the CW net, the communication station 8 performs the transmission of a page packet immediately before the beacon transmission time of the communication station C (C04).

Because the communication station C has the receiver thereof operating before and after its own beacon transmission time, the communication station C can receive the page packet from the communication station 8, and can recognize the existence of the transmission information transmitted from the communication station 0 as the information transmission source. Then, the communication station C sends back a reception confirmation response ACK to the page packet (C05). It is noted that, although it is not shown, there is also the case where the communication station C tries to transmit a page packet to the communication station 0 by a procedure similar to the one described above.

The communication station 0 transmits net transmission information successively to the beacon transmission of the local station in the super frame next to the super frame in which the communication station 0 transmitted a page packet (C07). In response to this, because the other communication stations 4, 8 and C have recognized by the previous reception of the page packets that the communication station 0 transmits the information, they operate their receivers at the beacon transmission time of the communication station 0, and receive the transmission beacon and the transmission information from the communication station 0.

Moreover, the communication stations 4, 8 and C transmit reception confirmation responses indicating that they could receive the transmission information from the communication station 0 without error continuously to beacon transmission (C08, C09 and C10).

After the communication station 0 transmitted the information, the communication station 0 receives the reception confirmation responses transmitted continuously to the beacon transmission of the communication stations 4, 8 and C, and thereby confirming that the transmitted information has distributed widely to each communication station without error.

Figure 28:
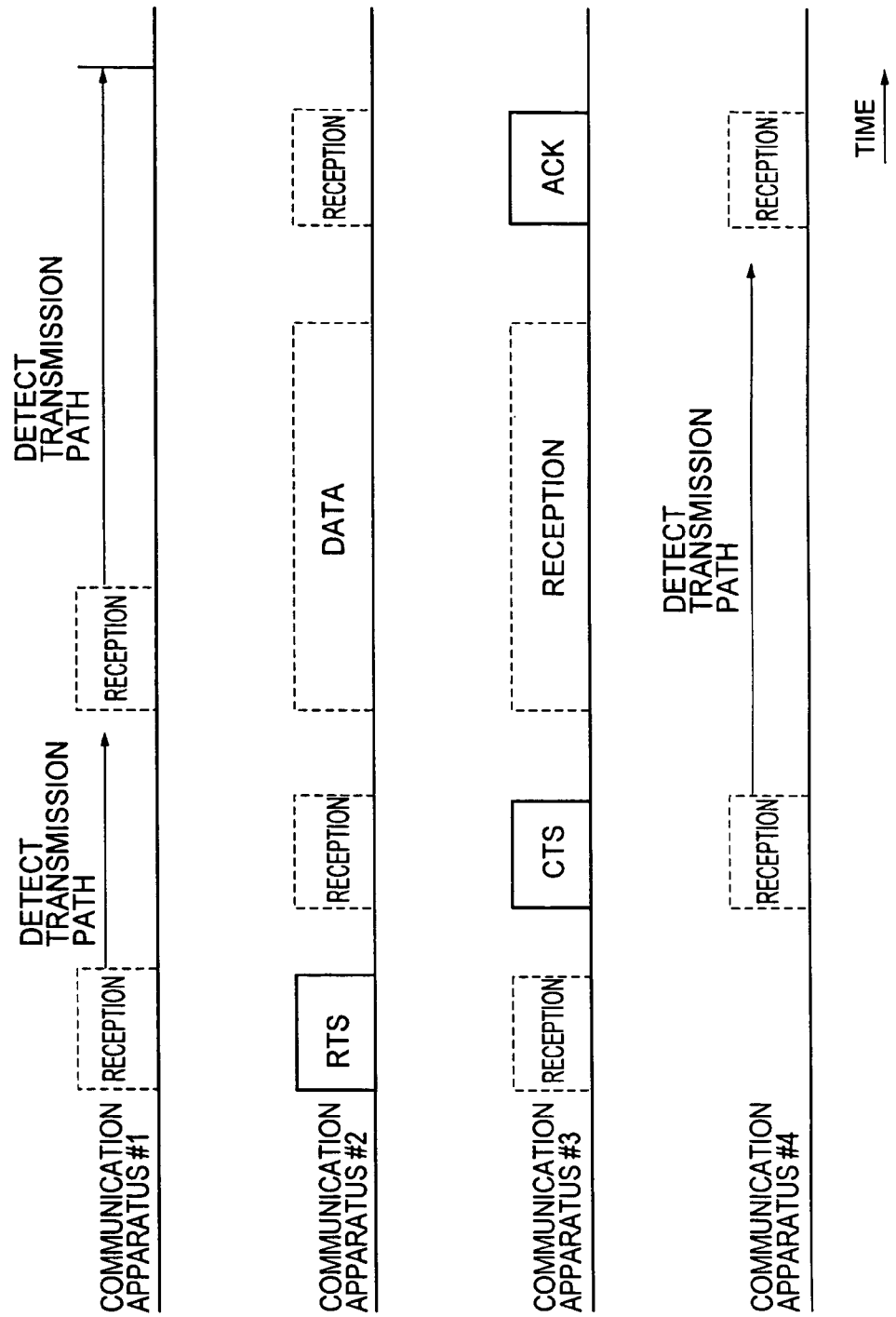
FIG. 28 is a chart showing an access operation example according to an RTS/CTS procedure.
Figure 29:
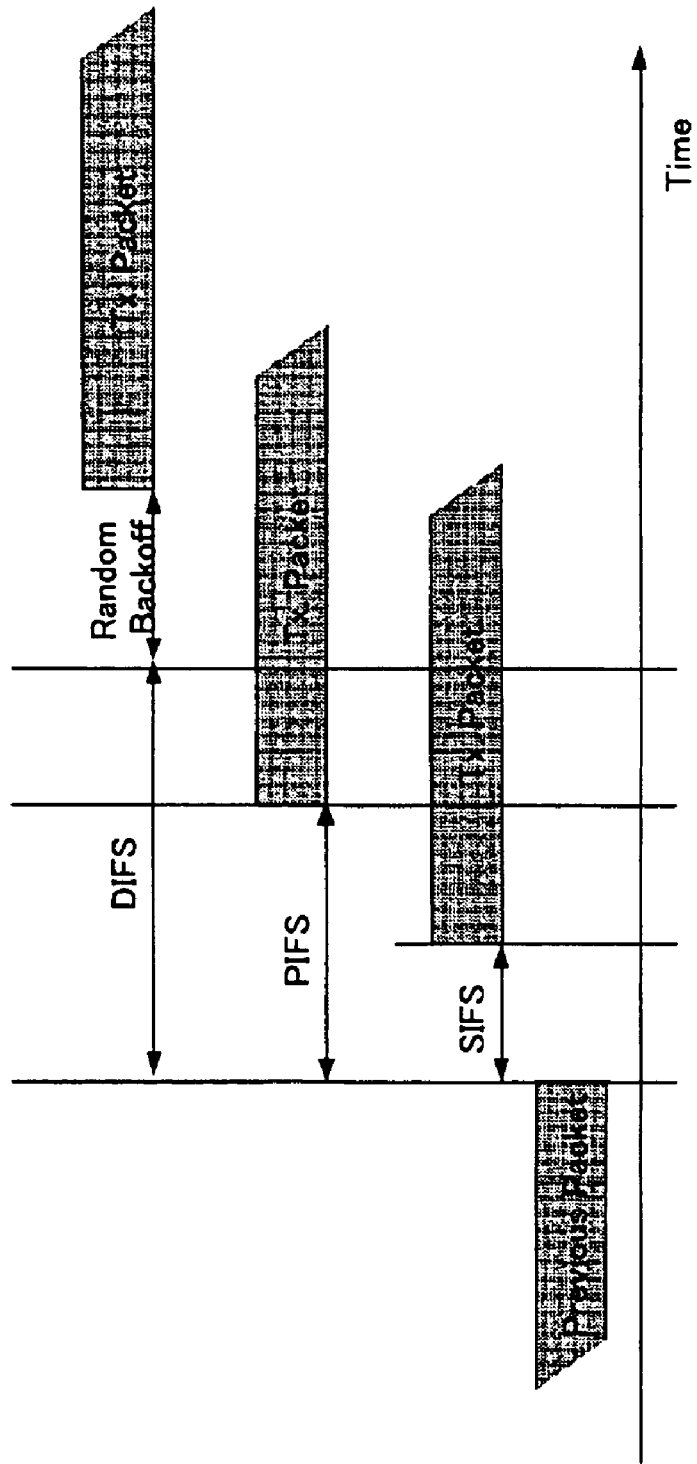
FIG. 29 is a view showing a packet interval IFS defined in IEEE 802.11.
Figure 29:
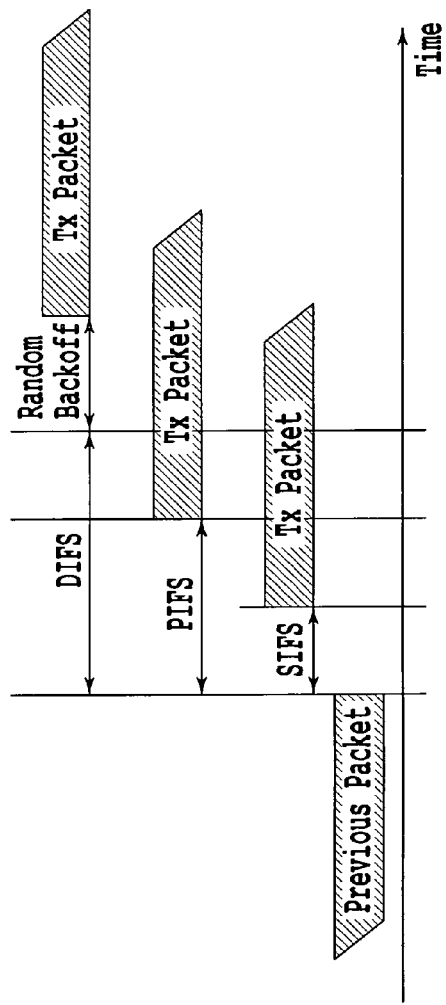
Figure 30:
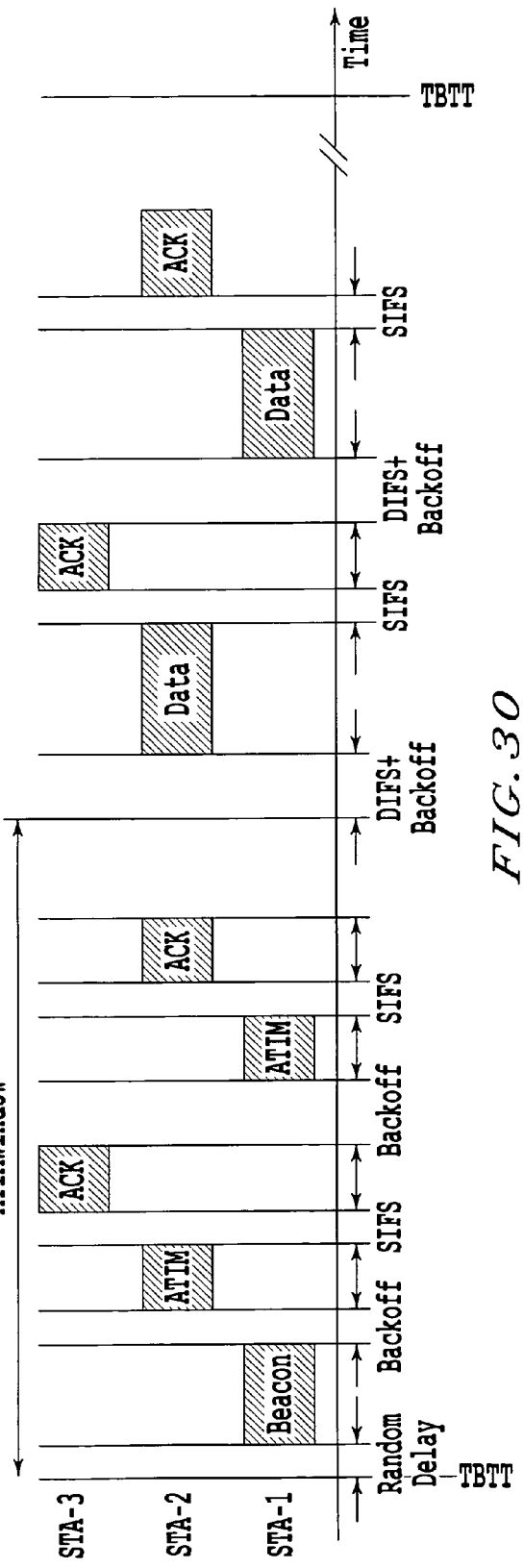
FIG. 30 is a view for explaining a signal transmission/reception procedure when an MT comes into its sleep mode in an IBSS in the ad hoc mode in networking according to IEEE 802.11.

Moreover, in a case where the communication station 0 cannot recognize a reception confirmation response, the communication station 0 again retransmits the same information to the communication station at a time near to the beacon transmission time of the communication station. The retransmission procedure can be performed by following the steps of the ordinary transmission procedure by the CSMA using the random backoff together (see FIGS. 28, 6 and so forth), and accordingly the detailed description thereof is omitted here.

Incidentally, at C07, the information transmission source transmits a short packet, but it is needless to say that the operation procedure can be configured to broadcast huge data.

Figure 23:
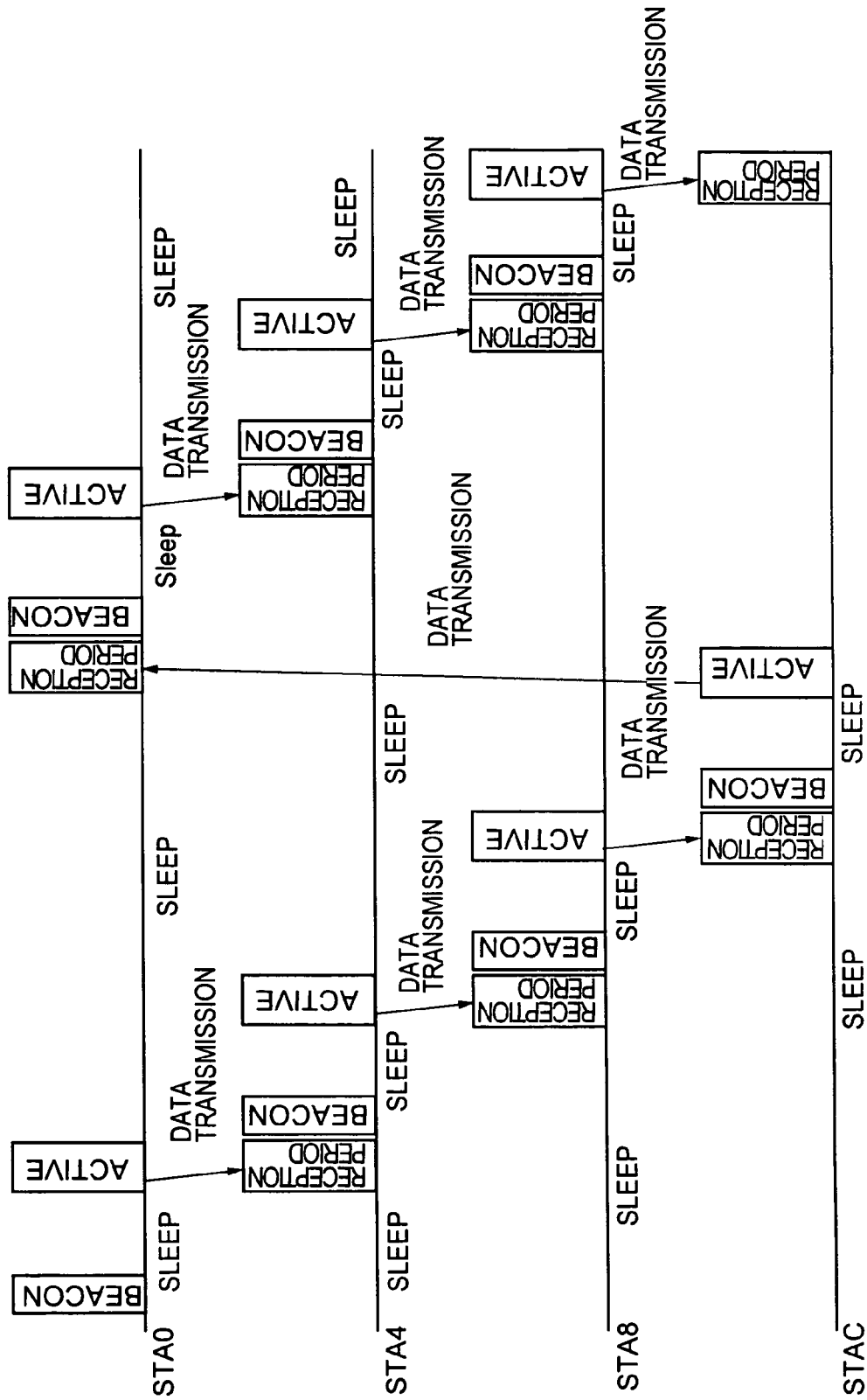
FIG. 23 is a view for explaining a mechanism of the bucket-brigade system utilizing a reception period provided before a beacon transmission time of a next communication station.

In the embodiment shown in FIG. 11, in a case where a certain communication station transmits information to all of the other communication stations, each communication station sequentially transmits information to the next communication station transmitting a beacon next to the local station in the super frame by using a reception period provided before the beacon transmission time of the next communication station for executing the information transmission of the bucket-brigade system. FIG. 23 illustrates the construction of the bucket-brigade transmission system using a reception period provided before the beacon transmission time of the next communication station. As shown in the figure, each communication station returns to its active state in time to the reception period provided before the transmission time of the next communication station transmitting a beacon next to the local station in the super frame to perform the transmission of data. After that, each communication station moves to its sleep state, and waits until the next beacon transmission timing of the local station.

Figure 12:
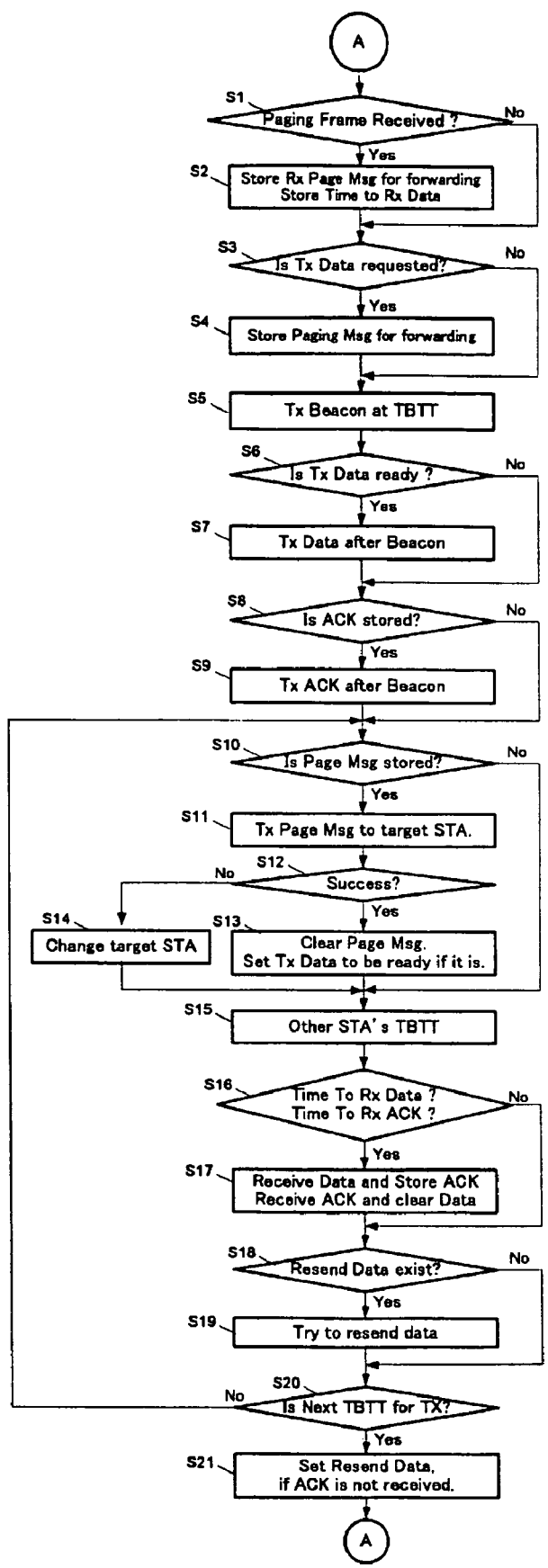
FIG. 12 is a flowchart showing an operational procedure of a wireless communication apparatus 100 for performing an information transmission/reception procedure for broadcast transmitting transmission information after an information transmission source station transmits a page packet according to a bucket-brigade system.

FIG. 12 shows the operation procedure of the wireless communication apparatus 100 in the form of a flowchart. The operation procedure is for performing the information transmission and reception procedures as shown in FIGS. 9 and 11 by a communication station of an information transmission source. The information transmission and reception procedures are for performing the broadcast transmission of transmission information after the communication station as the information transmission source has transmitted a page packet by the bucket-brigade system. The operation procedure is actually realized in the form in which the central control unit 103 executes a predetermined execution command program stored in the information storage unit 113.

When the communication station receives a page packet (Step S1), the communication station write the received page packet into a transmission buffer for transmission in the bucket-brigade system to prepare transmission (Step S2). Moreover, in a case where the communication station receives page information, the communication station sets the beacon transmission time of a station of the transmission source of the page information as a "time to perform reception".

Moreover, at this time, the communication station checks whether or not the local station has data which the local station wants to transmit (Step S3). Then, in a case where the local station has the transmission data, the communication station writes the page information of the local station into the transmission buffer in the form of adding the page information to the previous page packet to prepare the transmission (S4). At this time, in a case where the communication station has no received page packets, the communication station write the page information into the transmission buffer for the bucket-brigade transmission as it is.

Then, when the beacon transmission time TBTT of the local station arrives, the communication station transmits a beacon (Step S5).

In a case where data the transmission preparation of which has been completed (the page information of which has transmitted in advance) exists here (Step S6), the data is transmitted just after the beacon (Step S7). Moreover, for receiving the ACK pertaining to the data, the beacon transmission time of each station is set as a "time to perform reception".

Moreover, in a case where the communication station has the ACK to be transmitted (Step S8), the communication station transmits all pieces of the ACK information continuously (Step S9).

In a case where there is some page packet to be transmitted by the processing at Step S2 and Step S4 (Step S10), the communication station transmits the page packet to a target communication station (Step S1). The target communication station is basically a communication station transmitting a beacon next to the local station in the super frame.

In a case where the communication station succeeded in transmitting the page packet here (Step S12), the communication station clears the page information from the transmission buffer, and sets the status of the transmission data to transmission preparation completion (Step S13). On the other hand, in a case where the communication station failed in the transmission of the page packet, the communication station changes the target transmission station to a station transmitting a beacon next (Step S14).

When the beacon transmission time of the next communication station transmitting a beacon next to the local station arrives (Step S15), the communication station judges whether the time is the "time to perform reception" or not (Step S16). When a positive result is obtained, the communication station performs the reception of data or the ACK (Step S17). In a case where the communication station received data here, the communication station supplies the data to the upper layer.

In a case where the data to be retransmitted to the communication station having transmitted a beacon exists here (Step S18), the communication station starts the retransmission procedure of data to the station (Step S19).

The communication station performs the processing from Step S10 to Step S19 to the beacon transmission time of the other stations. Then, in a case where the data having transmitted in the super frame exists at the timing at which the beacon to be transmitted next is the beacon of the local station (Step S20), the communication station checks whether or not all of the ACKs pertaining to the transmitted data have received to register the data to be retransmitted to a station which has not received yet (Step S21).

According to the information transmission and reception procedures of the present embodiment, the information shared in a system can be efficiently supplied by the bucket-brigade system. Moreover, it becomes unnecessary to transmit a short packet many times with the possibility of collisions, and basically the delivery of data for a fixed time is enabled. Moreover, because each communication station performs data transmission between them by providing reception periods before and after its beacon transmission timing, the receiver can be operated only in the minimum necessary time zone. Consequently, the effect of the low power consumption is improved.

For example, in an application for applying wireless communication to game controllers in a case where a plurality of users performs a competition, it is necessary to transmit a command input on one machine to the controllers of all of the users. According to the above-mentioned information transmission and reception procedures, an input command composed of a short packet from each controller can be notified to each controller in a short latency without any delay from the proceeding processing of the game. Moreover, it is supposed that each of the game controllers is driven by a battery, and the lowering of power consumption is desired. Each game controller can enter its sleep state except for the time of packet transmission and reception.

In addition, in the situation of continuously information sending, when it can be predicted that each communication station keeps in the status of sending and receiving packets without entering the sleeping status, there exists such situation that information is sent without the procedure of bucket brigade of page packet. In this situation, the communication station sending information sends information within the transmission prioritized period which can be subsequent to the beacon transmission of local station, and each communication station for receiving information sends the reception confirmation response within the transmission prioritized period which can be subsequent to the beacon transmission of local station. It becomes unnecessary to transmit a short packet many times with the possibility of collision, and basically the delivery of data for a fixed time is enabled.

G. Second Embodiment of Information Transmission Procedures

FIG. 13 illustrates the construction of a second embodiment pertaining to the information transmission procedures in the self-organized distribution type wireless communication network according to the present invention.

The example shown in the figure therein contains the beacon transmission timing TBTT of four communication stations 0, 4, 8 and C at every 20 microseconds at regular intervals in a super frame of a CW net configured at the period of 80 microseconds, and beacons are almost periodically transmitted in the order of the communication stations 0, 4, 8 and C, as shown in the figure. It is supposed here that all of the communication stations exist in a communication range and there are no hidden terminal problems. Each communication station grasps the existence of communication stations in peripheral regions and the beacon transmission time of each communication station on the basis of the reception timing of beacons and the NBOI information described in the beacons. Moreover, it is supposed that, in a steady state in which no transmission and reception data arise, each communication station performs the reception operation thereof only in time zones (Listen Periods) before and after a beacon transmitted by the local station.

The example shown in FIG. 13 exemplifies a case where the communication station 8 as well as the communication station 0 simultaneously performs the transmission of information in the same super frame. In the first embodiment described above, prior data such as a page packet for giving an advance notice of the transmission of information is sent round in advance of the transmission of the information. However, in the second embodiment, the information itself is sent round from the beginning.

The communication station 0 transmits information which it wants to deliver to each communication station (or some communication stations) to the communication station 4 transmitting a beacon next to the local station.

The communication station 4 having received the information obtains the information from the communication station 0, and transmits the information having received from the communication station 0 to the communication station 8 transmitting a beacon next to the local station.

The communication station 8 having received the information obtains the information from the communication station 0, and transmits the information having received from the communication station 4 to the communication station C transmitting a beacon next to the local station. At this time, because the communication station 8 has the information which the local station wants to send, the communication station 8 composes an information group by adding (multiplexing) the information to the information having received from the communication station 4, and transmits the information group to the communication station C.

The communication station C having received the information group obtains the pieces of information from the communication stations 0 and 8, and transmits the information group received from the communication station 8 to the communication station 0 transmitting a beacon next to the local station.

The communication station 0 having received the information group obtains the information from the communication station 8. Then, when the communication station 0 recognizes that the transmission processing pertaining to the information sent from the local station has been completed because the information sent from the local station is included in the received information group, the communication station 0 deletes the information, and transmits the residual information to the communication station 4 transmitting a beacon next to the local station.

The communication station 4 having received the information obtains the information from the communication station 8, and the communication station 4 transmits the information having received from the communication station 0 to the communication station 8 transmitting a beacon next to the local station.

When the communication station 8 having received the information recognizes that the transmission processing pertaining to the information sent from the local station has been completed because the information sent from the local station is included, the communication station 8 deletes the information. As a result, the communication station 8 confirms that nothing except for the information sent from the local station is included in the received signal, and the communication station 8 ends the series of transmission and reception procedures.

Figure 14:
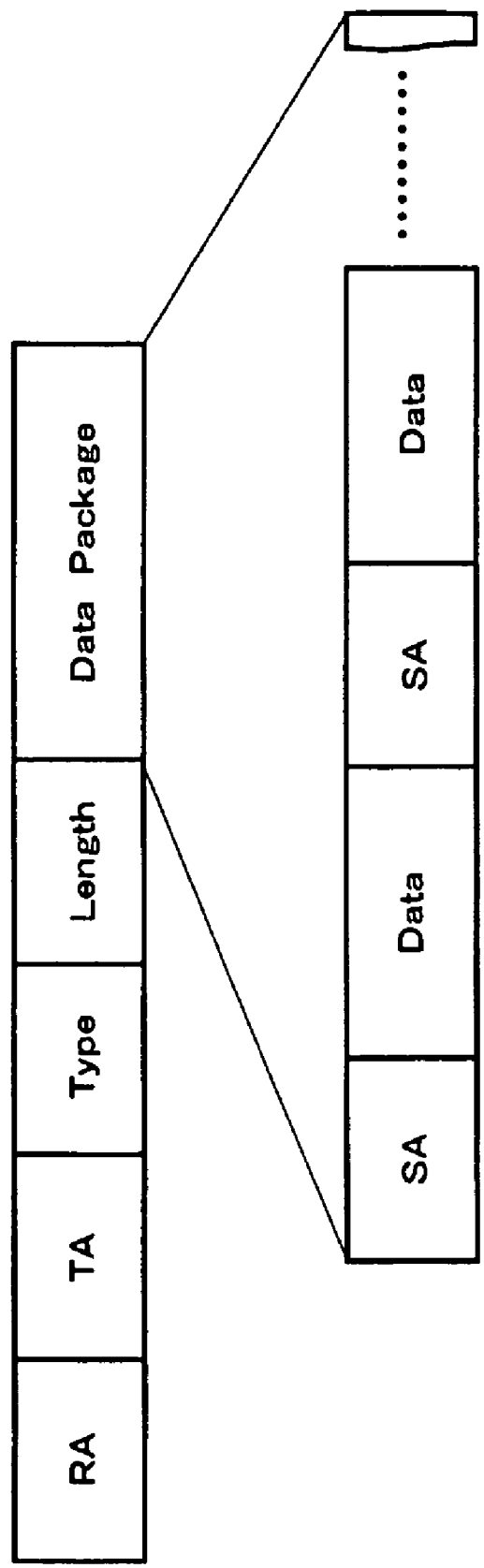
FIG. 14 is a view schematically showing a structural example of a data packet used in the second embodiment of the present invention.

FIG. 14 schematically shows an example of the data structure of a data packet to be used in the self-organized distribution type network according to the second embodiment of the present invention.

As shown in the figure, the data packet is composed of an address (RA) field of the communication station of a reception destination, an address (TA) field of a communication station of a transmission source, a Type field indicating that the packet is a data packet, a length field indicating the data length of the packet, and a data package field.

The data package field is configured by multiplexing pieces of transmission information from each communication station, which transmission information is added in the frame period, and each piece of transmission information is composed of a combination of an address (SA) field of an information transmission source and a data field.

When a plurality of communication stations performs the transmission of information in the same super frame here, an information group is formed in the form of adding (multiplexing) pieces of information successively. As a result, there is the possibility that the data quantity thereof exceeds a transmittable quantity to overflow.

For avoiding such an overflow state of the data quantity, each communication station sometimes perform the processing of standing by doing nothing without transmitting the information to be transmitted from the local station until the next super frame when the data quantity of received information groups exceeds a certain threshold value. Moreover, at this time, there is also a case where each communication station calculates a data quantity in the state in which the information which the local communication station wants to transmit is added to the received information groups to compare the calculated data quantity with the threshold value for performing the judgment of whether adding information or whether standing by doing nothing.

Moreover, for avoiding the overflow state of the data quantity, there is also a case where each communication station holds information pertaining to whether the local station has transmitted information in the latest super frame or not for limiting the transmission of information in a successive super frame. Thereby, it is possible to achieve the fairness of access among the communication stations and the equalization of transmission chances.

Figure 15:
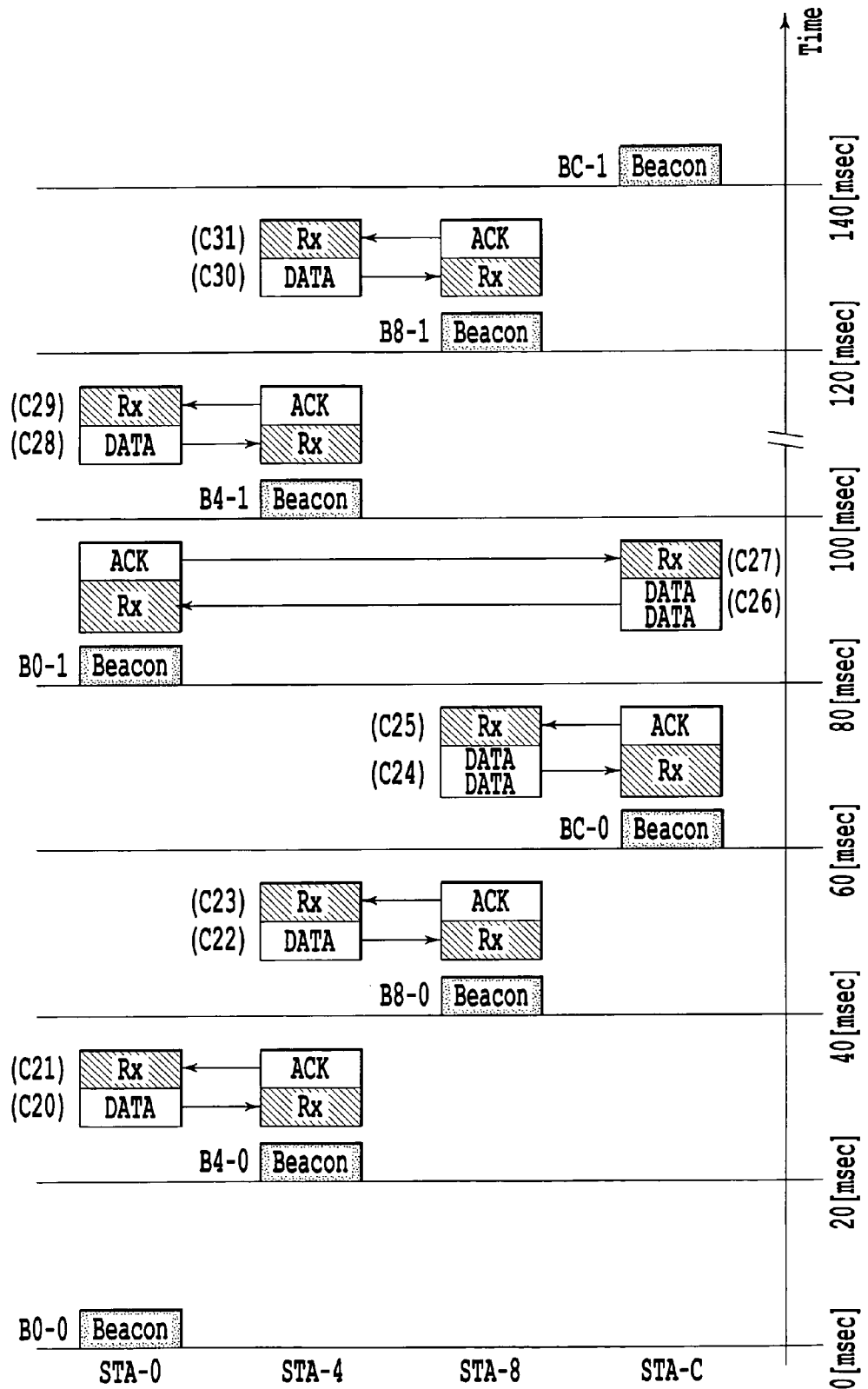
FIG. 15 is a view precisely showing an operational example of an information transmission/reception procedure according to the second embodiment of the present invention.

FIG. 15 shows an operation example of the information transmission and reception procedures according to the second embodiment of the present invention in detail. It should be noted that, similarly to the case shown in FIG. 13, the communication situation is supposed as follows: in a super frame of a CW net formed of an 80-microsecond period the beacon transmission timing TBTT of the four communication stations 0, 4, 8 and C is contained at every 20 microseconds at regular intervals, and beacons are almost periodically transmitted in the order of the communication stations 0, 4, 8 and C. Also it is supposed that the communication station 8 as well as the communication station 0 simultaneously performs the transmission of the information thereof in the same super frame.

For notifying the communication station 4 transmitting a beacon on the CW net next to the local station of the data packet composed of the information which the communication station wants to send to a communication station (or several communication stations), the communication station 0 transmits the data packet immediately after the beacon transmission time of the communication station 4 (C20).

Because the communication station 4 has the receiver thereof operating before and after its own beacon transmission time, the communication station 4 can receive the data packet, and sends back a reception confirmation response ACK to the data packet (C21). Although the communication station 0 transmitted the data packet in the timing after the beacon transmission of the communication terminal 4 here, there is also a case where the communication station 0 tries to transmit the information immediately before the beacon transmission time.

For transmitting the data packet to the communication station 8 transmitting a beacon next to the local station, the communication station 4 performs the transmission of the data packet immediately after the beacon transmission time of the communication station 8 (C22).

Because the communication station 8 has the receiver thereof operating before and after its beacon transmission time, the communication station 8 can receive the data packet, and sends back a reception confirmation response ACK to the data packet (C23).

For performing the transmission of the data packet to the communication station C transmitting a beacon next to the local station, the communication station 8 performs the transmission of the data packet immediately after the beacon transmission time of the communication station C (C24). At this time, the communication station 8 forms an information group (data package) by adding the information which the local station wants to send to the received information, and the communication station 8 transmits the formed information group to the communication station C.

Because the communication station C has the receiver thereof operating before and after its own beacon transmission time, the communication station C can receive the data packet, and sends back a reception confirmation response ACK to the data packet (C25). For transmitting the data packet to the communication station 0 transmitting a beacon next to the local station, the communication station C performs the transmission of the data packet composed of the information group immediately after the beacon transmission time of the communication station 0 (C26).

Because the communication station 0 has the receiver thereof operating before and after its beacon transmission time, the communication station 0 can receive the data packet, and sends back a reception confirmation response ACK to the received data packet (C27). When the communication station 0 recognizes that the information which the local station has sent is included in the data packet here, the communication station 0 deletes the information from the information group (data package), and produces a data packet composed of an information group to be sent round to the next communication station. Then, for transmitting the data packet to the communication station 4 transmitting a beacon next to the local station, the communication station 0 performs the transmission of the data packet immediately after the beacon transmission time of the communication station 4 (C28).

Because the communication station 4 has the receiver thereof operating before and after its beacon transmission time, the communication station 4 can receive the data packet, and sends back a reception confirmation response ACK to the received data packet (C29). For transmitting a data packet to the communication station 8 transmitting a beacon next to the local station, the communication station 4 performs the transmission of the data packet immediately after the beacon transmission time of the communication station 8 (C30).

Because the communication station 8 has the receiver thereof operating before and after its beacon transmission time, the communication station 8 can receive the data packet, and sends back a reception confirmation response ACK to the received data packet (C31). When the communication station 8 recognizes that the information which the local station has sent is included in the data packet, the communication station 8 deletes the information from the information group (data package). Then, when the communication station 8 confirms that nothing except for the information which the local station has sent is included in the received signal, the communication station 8 ends the series of transmission and reception procedures.

Figure 24:
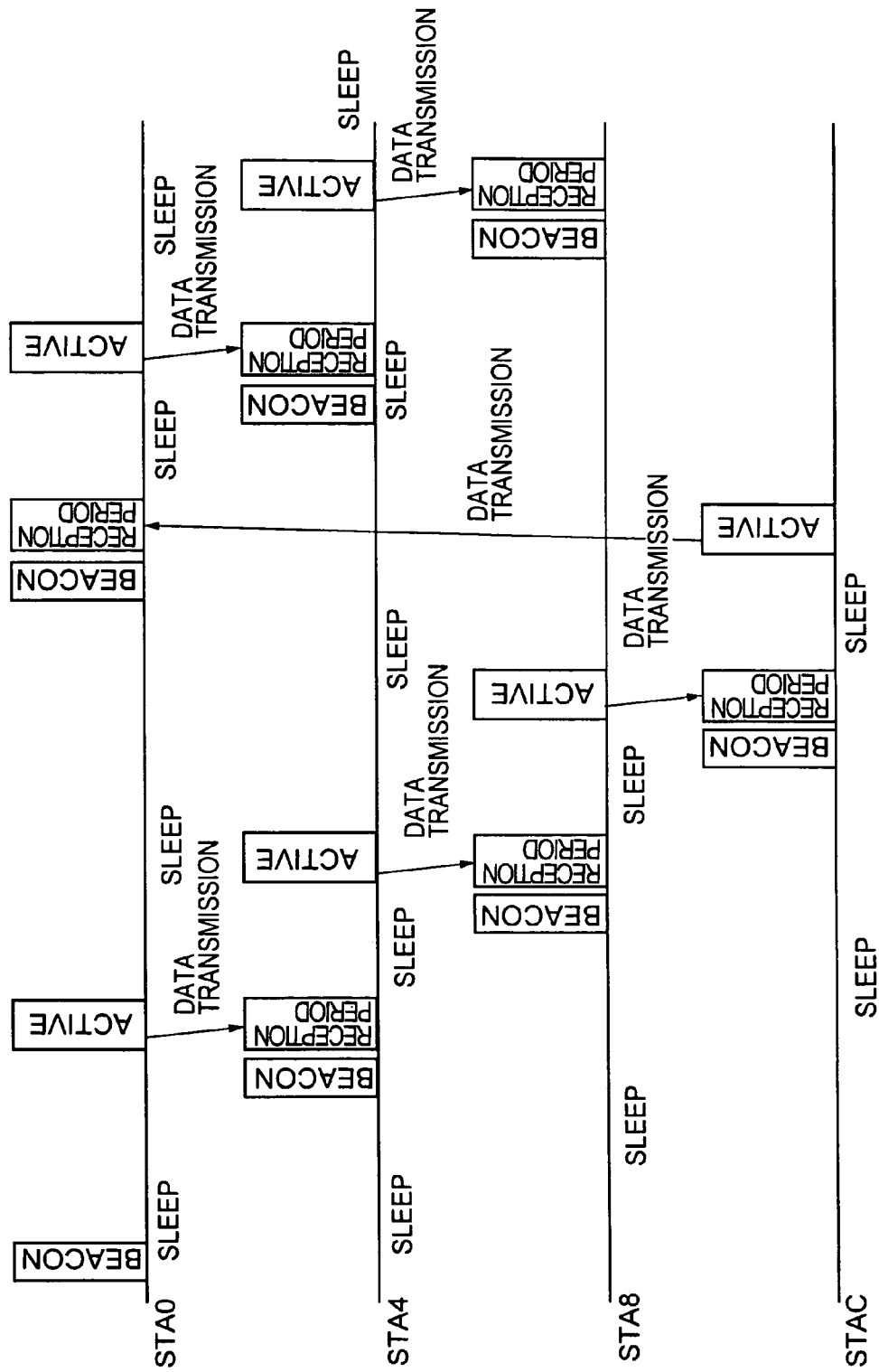
FIG. 24 is a view for explaining a mechanism of the bucket-brigade system utilizing a reception period provided after the beacon transmission time of a next communication station.

In the embodiment shown in FIG. 15, in a case where a certain communication station transmits information to all of the other communication stations, each communication station sequentially transmits information to the next communication station transmitting a beacon next to the local station in the super frame by using a reception period provided after the beacon transmission time of the next communication station for executing the information transmission of the bucket-brigade system. FIG. 24 illustrates the construction of the bucket-brigade transmission system using a reception period provided after the beacon transmission time of the next communication station. As shown in the figure, each communication station returns to its active state in time to the reception period provided after the transmission time of the next communication station transmitting a beacon next to the local station in the super frame to perform the transmission of data (a page packet in the example described above). Thereafter, each communication station moves to its sleep state, and waits until the beacon transmission timing of the next local station.

Figure 16:
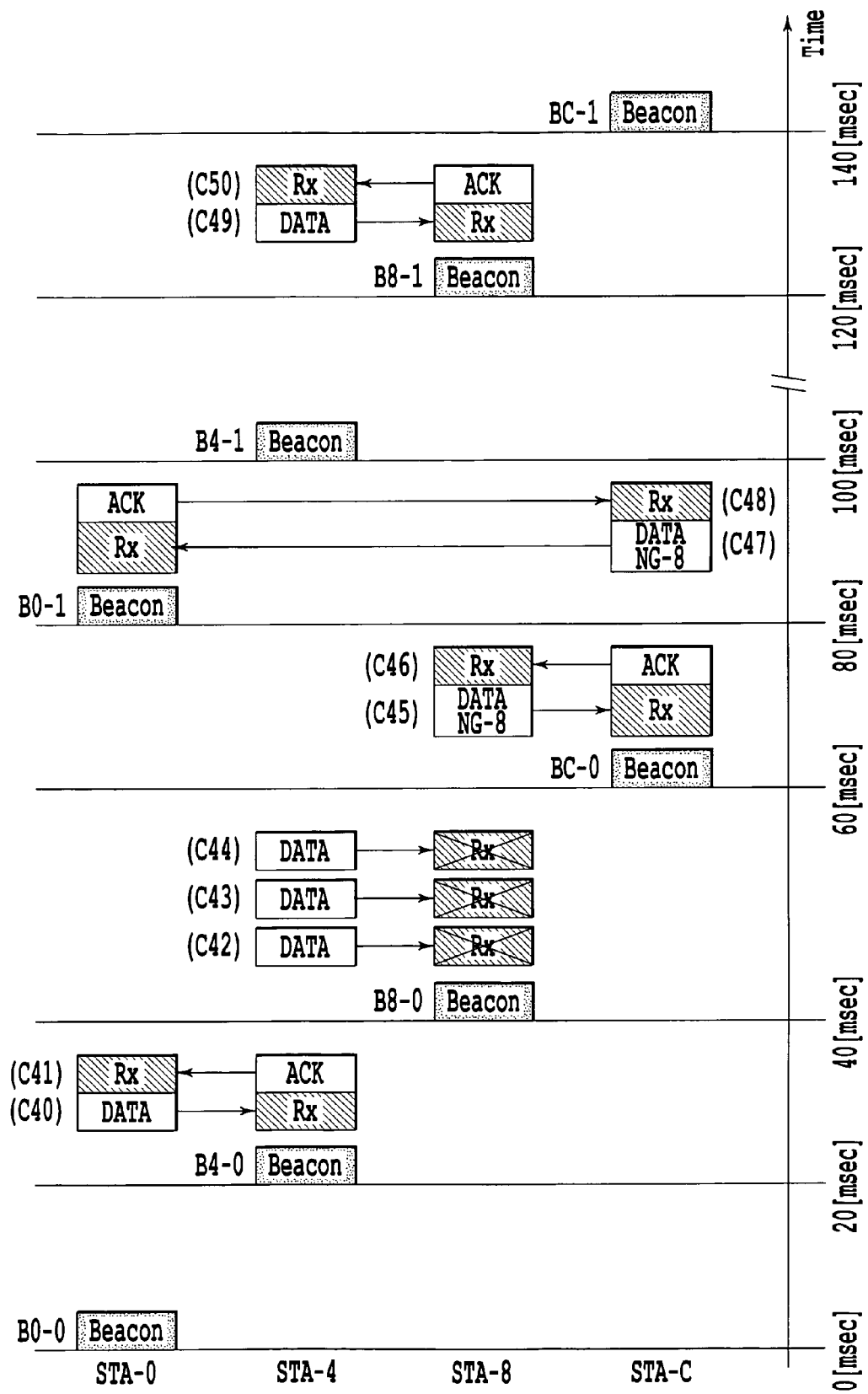
FIG. 16 is a view precisely showing an operational example in a case where an error occurs during the information transmission/reception procedure of the second embodiment of the present invention.

FIG. 16 shows an operation example in a case where an error arises on the way of the information transmission and reception procedures according to the second embodiment of the present invention in detail. It should be noted that, similar to the case shown in FIG. 13, the communication situation is supposed as follows: the beacon transmission timing TBTT of the four communication stations 0, 4, 8 and C is contained at every 20 microseconds at regular intervals in a super frame of a CW net configured at the period of 80 microseconds, and beacons are almost periodically transmitted in the order of the communication stations 0, 4, 8 and C. Incidentally, for the simplification of description, it is supposed that only the communication station 0 simultaneously performs the transmission of information in the super frame.

For notifying the communication station 4 transmitting a beacon next to the local station of a data packet composed of the information which the communication station 0 wants to send a communication station (or several communication stations), the communication station 0 transmits the data packet immediately after the beacon transmission time of the communication station 4 (C40).

Because the communication station 4 has the receiver thereof operating before and after its beacon transmission time, the communication station 4 can receive the data packet, and sends back a reception confirmation response ACK to the received data packet (C41). Then, for transmitting the data packet to the communication station 8 transmitting a beacon next to the local station, the communication station 4 performs the transmission of the data packet immediately after the beacon transmission time of the communication station 8 (C42).

Although the communication station 8 should have the receiver thereof operating before and after its beacon transmission time here, the reception is not performed correctly owing to some reason. Because no reception confirmation responses ACK are sent back in a predetermined period, the communication station 4 tries the retransmission of the data packet several times in accordance with a predetermined procedure (C43 and C44). Because no reception confirmation responses are sent back still, and because the response period (Listen Period) also ends, the communication station 4 gives up the transmission of the information to the communication station 8.

In such a case, the communication station 4 changes the partner of the transmission to the communication station C performing the beacon transmission further next to the communication station 8. For transmitting the same packet to the communication station C, the communication station 4 performs the transmission of the data packet immediately after the beacon transmission time of the communication station C (C45). At this time, the communication station 4 forms an information group by adding the information indicating the failure of the transmission of the information to the communication station 8 to the original information, and transmits the data packet.

Because the communication station C has the receiver thereof operating before and after its own beacon transmission time, the communication station C can receive the data packet, and sends back a reception confirmation response ACK to the received data packet (C46). For transmitting the data packet to the communication station 0 transmitting a beacon next to the local station, the communication station C performs the transmission of the data packet composed of the information group immediately after the beacon transmission time of the communication station 0 (C47).

Because the communication station 0 has the receiver thereof operating before and after its own beacon transmission time, the communication station 0 can receive the data packet, and sends back a reception confirmation response ACK to the received data packet (C48). When the communication station 0 recognizes that only the elements pertaining to the information which the local station has sent is included in the information group included in the received data packet, the communication station 0 does not perform the further relay transmission of the signal (ditto). Moreover, by knowing a fact that the communication station 8 did not respond, the communication station 0 starts the retransmission procedure to the communication station 8.

For transmitting a retransmission data packet to the communication station 8 in the retransmission procedure, the communication station 0 transmits a data packet in accordance with a predetermined procedure immediately after the beacon transmission of the communication station 8 (C49).

It is supposed that the communication station 8 has the receiver thereof operating before and after its own beacon transmission time and the communication station 8 could receive the data packet at this time. In this case, the communication station 8 sends back a reception confirmation response ACK to the received retransmission data packet (C50). When the communication station 0 having received the reception confirmation response ACK recognizes that the information has gone round to all of the communication stations which want the information transmission, the communication station 0 terminates the whole information transmission procedure.

The information to which information indicating the communication station to which the transmission failed is added some time arrives at the communication station of the information transmission source by the bucket-brigade transmission system. In the retransmission procedure shown in FIG. 16, the communication station of the information transmission source starts the retransmission procedure to the specific communication station which failed the reception, but it is needless to say that the retransmission may be performed by transferring the same data to each communication station sequentially again by the bucket-brigade transmission as shown in FIG. 15. In a case where the bucket-brigade transmission continues by adding information successively by each communication station, there is a case where the latter method is more efficient.

Figure 17:
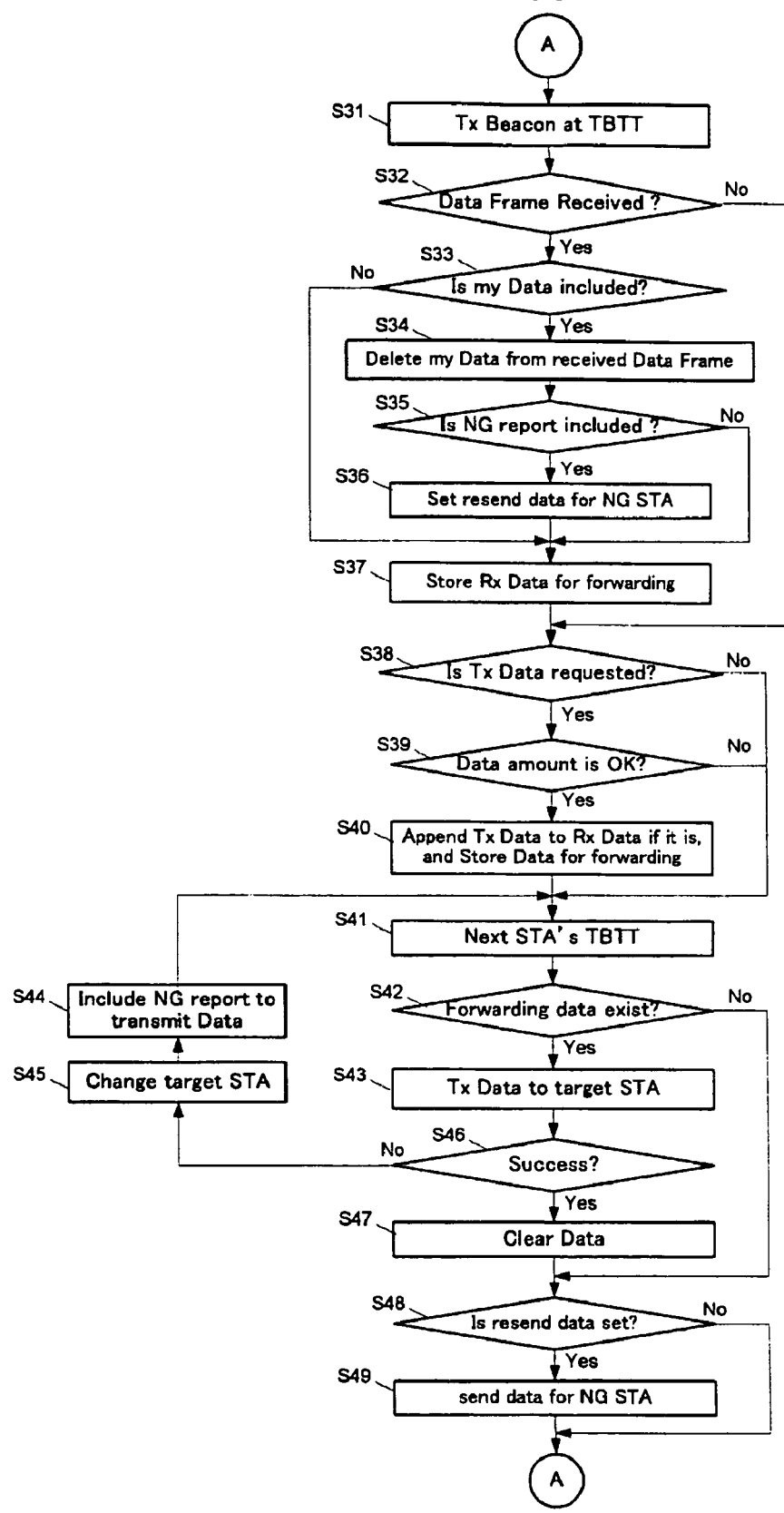
FIG. 17 is a flowchart showing an operational procedure of a wireless communication apparatus 100 for performing an information transmission/reception procedure for broadcast transmitting transmission information after an information transmission source station transmits a page packet according to a bucket-brigade system.

FIG. 17 shows the operation procedure of the wireless communication apparatus 100 in the form of a flowchart. The operation procedure is for the performance of the information transmission and reception procedures as shown in FIGS. 13 and 15 by a communication station of an information transmission source. The information transmission and reception procedures are for performing the broadcast transmission of transmission information after the communication station of the information transmission source has transmitted a page packet by the bucket-brigade system. The operation procedure is actually realized in the form in which the central control unit 100 executes a predetermined execution command program stored in the information storage unit 103.

When the beacon transmission time of the local station arrives, a communication station transmits a beacon (Step S31).

After that, in a case where a data frame is received (Step S32), the communication station performs the following processing. First, the communication station confirms whether or not the data transmitted from the local station is included in the received data frame (Step S33). In a case where the data transmitted from the local station is included, the communication station deletes the data from the received data frame (Step S34). Moreover, the communication station checks whether or not an NG report (the information telling the fact that someone fails to perform reception) is included (Step S35). In a case where the NG report is included, the communication station registers retransmission data for performing the retransmission of the data to the communication station (Step S36). Next, the communication station provides the received data to an upper layer while setting the data as the data to be bucket-brigaded (Step S37).

Next, the communication station checks whether or not the data which it wants to transmit exists (Step S38). In a case where the data which the communication station wants to transmit exists, the communication station judges whether or not transmission is permitted or not in consideration of the quantity of the data which the communication station wants to transmit, the quantity of the data in case of the existence of the data set at Step S37, and the quantity of flowing of the data transmitted recently (Step S39). As a result, in a case where it is judged that the transmission may be permitted, the communication station sets the data to be transmitted in the form of adding the data to the data, in a case where the data set at Step S37 exists, as the data to be bucket-brigaded (Step S40).

Then, after the beacon transmission time of the next communication station arrived in the super frame and the communication station received the beacon (Step S41), the communication station checks whether or not the data to be bucket-brigaded exists (Step S42). In a case where the data to be bucket-brigaded exists, the communication station transmits the data to the target communication station (Step S43). The target communication station is basically a communication station which transmits a beacon next to the local station in the super frame.

Here, in a case where the transmission of a data frame was successful such as a case where an ACK from a reception destination was returned (Step S45), the communication station clears the data frame from the transmission buffer (Step S47). On the other hand, in a case where the transmission of the data frame was unsuccessful (Step S46), the communication station changes the target transmission station to the station transmitting a beacon next (Step S45), and the communication station adds an NG report indicating the failure of the data delivery to the communication station to the transmission data to be bucket-brigaded. Then, the communication station further performs the data transmission processing similar to the processing described above to the communication station having the next beacon transmission time (Step S44).

Moreover, in a case where retransmission data is registered, the communication station transmits the data to the object communication station described in the NG report (Step S49).

Figure 18:
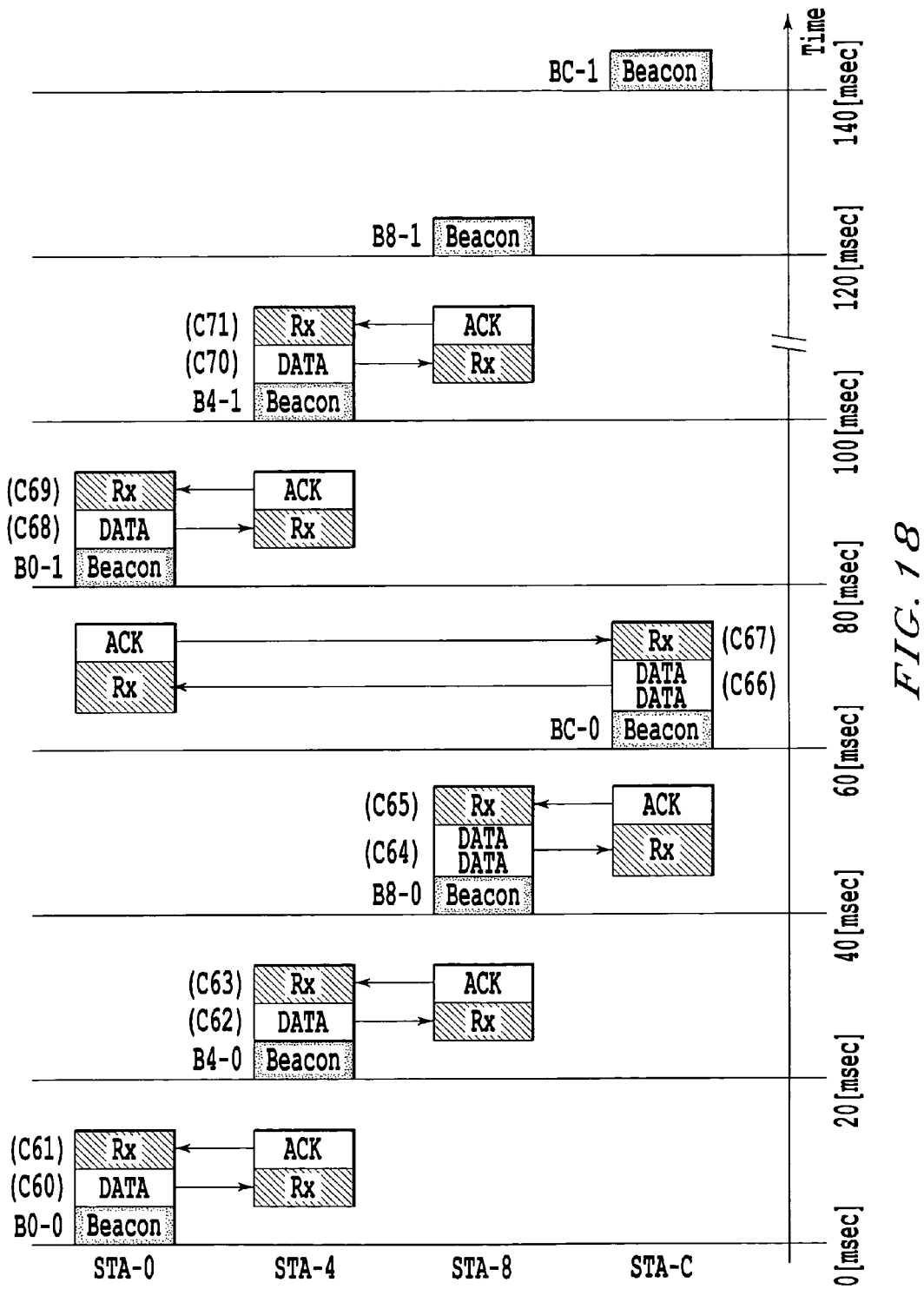
FIG. 18 is a view showing a modified example of the information transmission/reception procedure according to the second embodiment of the present invention.

FIG. 18 shows a modified example of the information transmission and reception procedures according to the second embodiment of the present invention. It should be noted that, similarly to the case shown in FIG. 15, the communication situation is supposed as follows: in a super frame of a CW net formed of an 80-microsecond period the beacon transmission timing TBTT of four communication stations 0, 4, 8 and C is contained at every 20 microsecond at regular intervals, and beacons are almost periodically transmitted in the order of the communication stations 0, 4, 8 and C. It is supposed that all of the communication stations exist in the communication range and there are no hidden terminal problems here, and each communication station grasps the existence of the communication stations in the periphery region and the beacon transmission time of each communication station on the basis of the beacon reception timing and the NBOI information described in the beacon. Then, it is supposed that the communication station 8 as well as the communication station 0 simultaneously performs the transmission of information in the same super frame.

In the embodiment shown in FIG. 15, the communication stations severally transmit a signal at the timing near to the beacon transmission timing of an addressed station. On the other hand, in the embodiment shown in FIG. 18, the signal is transmitted continuously to the transmission of the beacon of the local station. In the case of the latter one, it is prescribed as a rule that each communication station has the receiver thereof operating in the time zone of the peripheral region of the beacon of the station transmitting a beacon (immediately) before a beacon of the local station in addition to the times before and after the beacon transmission. Moreover, it is premised that each communication station acquires the transmission prioritized period TPP immediately after the beacon transmission, and can preferentially acquire a transmission right in a packet interval SIFS shorter than that of the other stations in the section (as described above).

For notifying the communication station 4 transmitting a beacon next to the local station of a data packet composed of the information which the communication station 0 wants to send to a communication station (or several communication stations), the communication station 0 performs the transmission of the data packet by using the TPP provided immediately after the beacon transmission time of the local station (C60).

Because the communication station 4 has the receiver thereof operating in the time zone of the peripheral region of the beacon of the communication station 0 transmitting a beacon (immediately) before the beacon of the local station, the communication station 4 can receive the data packet, and sends back a reception confirmation response ACK to the data packet (C61).

For transmitting the data packet to the communication station 8 transmitting a beacon next to the local station, the communication station 4 performs the transmission of a data packet by using the TPP provided immediately after the beacon transmission time of the local station (C62).

Because the communication station 8 has the receiver thereof operating in the time zone of the peripheral region of the beacon of the communication station 4 transmitting a beacon (immediately) before the beacon of the local station, the communication station 8 can receive the data packet, and sends back a reception confirmation response ACK to the data packet (C63).

For transmitting a data packet to the communication station C transmitting a beacon next to the local station, the communication station 8 performs the transmission of the data packet by using the TPP provided immediately after the beacon transmission time of the local station (C64). At this time, the communication station 8 forms an information group (a data package) by adding the information which the local station wants to send to the received information, and transmits the information group to the communication station C.

Because the communication station C has the receiver thereof operating in the time zone of the peripheral region of a beacon of the communication station 8 transmitting the beacon (immediately) before the beacon of the local station, the communication station C can receive the data packet, and sends back a reception confirmation response ACK to the received data packet (C65).

For transmitting a data packet to the communication station 0 transmitting a beacon next to the local station, the communication station C transmits the data packet by using the TPP provided immediately after the beacon transmission time of the local station (C66).

Because the communication station 0 has the receiver thereof operating in the time zone of the peripheral region of the beacon of the communication station C transmitting the beacon (immediately) before the beacon of the local station, the communication station 0 can receive the data packet, and sends back a reception confirmation response ACK to the received data packet (C67). Here, when the communication station 0 recognizes that the data packet includes the information which the local station has sent, the communication station 0 deletes the information from the information group (data package), and produces a data packet composed of an information group to be sent round to the next communication station. Then, for transmitting the data packet to the communication station 4 transmitting a beacon next to the local station, the communication station 0 performs the transmission of the data packet by using the TPP provided immediately after the beacon transmission time of the local station (C68).

Because the communication station 4 has the receiver thereof operating in the time zone of the peripheral region of a beacon of the station transmitting the beacon (immediately) before the beacon of the local station, the communication station 4 can receive the data packet, and sends back a reception confirmation response ACK to the received data packet (C69).

For transmitting a data packet to the communication station 8 transmitting a beacon next to the local station, the communication station 4 performs the transmission of the data packet by using the TPP provided immediately after the beacon transmission time of the local station (C70).

Because the communication station 8 has the receiver thereof operating in the time zone of the peripheral region of a beacon of the station transmitting the beacon (immediately) before the local station, the communication station 8 can receive the data packet, and sends back a reception confirmation response ACK to the received data packet (C71). When the communication station 8 recognizes that the data packet includes the information which the local station has sent, the communication station 8 delete the information from the information group (data package). Then, when the communication station 8 confirms that nothing except for the information which the local station has sent is included in the received signal, the communication station 8 ends the series of transmission and reception procedures.

Figure 25:
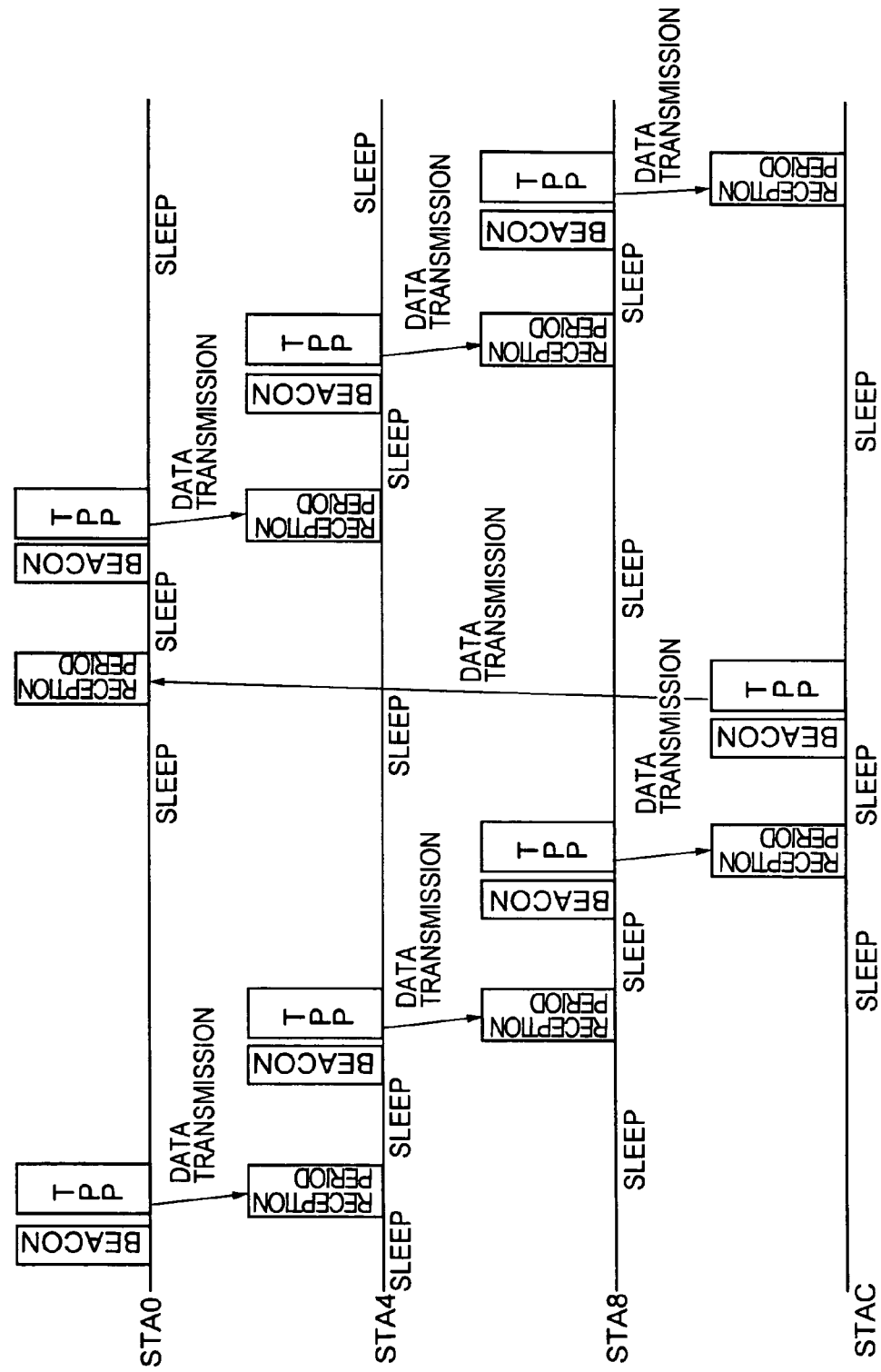
FIG. 25 is a view for explaining a mechanism of the bucket-brigade system utilizing a transmission prioritized period (TPP) provided by the communication station immediately after transmitting a beacon of the local station.

In the embodiment shown in FIG. 18, in a case where a certain communication station performs the transmission of information to all of the other communication stations, each communication station sequentially transmits the information to the next communication station transmitting a beacon next to the local station in the super frame by using the transmission prioritized period TPP acquired immediately after the beacon transmission of the local station in the super frame, and then each communication station executes the information transmission of the bucket-brigade system. FIG. 25 illustrates the construction of the bucket-brigade transmission system using the transmission prioritized period TPP provided immediately after a beacon transmission of the local station by the communication station. As shown in the figure, each communication station returns to the active state thereof in time to the transmission prioritized period TPP provided immediately after the beacon transmission of the previous communication station transmitting a beacon immediately before the local station in the super frame, and performs the reception operation of data. Thereafter, each communication station moves to its sleep state, and waits until the beacon transmission timing of the next local station.

Moreover, in the example shown in FIG. 18, each communication station performs the bucket-brigade transmission of information by using the transmission prioritized period TPP acquired immediately after the beacon transmission of the local station. However, it is needless to say that the bucket-brigade transmission of a page packet as an advance announcement signal of the information transmission may be performed by using the TPP similarly to the bucket-brigade transmission shown in FIGS. 9 and 11.

Figure 19:
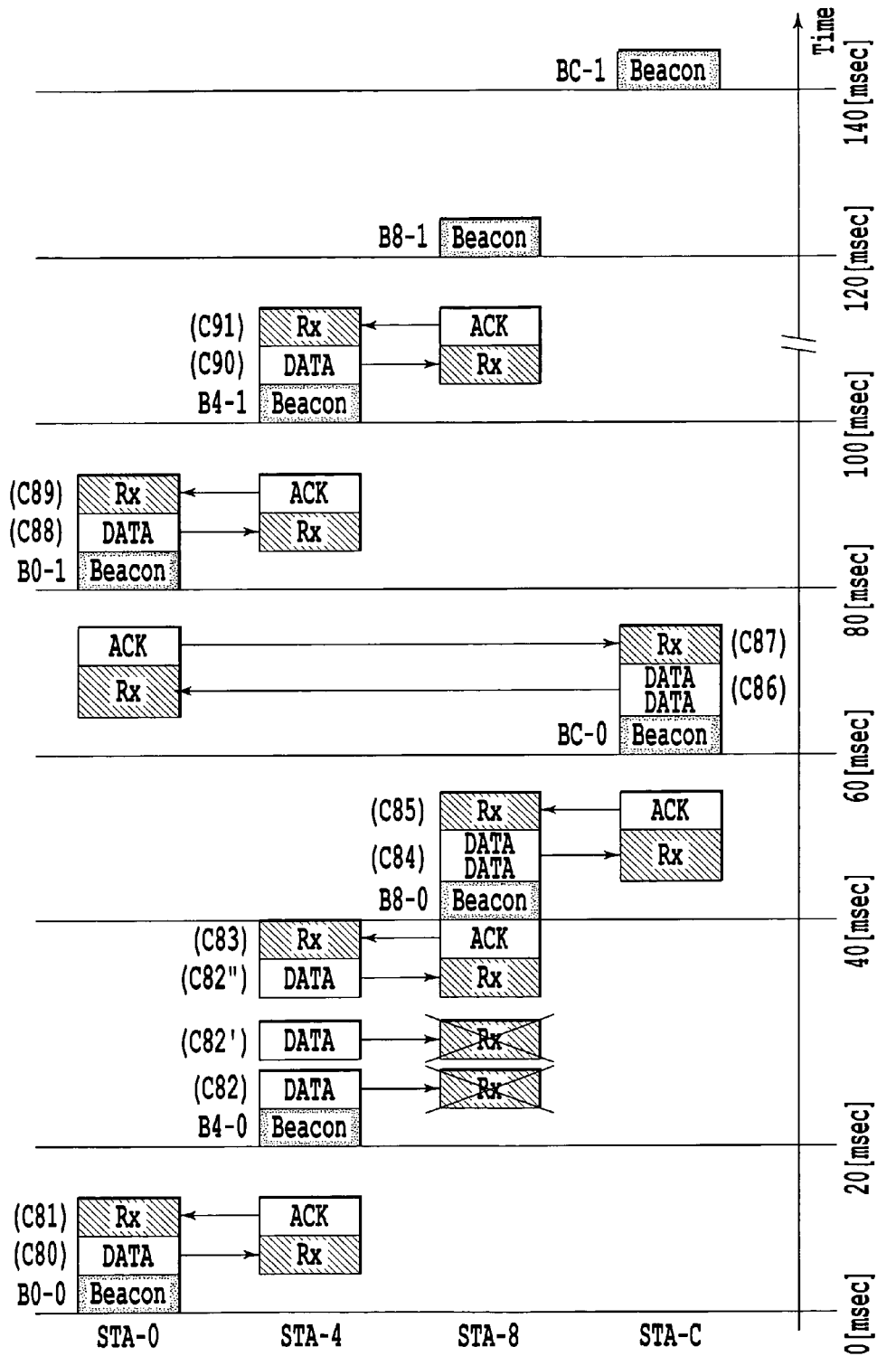
FIG. 19 is a view showing an operational example in a case where an error occurs during the information transmission/reception procedure of the embodiment shown in FIG. 18.

FIG. 19 minutely shows an operation example in a case where an error arises on the way of the information transmission and reception procedures according to the embodiment shown in FIG. 18. It should be noted that, similarly to the case shown in FIG. 13, the following situation is supposed. That is to say, the beacon transmission timing TBTT of four communication stations 0, 4, 8 and C are contained at every 20 microseconds at regular intervals in a super frame of a CW net configured at the period of 80 microseconds, and beacons are almost periodically transmitted in the order of the communication stations 0, 4, 8 and C. Also, it is supposed that the communication station 8 as well as the communication station 0 simultaneously performs the transmission of information in the same super frame.

The communication station 0 performs the transmission of a data packet composed of the information which the local station wants to send to a communication station (or several communication stations) by using the TPP provided immediately after the beacon transmission time of the local station (C80).

Because the communication station 4 has the receiver thereof operating in the time zone of the peripheral region of a beacon of the communication station 0 transmitting the beacon (immediately) before the beacon of the local station, the communication station 4 can receive the data packet, and sends back a reception confirmation response ACK to the received data packet (C81).

For transmitting a data packet to the communication station 8 transmitting a beacon next to the local station, the communication station 4 performs the transmission of the data packet by using the TPP provided immediately after the beacon transmission time of the local station (C82).

The communication station 8 should have the receiver thereof operating in the time zone of the peripheral region of a beacon of the communication station 4 transmitting the beacon (immediately) before the local station, but the reception is not performed correctly owing to some situation.

Because any reception confirmation response ACK is not sent back during a predetermined period, the communication station 4 tries to retransmit of the data packet in accordance with a predetermined procedure (C82'). Because any reception confirmation response is not sent back still, the communication station 4 temporarily gives up the transmission of the data packet to the communication station 8, and again transmits the data packet before and after the beacon transmission and reception time of the communication station 8 (C82").

Because the communication station 8 has the receiver thereof operating in the time zone of the peripheral region of a beacon of the communication station 4 transmitting the beacon (immediately) before the beacon of the local station, the communication station 8 can receive the data packet, and sends back a reception confirmation response ACK to the received data packet (C83).

For transmitting a data packet to the communication station C transmitting a beacon next to the local station, the communication station 8 performs the transmission of the data packet by using the TPP provided immediately after the beacon transmission time of the local station (C84). At this time, the communication station 8 forms an information group (data package) by adding the information which the local station wants to send to the received information, and then transmits the information group to the communication station C.

Because the communication station C has the receiver thereof operating in the time zone of the peripheral region of a beacon of the communication station 8 transmitting the beacon (immediately) before a beacon of the local station, the communication station C can receive the data packet, and sends back a reception confirmation response ACK to the received data packet (C85).

For transmitting a data packet to the communication station 0 transmitting a beacon next to the local station, the communication station C performs the transmission of the data packet by using the TPP provided immediately after the beacon transmission time of the local station (C86).

Because the communication station 0 has the receiver thereof operating in the time zone of the peripheral region of a beacon of the communication station C transmitting the beacon (immediately) before a beacon of the local station, the communication station 0 can receive the data packet, and sends back a reception confirmation response ACK to the received data packet (C87). When the communication station 0 here recognizes that the data packet includes the information which the local station has sent, the communication station 0 deletes the information from the information group (data package), and then produces a data packet composed of an information group which is to be sent round to the next communication station. Then, for transmitting the data packet to the communication station 4 transmitting a beacon next to the local station, the communication station 0 performs the transmission of the data packet by using the TPP provided immediately after the beacon transmission time of the local station (C88).

Because the communication station 4 has the receiver thereof operating in the time zone of the peripheral region of a beacon of the station transmitting the beacon (immediately) before a beacon of the local station, the communication station 4 can receive the data packet, and sends back a reception confirmation response ACK to the received data packet (C89).

For transmitting a data packet to the communication station 8 transmitting a beacon next to the local station, the communication station 4 performs the transmission of the data packet by using the TPP provided immediately after the beacon transmission time of the local station (C90).

Because the communication station 8 has the receiver thereof operating in the time zone of the peripheral region of a beacon of the station transmitting the beacon (immediately) before a beacon of the local station, the communication station 8 can receive the data packet, and sends back a reception confirmation response ACK to the received data packet (C91). When the communication station 8 recognizes that the information which the local station has sent is included in the data packet, the communication station 8 deletes the information from the information group (data package). Then, when the communication station 8 confirms that nothing except for the information which the local station sent is included in the received signal, the communication station 8 ends the series of transmission and reception procedures.

In the example shown in FIG. 19, retransmission data processing is completed in the same TPP section, but it is needless to say that, as shown in FIG. 16, the information indicating the communication station to which the communication station having failed in data transmission failed in the transmission may be added and the retransmission procedure to a specific communication station may be started when a time arrives at a communication station of the information transmission source in the next super frame. Alternately, retransmission data may be continued to be transmitted by the bucket-brigade system.

According to the information transmission and reception procedures of the present embodiment, it is possible to provide the information owned jointly in a system by the bucket-brigade system efficiently. Moreover, it is unnecessary to transmit a short packet several times with the possibility of collisions, and the delivery of data in a definite period of time basically becomes possible. Furthermore, because each communication station performs data transmission between them by providing reception periods before and after beacon transmission timing, the receiver can be operated only in the minimum necessary time zone. Consequently, the effect of the low power consumption is improved.

For example, in an application for applying wireless communication to game controllers in a case where a plurality of users performs a competition, it is necessary to transmit a command input on one machine to the controllers of all of the users. According to the above-mentioned information transmission and reception procedures, an input command composed of a short packet from each controller can be notified to each controller in a short latency without any delay from the proceeding of the game; Moreover, it is supposed that the game controllers are severally driven by a battery, and the lowering of power consumption is desired. Each game controller can enter its sleep state except for the time of packet transmission and reception.

In the above, specific embodiments were referred to while the present invention was described in detail. However, it is apparent that a person skilled in the art can modify and substitute the embodiments without departing from the subject matter of the present invention.

In the present specification, a case where the present invention is applied in the communication environment in which each communication station mutually notifies beacons every predetermined frame period in a self-organized distribution type wireless network has been described as the principal embodiment, but the subject matter of the present invention is not limited to the principal embodiment.

For example, as long as a communication system in which beacons are transmitted from a plurality of communication stations in a communication range, or as long as a communication system in which a reception period of each communication station is arranged in order in a predetermined period, even if the communication system is a network except for an self-organized distributed form, the present invention can be applied to the network similarly. Moreover, the present invention can be also applied even to a multi-channel type communication system, in which each communication station performs communication while hopping a plurality of frequency channels.

In short, the present invention has been disclosed in the form of exemplification, and accordingly the contents described in the present specification should not be interpreted limitedly. For judging the subject matter of the present invention, the claims described at the head of the specification should be considered.

What is claimed is:

1. A wireless communication system of a self-organized distribution type, comprising:
    a plurality of communication stations each configured to function as a local station and to transmit a beacon, including information pertaining to a network, at different times in a predetermined frame period, wherein
    each of the plurality of communication stations is configured to provide a predetermined reception period before and after a beacon transmission time of the beacon transmitted from a neighboring station of the plurality of communication stations, the neighboring station transmitting the beacon before the local station, and is configured to perform information transmission before and after a beacon transmission time of the beacon transmitted by a designated one of the plurality of communication stations, which is identified to receive the information transmission,
    when a certain communication station transmits information toward all of the other communication stations, each of the plurality of communication stations performs an information transmission method, in which information is sequentially transmitted to a respective next communication station transmitting the beacon next to the local station in said predetermined frame period by using reception periods provided before and after the beacon transmission time of the respective next communication station, or before and after the beacon transmission time of the local station, and
    after data giving notice of performing the information transmission is sequentially transmitted from a communication station functioning as an information transmission source to all of the other communication stations in one frame, said information transmission source transmits the information continuously to the beacon transmission of the local station in a next frame period, and the other communication stations receive the beacon and the transmission information in a receiving timing of the beacon from the information transmission source.

2. The wireless communication system according to claim 1, wherein
    each of said other communication stations transmits in said next frame period a reception confirmation response indicating that the communication station could receive the information continuously to the transmission of the beacon of the local station, when the communication station receives the transmission information from said information transmission source without error, and
    said information transmission source receives the reception confirmation response subsequently to the beacon reception from said other communication stations.

3. The wireless communication system according to claim 2, wherein
    when said information transmission source cannot recognize the reception confirmation response, said information transmission source starts a retransmission procedure with regard to the same information to the communication station.

4. The wireless communication system according to claim 1, wherein
    in response to reception of the information which the local station transmitted through the information transmission method, each of the plurality of communication stations recognizes completion of the transmission processing of the information.

5. The wireless communication system according to claim 1, wherein
    when each of the plurality of communication stations has information which the local station wants to transmit, the communication station adds the information which the local station wants to transmit to information received from a respective previous communication station transmitting the beacon before the local station in said predetermined frame period, and transmits the information to the respective next communication station transmitting the beacon next to the local station.

6. The wireless communication system according to claim 5, wherein
    each of the plurality of communication stations refers to at least one of a quantity of received information, a quantity of information which the local station wants to transmit, and a quantity of information which the local station has recently transmitted, and determines existence or nonexistence of information transmission from the local station within a frame period.

7. The wireless communication system according to claim 1, wherein
    when each of the communication stations fails in information transmission to the respective next communication station transmitting the beacon next to the local station, the communication station tries information retransmission by using a reception period of the respective next communication station in said predetermined frame period.

8. The wireless communication system according to claim 7, wherein
    when each of the plurality of communication stations fails in information transmission to another communication station, the communication station adds information indicating the another communication station to which the transmission fails to the transmission information, and tries to perform the information transmission to a communication station transmitting the beacon next to said another communication station in said predetermined frame period.

9. The wireless communication system according to claim 8, wherein
    when each of the plurality of communication stations receives the information which the local station transmitted through said information transmission method, the information indicating the another communication station to which the transmission fails is added to the information, each of the plurality of communication stations starts a retransmission procedure to the another communication station.

10. The wireless communication system according to claim 8, wherein
when each of the plurality of communication stations receives the information which the local station transmitted through said information transmission method, the information indicating the another communication station to which the transmission fails is added to the information, each of the plurality of communication stations retransmits the information through said information transmission method.

11. The wireless communication system according to claim 1, wherein
each of the plurality of communication stations periodically interpolates said predetermined frame period with beacons in the number corresponding to a required latency.

12. A wireless communication system of a self-organized distribution type, comprising:
a plurality of communication stations each configured to function as a local station and to transmit a beacon, including information pertaining to a network, at different times in a predetermined frame period, wherein
each of the plurality of communication stations is configured to provide a transmission prioritized period during which a transmission right is acquired with priority shown by the beacon transmission of the local station, and is configured to perform reception processing within the transmission prioritized period of the local station at a time of information transmission,
more than one of the plurality of communication stations receiving the information perform a reception operation within the transmission prioritized period of a communication station functioning as an information transmission source,
said more than one communication stations receiving the information transmit within the transmission prioritized period of the local station a reception confirmation response indicating that the communication station could receive the information when the transmission information from the information transmission source has been received without error, and
said communication station functioning as the information transmission source performs a reception operation within the transmission prioritized duration of each of said more than one communication stations, and receives the reception confirmation response.

13. The wireless communication system according to claim 12, wherein
each of the plurality of communication stations receiving the information performs information reception within the transmission prioritized period after the beacon transmission of a respective previous communication station transmitting the beacon before the local station.

14. A wireless communication system of a self-organized distribution type, comprising:
a plurality of communication stations each configured to function as a local station and to arrange reception periods sequentially at different times within a predetermined frame period, wherein
when a first communication station performs information transmission to all the other communication stations, each of the plurality of communication stations transmits information sequentially to a respective next communication station, which sets a reception period next to the reception period of the local station within said predetermined frame period,
each of said plurality of communication stations is configured to provide a predetermined reception period before and after a beacon transmission time of the beacon transmitted from a neighboring station of the plurality of communication stations, the neighboring station transmitting the beacon before the local station, and is configured to perform information transmission before and after a beacon transmission time of the beacon transmitted by a designated one of the plurality of communication stations, which is identified to receive the information transmission,
when a certain communication station transmits information toward all of the other communication stations, each of the plurality of communication stations performs an information transmission method, in which information is sequentially transmitted to a respective next communication station transmitting the beacon next to the local station in said frame period by using reception periods provided before and after the beacon transmission time of the respective next communication station, or before and after the beacon transmission time of the local station, and
after data giving notice of performing the information transmission is sequentially transmitted from a communication station functioning as an information transmission source to all of the other communication stations in one frame, said information transmission source transmits the information continuously to the beacon transmission of the local station in a next frame period, and the other communication stations receive the beacon and the transmission information in a receiving timing of the beacon from the information transmission source.

15. A wireless communication apparatus operating as a communication station in a communication environment of a self-organized distribution type configured with a plurality of communication stations each transmitting a beacon, including information pertaining to a network, at different times in a predetermined frame period, said wireless communication apparatus comprising:
communication means for transmitting/receiving wireless data on a channel;
beacon signal generating means for generating a beacon signal in which information regarding the wireless communication apparatus is described;
beacon signal analyzing means for analyzing a beacon signal received from a neighboring station via said communication means; and
communication control means for controlling data transmission operation on said channel, wherein
said communication control means determines a beacon transmission time of the neighboring station, performs a reception procedure before and after the neighboring station that transmits a beacon before the wireless communication apparatus, and performs information transmission before and after a beacon transmission time of a designated one of the plurality of communication stations, which is identified to receive the information transmission,
said communication control means receives a reception confirmation response subsequently to the reception of the beacon from another station within a next frame period, and
when failing to recognize the reception confirmation response from the another communication station, said communication control means starts a predetermined retransmission procedure with regard to the same information to the another communication station.

16. The wireless communication apparatus according to claim 15, wherein
when transmitting information to all the communication stations, said communication control means transmits information sequentially to a next communication station that transmits the beacon next to the wireless communication apparatus by utilizing a reception period provided before and after a beacon transmission time of the next communication station or before and after a beacon transmission time of the wireless communication apparatus within said predetermined frame period.

17. The wireless communication apparatus according to claim 16, wherein
after transmitting data giving notice of performing the information transmission to all other communication stations, said communication control means transmits the information subsequently to a beacon transmission of the wireless communication apparatus in the next frame period.

18. The wireless communication apparatus according to claim 17, wherein
in response to reception of said data giving notice from said another communication station, said communication control means receives the beacon and transmission information in a receiving timing of the beacon from said another communication station within said next frame period.

19. The wireless communication apparatus according to claim 18, wherein
said transmission control means transmits in said next frame period the reception confirmation response subsequently to the transmission of the beacon of the wireless communication apparatus upon receiving the transmission information without error.

20. The wireless communication apparatus according to claim 17, wherein
in response to reception of the information which the wireless communication apparatus transmitted, said communication control means recognizes completion of the transmission processing of the information.

21. The wireless communication apparatus according to claim 17, wherein
when information which the wireless communication apparatus wants to transmit exists, said communication control means adds the information which the wireless communication apparatus wants to transmit to information received from a previous communication station transmitting the beacon before the wireless communication apparatus in said frame period, and transmits the information to the next communication station transmitting the beacon next to the wireless communication apparatus.

22. The wireless communication apparatus according to claim 21, wherein
said communication control means refers to at least one of a quantity of received information, a quantity of information which the local station wants to transmit, and a quantity of information which the wireless communication apparatus has recently transmitted, and determines existence or nonexistence of information transmission from the wireless communication apparatus within a frame period.

23. The wireless communication apparatus according to claim 17, wherein
when failing in information transmission to the next communication station transmitting the beacon next to the wireless communication apparatus, said communication control means tries information retransmission by using a reception period of the next communication station in said frame period.

24. The wireless communication apparatus according to claim 23, wherein
when failing in information transmission to the another communication station, said communication control means adds information indicating the another communication station to which the information transmission fails, and tries to perform information transmission to a communication station transmitting the beacon next to the another communication station in said predetermined frame period.

25. The wireless communication apparatus according to claim 24, wherein
upon receiving the information which the wireless communication apparatus transmitted, when the information indicating the another communication station to which the transmission fails is added to the information, said communication control means starts a retransmission procedure to the another communication station.

26. The wireless communication apparatus according to claim 24, wherein
upon receiving the information which the wireless communication apparatus transmitted, when the information indicating the another communication station to which the transmission fails is added to the information, said communication control means retransmits the information to the next communication station which transmits the beacon next to the wireless communication apparatus.

27. The wireless communication apparatus according to claim 15, wherein
said communication control means periodically interpolates said predetermined frame period with beacons in the number corresponding to a required latency.

28. A wireless communication apparatus operating as a communication station in a communication environment of a self-organized distribution type configured with a plurality of communication stations each transmitting a beacon, including information pertaining to a network, at different times in a predetermined frame period, said wireless communication apparatus comprising:
communication means for transmitting/receiving wireless data on a channel;
beacon signal generating means for generating a beacon signal in which information regarding the wireless communication apparatus is described;
beacon signal analyzing means for analyzing a beacon signal received from a neighboring station via said communication means; and
communication control means for controlling data transmission operation on said channel, wherein
said communication control means determines a beacon transmission time of the neighboring station, provides a transmission prioritized period during which a transmission right is acquired with priority shown by the beacon transmission of the wireless communication apparatus, and performs data transmission within the transmission prioritized period of the wireless communication apparatus at a time of data transmission, said communication control means performs a reception operation by having a receiver operate within the transmission prioritized period of a communication station functioning as an information transmission source at a time of data reception, and said communication control means transmits within the transmission prioritized period of the wireless communication apparatus a reception confirmation response indicating that the wireless communication apparatus could receive the information when the transmission information from the information transmission source has been received without error.

29. The wireless communication apparatus according to claim 28, wherein said communication control means performs a reception operation within the transmission prioritized period subsequent to a beacon transmission time of a previous communication station which transmits a beacon before the wireless communication apparatus.

30. The wireless communication system according to claim 28, wherein said communication control means performs a reception operation by having the receiver operate within the transmission prioritized duration of said more than one communication stations, and receives a reception confirmation response.

31. A wireless communication apparatus operating as one of a plurality of communication stations in a communication environment in which each of the plurality of communication stations arranges reception periods sequentially at different times within a predetermined frame period, the wireless communication apparatus comprising:

communication control means for determining a reception period of a neighboring station, and for transmitting information sequentially to the neighboring station, which sets a reception period next to the wireless communication apparatus within said predetermined frame period;

communication means for transmitting/redeiving wireless data on a channel;

beacon signal generating means for generating a beacon signal in which information regarding the wireless communication apparatus is described; and beacon signal analyzing means for analyzing a beacon signal received from a neighboring station via said communication means, wherein said communication control means for controls data transmission operation on said channel, determines a beacon transmission time of the neighboring station, provides a transmission prioritized period during which a transmission right is acquired with priority shown by the beacon transmission of the wireless communication apparatus, performs data transmission within the transmission prioritized period of the wireless communication apparatus at a time of data transmission, and transmits a reception confirmation response indicating that the wireless communication apparatus could receive the information when the transmission information from the information transmission source has been received without error.

32. A wireless communication method for performing a wireless communication operation in a communication environment of a self-organized distribution type configured with a plurality of communication stations each functioning as a local station and transmitting a beacon, including information pertaining to a network, at different times in a predetermined frame period, said wireless communication method comprising:

transmitting the beacon of the local station at a predetermined beacon transmission timing;

determining a beacon transmission time of a neighboring station;

performing a reception processing before and after a beacon transmission time of the neighboring station, which transmits the beacon before the local station;

performing information transmission before and after a beacon transmission time of a designated one of the plurality of communication stations, which is identified to receive the information transmission, when a certain communication station transmits information toward all of the other communication stations, performing, by each of the plurality of communication stations, an information transmission method, in which information is sequentially transmitted to a respective next communication station transmitting the beacon next to the local station in said predetermined frame period by using reception periods provided before and after the beacon transmission time of the respective next communication station, or before and after the beacon transmission time of the local station; and after data giving notice of performing the information transmission is sequentially transmitted from a communication station functioning as an information transmission source to all of the other communication stations in one frame, transmitting, by said information transmission source, the information continuously to the beacon transmission of the local station in a next frame period, and the other communication stations receive the beacon and the transmission information in a receiving timing of the beacon from the information transmission source.

33. A wireless communication method for performing a wireless communication operation in a communication environment of a self-organized distribution type configured with a plurality of communication stations each functioning as a local station and transmitting a beacon, including information pertaining to a network, at different times in a predetermined frame period, said wireless communication method comprising:

transmitting the beacon of the local station at a predetermined beacon transmission timing;

determining a beacon transmission time of a neighboring station;

providing a transmission prioritized period during which a transmission right is acquired before and after a beacon transmission time of the local station to perform information transmission;

performing a reception operation within a transmission prioritized period subsequent to a beacon transmission time of a previous communication station which transmits the beacon before the local station;

performing, by more than one of the plurality of communication stations receiving the information, a reception operation within the transmission prioritized period of a communication station functioning as an information transmission source; and transmitting, by said more than one communication stations receiving the information, within the transmission prioritized period of the local station a reception confirmation response indicating that the communication station could receive the information when the transmission information from the information transmission source has been received without error, wherein said communication station functioning as the information transmission source performs a reception operation within the transmission prioritized duration of each of said more than one communication stations, and receives the reception confirmation response.

34. A wireless communication method for performing a wireless communication operation in a communication environment in which each of a plurality of communication stations functions as a local station and provides a reception period sequentially within a predetermined frame period, the wireless communication method comprising:

determining a reception period of a neighboring station;

transmitting, sequentially, information to a respective next communication station, which sets a reception period next to the local station within said predetermined frame period;

providing, by each of said plurality of communication stations, a predetermined reception period before and after a beacon transmission time of the beacon transmitted from a neighboring station of the plurality of communication stations, the neighboring station transmitting the beacon before the local station, and is configured to perform information transmission before and after a beacon transmission time of the beacon transmitted by a designated one of the plurality of communication stations, which is identified to receive the information transmission;

when a certain communication station transmits information toward all of the other communication stations, performing, by each of the plurality of communication stations, an information transmission method, in which information is seguentially transmitted to a respective next communication station transmitting the beacon next to the local station in said frame period by using reception periods provided before and after the beacon transmission time of the respective next communication station, or before and after the beacon transmission time of the local station; and after data giving notice of performing the information transmission is seguentially transmitted from a communication station functioning as an information transmission source to all of the other communication stations in one frame, transmitting, by said information transmission source, the information continuously to the beacon transmission of the local station in a next frame period, and the other communication stations receive the beacon and the transmission information in a receiving timing of the beacon from the information transmission source.

35. A computer-readable information storage unit having embedded therein instructions, which when executed by a processor, cause the processor to perform a method for performing a wireless communication operation in a communication environment of a self-organized distribution type configured with a plurality of communication stations each functioning as a local station and transmitting a beacon, including information pertaining to a network, at different times in a predetermined frame period, said method comprising:

transmitting the beacon of the local station at a predetermined beacon transmission timing;

determining a beacon transmission time of a neighboring station;

performing a reception processing before and after a beacon transmission time of the neighboring station, which transmits the beacon after the local station;

performing information transmission before and after a beacon transmission time of a designated one of the plurality of communication stations, which is identified to receive the information transmission;

when a certain communication station transmits information toward all of the other communication stations, performing, by each of the plurality of communication stations, an information transmission method, in which information is sequentially transmitted to a respective next communication station transmitting the beacon next to the local station in said predetermined frame period by using reception periods provided before and after the beacon transmission time of the respective next communication station, or before and after the beacon transmission time of the local station; and after data giving notice of performing the information transmission is sequentially transmitted from a communication station functioning as an information transmission source to all of the other communication stations in one frame, transmitting, by said information transmission source, the information continuously to the beacon transmission of the local station in a next frame period, and the other communication stations receive the beacon and the transmission information in a receiving timing of the beacon from the information transmission source.

36. A computer-readable information storage unit having embedded therein instructions, which when executed by a processor, cause the processor to perform a method for performing a wireless communication operation in a communication environment of a self-organized distribution type configured with a plurality of communication stations each functioning as a local station and transmitting a beacon, including information pertaining to a network, at different times in a predetermined frame period, said method comprising:

transmitting the beacon of the local station at a predetermined beacon transmission timing;

determining a beacon transmission time of a neighboring station;

providing a transmission prioritized period during which a transmission right is acquired before and after a beacon transmission time of the local station to perform information transmission;

performing a reception operation within a transmission prioritized period subsequent to a beacon transmission time of a previous communication station which transmits the beacon before the local station;

performing, by more than one of the plurality of communication stations receiving the information, a reception operation within the transmission prioritized period of a communication station functioning as an information transmission source; and transmitting, by said more than one communication stations receiving the information, within the transmission prioritized period of the local station a reception confirmation response indicating that the communication station could receive the information when the transmission information from the information transmission source has been received without error, wherein said communication station functioning as the information transmission source performs a reception operation within the transmission prioritized duration of each of said more than one communication stations, and receives the reception confirmation response.

37. A computer-readable information storage unit having embedded therein instructions, which when executed by a processor, cause the processor to perform a method for performing a wireless communication operation in a communication environment in which each of a plurality of communication stations functions as a local station and provides a reception period sequentially within a predetermined frame period, the method comprising:

determining a reception period of a neighboring station;

transmitting, sequentially, information to a respective next communication station, which sets a reception period next to the local station within said predetermined frame period;

providing, by each of said plurality of communication stations, a predetermined reception period before and after a beacon transmission time of the beacon transmitted from a neighboring station of the plurality of communication stations, the neighboring station transmitting the beacon before the local station, and is configured to perform information transmission before and after a beacon transmission time of the beacon transmitted by a designated one of the plurality of communication stations, which is identified to receive the information transmission;

when a certain communication station transmits information toward all of the other communication stations, performing, by each of the plurality of communication stations, an information transmission method, in which information is sequentially transmitted to a respective next communication station transmitting the beacon next to the local station in said frame period by using reception periods provided before and after the beacon transmission time of the respective next communication station, or before and after the beacon transmission time of the local station; and after data giving notice of performing the information transmission is sequentially transmitted from a communication station functioning as an information transmission source to all of the other communication stations in one frame, transmitting, by said information transmission source, the information continuously to the beacon transmission of the local station in a next frame period, and the other communication stations receive the beacon and the transmission information in a receiving timing of the beacon from the information transmission source.

38. A wireless communication apparatus operating as a communication station in a communication environment of a self-organized distribution type configured with a plurality of communication stations each transmitting a beacon, including information pertaining to a network, at different times in a predetermined frame period, said wireless communication apparatus comprising:

a communication unit configured to transmit/receive wireless data on a channel;

a beacon signal generating unit configured to generate a beacon signal in which information regarding the wireless communication apparatus is described;

a beacon signal analyzing unit configured to analyze a beacon signal received from a neighboring station via said communication unit; and a communication control unit configured to control data transmission operation on said channel, wherein said communication control unit is configured to determine a beacon transmission time of the neighboring station, to perform a reception procedure before and after the neighboring station that transmits a beacon before the wireless communication apparatus, and to perform information transmission before and after a beacon transmission time of a designated one of the plurality of communication stations, which is identified to receive the information transmission, said communication control unit is configured to receive a reception confirmation response subsequently to the reception of the beacon from another station within a next frame period, and when failing to recognize the reception confirmation response from the another communication station, said communication control unit is configured to start a predetermined retransmission procedure with regard to the same information to the another communication station.

39. A wireless communication apparatus operating as a communication station in a communication environment of a self-organized distribution type configured with a plurality of communication stations each transmitting a beacon, including information pertaining to a network, at different times in a predetermined frame period, said wireless communication apparatus comprising:

a communication unit configured to transmit/receive wireless data on a channel;

a beacon signal generating unit configured to generate a beacon signal in which information regarding the wireless communication apparatus is described;

a beacon signal analyzing unit configured to analyze a beacon signal received from a neighboring station via said communication unit; and a communication control unit configured to control data transmission operation on said channel, wherein said communication control unit is configured to determine a beacon transmission time of the neighboring station, to provide a transmission prioritized period during which a transmission right is acquired with priority shown by the beacon transmission of the wireless communication apparatus, and to perform data transmission within the transmission prioritized period of the wireless communication apparatus at a time of data transmission, said communication control unit is configured to perform a reception operation by having a receiver operate within the transmission prioritized period of a communication station functioning as an information transmission source at a time of data reception, and said communication control unit is configured to transmit within the transmission prioritized period of the wireless communication apparatus a reception confirmation response indicating that the wireless communication apparatus could receive the information when the transmission information from the information transmission source has been received without error.

40. A wireless communication apparatus operating as one of a plurality of communication stations in a communication environment in which each of the plurality of communication stations arranges reception periods sequentially at different times within a predetermined frame period, the wireless communication apparatus comprising:

a communication control unit configured to determine a reception period of a neighboring station, and to transmit information sequentially to the neighboring station, which sets a reception period next to the wireless communication apparatus within said predetermined frame period;

a communication unit configured to transmit/receive wireless data on a channel;

a beacon signal generating unit configured to generate a beacon signal in which information regarding the wireless communication apparatus is described; and a beacon signal analyzing unit configured to analyze a beacon signal received from a neighboring station via said communication unit, wherein said communication control is configured to control data transmission operation on said channel, to determine a beacon transmission time of the neighboring station, to provide a transmission prioritized period during which a transmission right is acquired with priority shown by the beacon transmission of the wireless communication apparatus, to perform data transmission within the transmission prioritized period of the wireless communication apparatus at a time of data transmission, and to transmit a reception confirmation response indicating that the wireless communication apparatus could receive the information when the transmission information from the information transmission source has been received without error.

* * * * *